US012804545B2

(12) United States Patent
Yi et al.

(10) Patent No.: US 12,804,545 B2
(45) Date of Patent: Nov. 17, 2026

(54) METHOD AND APPARATUS FOR ENERGY SAVING OF COMMUNICATION SYSTEM

(71) Applicant: Samsung Electronics Co., Ltd., Suwon-si (KR)

(72) Inventors: Junyung Yi, Suwon-si (KR); Youngbum Kim, Suwon-si (KR); Kyoungmin Park, Suwon-si (KR); Jaewon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 176 days.

(21) Appl. No.: 18/653,224

(22) Filed: May 2, 2024

(65) Prior Publication Data

US 2024/0373358 A1 Nov. 7, 2024

(30) Foreign Application Priority Data

May 3, 2023 (KR) ........................ 10-2023-0057945

(51) Int. Cl.
*H04W 52/02* (2009.01)
*H04W 52/36* (2009.01)

(52) U.S. Cl.
CPC ..... *H04W 52/0229* (2013.01); *H04W 52/367* (2013.01)

(58) Field of Classification Search
CPC ........... H04W 52/0229; H04W 52/367; H04W 52/0206; H04W 72/0457; H04W 72/232; H04W 76/28; Y02D 30/70; H04B 7/0693; H04B 7/0877
See application file for complete search history.

(56) References Cited

U.S. PATENT DOCUMENTS

2012/0300686 A1 11/2012 Maeda et al.
2020/0221384 A1* 7/2020 Ang .................. H04W 52/0229
2021/0051589 A1 2/2021 Nam et al.
(Continued)

FOREIGN PATENT DOCUMENTS

EP 2 941 063 A1 11/2015
WO 2014/056174 A1 4/2014

OTHER PUBLICATIONS

Huawei, Network energy saving techniques, R3-226399, 3GPP TSG RAN WG3 Meeting #118, Nov. 4, 2022, Toulouse, FR.
(Continued)

*Primary Examiner* — Sun Jong Kim
(74) *Attorney, Agent, or Firm* — Jefferson IP Law, LLP

(57) ABSTRACT

The disclosure relates to a $5^{th}$ generation (5G) or $6^{th}$ generation (6G) communication system for supporting a higher data transmission rate. A method performed by a user equipment (UE) in a communication system is provided. The method includes receiving uplink wake up signal (UL WUS) configuration information including information on a first plurality of cells, performing UL WUS transmission based on the UL WUS configuration information, identifying a cell for data communication included in the first plurality of cells based on a reference signal received from the cell after performing the UL WUS transmission, and performing the data communication on the cell.

16 Claims, 23 Drawing Sheets

(56) References Cited

U.S. PATENT DOCUMENTS

| | | | | |
|---|---|---|---|---|
| 2022/0210707 | A1 | 6/2022 | Lim | |
| 2022/0417853 | A1 | 12/2022 | Kumar et al. | |
| 2023/0043142 | A1 | 2/2023 | Ly et al. | |
| 2023/0224828 | A1* | 7/2023 | Yang | H04W 52/146 |
| 2024/0205829 | A1* | 6/2024 | Ma | H04W 76/15 |
| 2025/0212121 | A1* | 6/2025 | Wang | H04W 52/02 |

OTHER PUBLICATIONS

International Search Report dated Aug. 14, 2024, issued in International Application No. PCT/KR2024/005974.
LTE; Evolved Universal Terrestrial Radio Access (E-UTRA); Medium Access Control (MAC) protocol specification (3GPP TS 36.321 version 9.1.0 Release 9), ETSI TS 136 321 V9.1.0 (Feb. 2010), Feb. 1, 2010, XP014046009.
Extended European Search Report dated May 20, 2026, issued in European Patent Application No. 24800248.7.

* cited by examiner

METHOD AND APPARATUS FOR ENERGY SAVING OF COMMUNICATION SYSTEM

CROSS-REFERENCE TO RELATED APPLICATION(S)

This application is based on and claims priority under 35 U.S.C. § 119(a) of a Korean patent application number 10-2023-0057945, filed on May 3, 2023, in the Korean Intellectual Property Office, the disclosure of which is incorporated by reference herein in its entirety.

BACKGROUND

1. Field

The disclosure relates to a wireless communication system. More particularly, the disclosure relates to a method and an apparatus for energy saving in a wireless communication system.

2. Description of Related Art

5$^{th}$ generation (5G) mobile communication technologies define broad frequency bands such that high transmission rates and new services are possible, and can be implemented not only in "Sub 6 GHz" bands, such as 3.5 GHz, but also in "Above 6 GHz" bands referred to as mmWave including 28 GHz and 39 GHz. In addition, it has been considered to implement 6$^{th}$ generation (6G) mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced mobile broadband (eMBB), ultra reliable low latency communications (URLLC), and massive machine-type communications (mMTC), there has been ongoing standardization regarding beamforming and massive multiple-input multiple-output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of bandwidth part (BWP), new channel coding methods, such as a low density parity check (LDPC) code for large amount of data transmission and a polar code for highly reliable transmission of control information, Layer 2 (L2) pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies, such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, NR user equipment (UE) power saving, non-terrestrial network (NTN) which is UE-satellite direct communication for providing coverage in an area in which communication with terrestrial networks is unavailable, and positioning.

Moreover, there has been ongoing standardization in air interface architecture/protocol regarding technologies, such as industrial Internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step random access channel (RACH) for NR). There also has been ongoing standardization in system architecture/service regarding a 5G baseline architecture (for example, service based architecture or service based interface) for combining network functions virtualization (NFV) and software-defined networking (SDN) technologies, and mobile edge computing (MEG) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended reality (XR) for efficiently supporting augmented reality (AR), virtual reality (VR), mixed reality (MR) and the like, 5G performance improvement and complexity reduction by utilizing artificial intelligence (AI) and machine learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies, such as full dimensional MIMO (FD-MIMO), array antennas and large-scale antennas, metamaterial-based lenses and antennas for improving coverage of terahertz band signals, high-dimensional space multiplexing technology using orbital angular momentum (OAM), and reconfigurable intelligent surface (RIS), but also full-duplex technology for increasing frequency efficiency of 6G mobile communication technologies and improving system networks, AI-based communication technology for implementing system optimization by utilizing satellites and artificial intelligence (AI) from the design stage and internalizing end-to-end AI support functions, and next-generation distributed computing technology for implementing services at levels of complexity exceeding the limit of UE operation capability by utilizing ultra-high-performance communication and computing resources.

With the recent advancement of 5G/6G communication systems considering the environment, the need for a method for reducing energy consumption of a communication system (e.g., a user equipment (UE), a base station, a network, or the like) or a method for energy saving has emerged.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a new definition of a cell for reducing energy consumption of a base station in a wireless communication system.

Another aspect of the disclosure is to provide a method for controlling power of a wake-up signal (WUS) transmitted by a UE for on-demand cell activation. Another aspect of the disclosure is to provide a method for controlling transmission power of a WUS to activate an on-demand cell.

Additional aspects will be set forth in part in the description which follows and, in part, will be apparent from the description, or may be learned by practice of the presented embodiments.

In accordance with an aspect of the disclosure, a method performed by a base station in a communication system is provided. The method includes activating a cell (e.g., an access/sync cell) for access and/or synchronization and inactivating an on-demand cell (e.g., a Data cell) for traffic (and/or packet) processing, an operation of configuring wake up signal (WUS) configuration information for activating the on-demand cell, through higher layer signaling and/or layer-1 (L1) signaling, to UEs having performed initial access (or a random access channel (RACH) procedure) through the access/sync cell, and an operation of activating the on-demand cell based on the configuration information from a UE.

In accordance with another aspect of the disclosure, a method performed by a UE in a communication system is provided. The method includes performing initial access (or a RACH procedure/random access) to an access/sync cell, thereafter, an operation of receiving, from a base station, configuration information of an on-demand cell for processing traffic (and/or packet) through higher layer signaling and/or L1 signaling, an operation of determining WUS transmission power for activating the on-demand cell based on the received configuration information, and an operation of transmitting a WUS with the determined WUS transmission power.

In accordance with another aspect of the disclosure, a method performed by a user equipment (UE) in a communication system is provided. The method includes receiving uplink wake up signal (UL WUS) configuration information including information on a first plurality of cells, performing UL WUS transmission based on the UL WUS configuration information, identifying a cell for data communication included in the first plurality of cells based on a reference signal received from the cell after performing the UL WUS transmission, and performing the data communication on the cell.

According to an embodiment of the disclosure, wherein performing the UL WUS transmission comprises respectively transmitting, based on the UL WUS configuration information, a plurality of UL WUSs to a second plurality of cells, wherein the second plurality of cells is included in the first plurality of cells, and wherein the cell for the data communication is identified based on measurement of at least one reference signal including the reference signal received from at least one cell included in the second plurality of cells after transmission of the plurality of UL WUSs.

According to an embodiment of the disclosure, wherein the UL WUS configuration information is received from a certain cell different from the first plurality of cells, and wherein transmission power for the UL WUS transmission is identified based on a configured maximum transmission power for a carrier of the certain cell.

According to an embodiment of the disclosure, wherein the transmission power corresponds to a target received power identified based on the configured maximum transmission power, a configured maximum number of the UL WUS transmission, a number of the UL WUS transmission, wherein the number is equal to or less than the configured maximum number, a power ramping value for the UL WUS transmission, and an offset value for the UL WUS transmission, and wherein the configured maximum transmission power, the configured maximum number and the offset value are configured from the certain cell.

According to an embodiment of the disclosure, wherein the UL WUS transmission corresponds to physical random access channel (PRACH) transmission.

In accordance with another aspect of the disclosure, a user equipment (UE) in a communication system is provided. The UE includes a transceiver, memory storing one or more computer programs, and one or more processors communicatively coupled to the transceiver and the memory, wherein the one or more computer programs include computer-executable instructions that, when executed by the one or more processors, cause the UE to receive uplink wake up signal (UL WUS) configuration information including information on a first plurality of cells, perform UL WUS transmission based on the UL WUS configuration information, identify a cell for data communication included in the first plurality of cells based on a reference signal received from the cell after performing the UL WUS transmission, and perform the data communication on the cell.

According to an embodiment of the disclosure, wherein the one or more computer programs further include computer-executable instructions that, when executed by the one or more processors, cause the UE to respectively transmit, based on the UL WUS configuration information, a plurality of UL WUSs to a second plurality of cells, wherein the second plurality of cells is included in the first plurality of cells, and wherein the cell for the data communication is identified based on measurement of at least one reference signal including the reference signal received from at least one cell included in the second plurality of cells after transmission of the plurality of UL WUSs.

According to an embodiment of the disclosure, wherein the UL WUS configuration information is received from a certain cell different from the first plurality of cells, and wherein transmission power for the UL WUS transmission is identified based on a configured maximum transmission power for a carrier of the certain cell.

According to an embodiment of the disclosure, wherein the transmission power corresponds to a target received power identified based on the configured maximum transmission power, a configured maximum number of the UL WUS transmission, a number of the UL WUS transmission, wherein the number is equal to or less than the configured maximum number, a power ramping value for the UL WUS transmission, and an offset value for the UL WUS transmission, and wherein the configured maximum transmission power, the configured maximum number and the offset value are configured from the certain cell.

According to an embodiment of the disclosure, wherein the UL WUS transmission corresponds to physical random access channel (PRACH) transmission.

In accordance with another aspect of the disclosure, a method performed by a base station in a communication system is provided. The method includes transmitting, on a certain cell, uplink wake up signal (UL WUS) configuration information including information on a first plurality of cells different from the certain cell, performing UL WUS reception associated with the UL WUS configuration information, and performing data communication on a cell, wherein the cell is identified based on the UL WUS reception.

According to an embodiment of the disclosure, wherein performing the UL WUS reception comprises respectively receiving, based on the UL WUS configuration information, a plurality of UL WUSs on a second plurality of cells, wherein the second plurality of cells is included in the first plurality of cells, and wherein the cell for the data communication is identified based on measurement of the plurality of UL WUSs on the second plurality of cells.

According to an embodiment of the disclosure, wherein a configured maximum transmission power for a carrier of the certain cell is transmitted on a certain cell, and wherein the configured maximum transmission power is associated with transmission power for the UL WUS reception.

According to an embodiment of the disclosure, wherein the transmission power corresponds to a target received power associated with the configured maximum transmission power, a configured maximum number of the UL WUS transmission, a number of the UL WUS transmission, wherein the number is equal to or less than the configured maximum number, a power ramping value for the UL WUS transmission, and an offset value for the UL WUS transmission, and wherein the configured maximum transmission power, the configured maximum number and the offset value are transmitted on the certain cell.

According to an embodiment of the disclosure, wherein the UL WUS transmission corresponds to physical random access channel (PRACH) reception.

In accordance with another aspect of the disclosure, a base station in a communication system is provided. The base station includes a transceiver, memory storing one or more computer programs, and one or more processors communicatively coupled to the transceiver and the memory, wherein the one or more computer programs include computer-executable instructions that, when executed by the one or more processors, cause the base station to transmit, on a certain cell, uplink wake up signal (UL WUS) configuration information including information on a first plurality of cells different from the certain cell, perform UL WUS reception associated with the UL WUS configuration information, and perform data communication on a cell, wherein the cell is identified based on the UL WUS reception.

According to an embodiment of the disclosure, wherein the one or more computer programs further include computer-executable instructions that, when executed by the one or more processors, cause the base station to respectively receive, based on the UL WUS configuration information, a plurality of UL WUSs on a second plurality of cells, wherein the second plurality of cells is included in the first plurality of cells, and wherein the cell for the data communication is identified based on measurement of the plurality of UL WUSs on the second plurality of cells.

According to an embodiment of the disclosure, wherein a configured maximum transmission power for a carrier of the certain cell is transmitted on a certain cell, and wherein the configured maximum transmission power is associated with transmission power for the UL WUS reception.

According to an embodiment of the disclosure, wherein the transmission power corresponds to a target received power associated with the configured maximum transmission power, a configured maximum number of the UL WUS transmission, a number of the UL WUS transmission, wherein the number is equal to or less than the configured maximum number, a power ramping value for the UL WUS transmission, and an offset value for the UL WUS transmission, and wherein the configured maximum transmission power, the configured maximum number and the offset value are transmitted on the certain cell.

According to an embodiment of the disclosure, wherein the UL WUS transmission corresponds to physical random access channel (PRACH) reception.

According to an embodiment of the disclosure, energy consumption of a base station may be reduced.

An embodiment of the disclosure may provide a definition of a cell having different functions for energy saving of a base station in a mobile communication system, a method for configuring a WUS for activating an on-demand cell, and a method for controlling WUS power.

According to an embodiment of the disclosure, overhead which requires the base station to always activate a cell periodically for common channel and/or signal transmission may be reduced. Therefore, the energy of the base station may be managed more efficiently, and the energy consumption of the base station may be reduced.

According to an embodiment of the disclosure, the base station may control the number of on-demand cells efficiently for activation. Therefore, the base station may maintain an inactivity state with respect to more components of a cell not on-demand to save energy.

In accordance with another aspect of the disclosure, one or more non-transitory computer-readable storage media storing computer-executable instructions that, when executed by one or more processors of a user equipment (UE), cause the UE to perform operations are provided. The operations include receiving uplink wake up signal (UL WUS) configuration information including information on a first plurality of cells, performing UL WUS transmission based on the UL WUS configuration information, identifying a cell for data communication included in the first plurality of cells based on a reference signal received from the cell after performing the UL WUS transmission, and performing the data communication on the cell.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
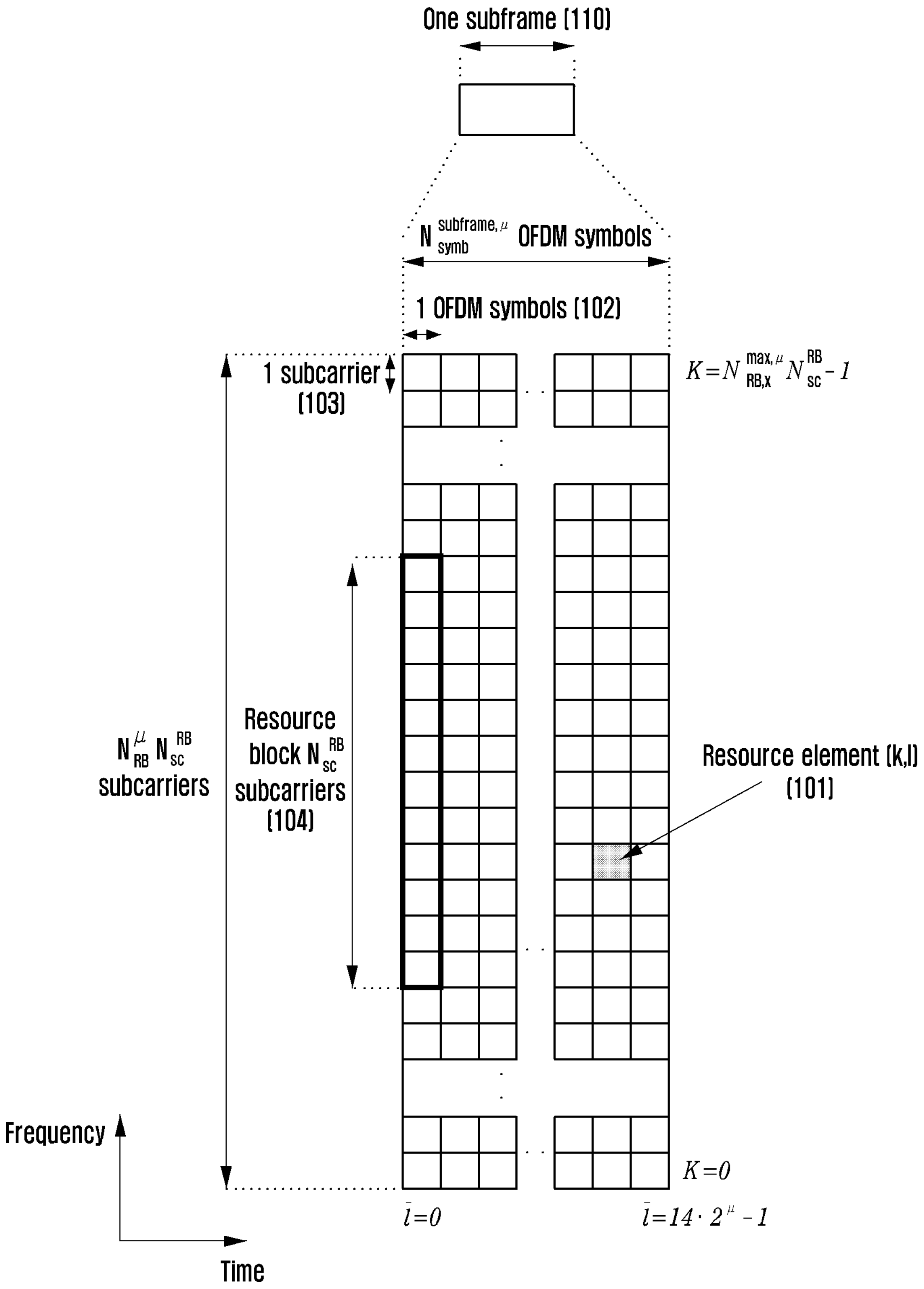
FIG. 1 illustrates a basic structure of a time-frequency domain as a radio resource domain in a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, in the accompanying drawings, some elements may be exaggerated, omitted, or schematically illustrated. Furthermore, the size of each element does not completely reflect the actual size. In the respective drawings, the same or corresponding elements are provided with the same or corresponding reference numerals.

The advantages and features of the disclosure and ways to achieve them will be apparent by making reference to embodiments as described below in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference signs indicate the same or like elements. Furthermore, in describing the disclosure, a detailed description of known functions or configurations incorporated herein will be omitted when it is determined that the description may make the subject matter of the disclosure unnecessarily unclear. The terms which will be described below are terms defined based on the functions in the disclosure, and may be different according to users, intentions of the users, or customs. Therefore, the definitions of the terms should be made based on the contents throughout the specification.

In the following description, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing a communication function. In the disclosure, a "downlink (DL)" refers to a radio link via which a base station transmits a signal to a terminal, and an "uplink (UL)" refers to a radio link via which a terminal transmits a signal to a base station. Furthermore, in the following description, long term evolution (LTE) or LTE-advanced (LTE-A) systems may be described by way of example, but the embodiments of the disclosure may also be applied to other communication systems having similar technical backgrounds or channel types to the embodiments of the disclosure. Examples of such communication systems may include 5th generation mobile communication technologies (5G, new radio, and NR) developed beyond LTE-A, and in the following description, the “5G” may be the concept that covers the exiting LTE, LTE-A, and other similar services. In addition, based on determinations by those skilled in the art, the disclosure may be applied to other communication systems through some modifications without significantly departing from the scope of the disclosure.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Furthermore, each block in the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used in embodiments of the disclosure, the “unit” refers to a software element or a hardware element, such as a field programmable gate array (FPGA) or an application specific integrated circuit (ASIC), which performs a predetermined function. However, the “unit” does not always have a meaning limited to software or hardware. The “unit” may be constructed either to be stored in an addressable storage medium or to execute one or more processors. Therefore, the “unit” includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the “unit” may be either combined into a smaller number of elements, or a “unit”, or divided into a larger number of elements, or a “unit”. Moreover, the elements and “units” or may be implemented to reproduce one or more central processing units (CPUs) within a device or a security multimedia card. Furthermore, the “unit” in the embodiments may include one or more processors.

Hereinafter, embodiments of the disclosure will be described in conjunction with the accompanying drawings. Method and devices as proposed in the embodiments of the disclosure below may be applied without being limited to the respective embodiments of the disclosure, and all or some of one or more embodiments proposed in the disclosure may be employed in combination. Therefore, based on determinations by those skilled in the art, the embodiments of the disclosure may be applied through some modifications without significantly departing from the scope of the disclosure.

Furthermore, in describing the disclosure, a detailed description of known functions or configurations incorporated herein will be omitted when it is determined that the description may make the subject matter of the disclosure unnecessarily unclear. The terms which will be described below are terms defined based on the functions in the disclosure, and may be different according to users, intentions of the users, or customs. Therefore, the definitions of the terms should be made based on the contents throughout the specification.

A wireless communication system is advancing to a broadband wireless communication system for providing high-speed and high-quality packet data services using communication standards, such as high-speed packet access (HSPA) of 3GPP, LTE-Advanced (LTE-A), LTE-Pro, high-rate packet data (HRPD) of 3GPP2, ultra-mobile broadband (UMB), IEEE 802.17e, and the like, as well as typical voice-based services.

As a typical example of the broadband wireless communication system, an LTE system employs an orthogonal frequency division multiplexing (OFDM) scheme in a downlink (DL) and employs a single carrier frequency division multiple access (SC-FDMA) scheme in an uplink (UL). The uplink refers to a radio link via which a user equipment (UE or a mobile station (MS)) transmits data or control signals to a base station (BS or eNode B (eNB)), and the downlink refers to a radio link via which the base station transmits data or control signals to the UE. The above multiple access scheme separates data or control information of respective users by allocating and operating time-frequency resources for transmitting the data or control information for each user so as to avoid overlapping each other, that is, so as to establish orthogonality.

Since a 5G communication system, which is a post-LTE communication system, must freely reflect various requirements of users, service providers, and the like, services satisfying various requirements must be supported. The services considered in the 5G communication system include enhanced mobile broadband (eMBB) communication, massive machine-type communication (mMTC), ultra-reliability low-latency communication (URLLC), and the like.

eMBB aims at providing a data rate higher than that supported by existing LTE, LTE-A, or LTE-Pro. For example, in the 5G communication system, eMBB must provide a peak data rate of 20 Gbps in the downlink and a peak data rate of 10 Gbps in the uplink for a single base station. Furthermore, the 5G communication system must provide an increased user-perceived data rate to the UE, as well as the maximum data rate. In order to satisfy such requirements, transmission/reception technologies including a further enhanced multiple-input multiple-output (MIMO)

transmission technique may be required to be improved. In addition, the data rate required for the 5G communication system may be obtained using a frequency bandwidth more than 20 MHz in a frequency band of 3 to 6 GHz or 6 GHz or more, instead of transmitting signals using a transmission bandwidth up to 20 MHz in a band of 2 GHz used in LTE.

In addition, mMTC is being considered to support application services, such as the Internet of Things (IoT) in the 5G communication system. mMTC has requirements, such as support of connection of a large number of UEs in a cell, enhancement coverage of UEs, improved battery time, a reduction in the cost of a UE, and the like, in order to effectively provide the Internet of Things. Since the Internet of Things provides communication functions while being provided to various sensors and various devices, it must support a large number of UEs (e.g., 1,000,000 UEs/km2) in a cell. In addition, the UEs supporting mMTC may require wider coverage than those of other services provided by the 5G communication system because the UEs are likely to be located in a shadow area, such as a basement of a building, which is not covered by the cell due to the nature of the service. The UE supporting mMTC must be configured to be inexpensive, and requires a very long battery life-time, such as 10 to 16 years, because it is difficult to frequently replace the battery of the UE.

Lastly, URLLC is a cellular-based mission-critical wireless communication service. For example, URLLC may be considered as services used for remote control for robots or machinery, industrial automation, unmanned aerial vehicles, remote health care, or emergency alert. Thus, URLLC must provide communication with ultra-low latency and ultra-high reliability. For example, a service supporting URLLC must satisfy an air interface latency of less than 0.5 ms, and also requires a packet error rate of 10-5 or less. Therefore, for the services supporting URLLC, a 5G system must provide a transmit time interval (TTI) shorter than those of other services, and must also assign a large number of resources in a frequency band in order to secure reliability of a communication link.

The three services in the 5G communication system (hereinafter may be interchangeably used with "5G system"), that is, eMBB, URLLC, and mMTC, may be multiplexed and transmitted in a single system. In order to satisfy different requirements of the respective services, different transmission/reception techniques and transmission/reception parameters may be used between the services.

Hereinafter, a frame structure of a 5G system will be described with reference to the drawings. For the sake of descriptive convenience, a configuration of a 5G system will be described below as an example of a wireless communication to which the disclosure is applied, but the embodiments of the disclosure may also be applied in the same or similar manner to 5G or higher systems or other communication systems to which the disclosure is applicable.

It should be appreciated that the blocks in each flowchart and combinations of the flowcharts may be performed by one or more computer programs which include computer-executable instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g., a central processing unit (CPU)), a communication processor (CP, e.g., a modem), a graphical processing unit (GPU), a neural processing unit (NPU) (e.g., an artificial intelligence (AI) chip), a wireless-fidelity (Wi-Fi) chip, a Bluetooth™ chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an IC, or the like.

FIG. 1 illustrates a basic structure of a time-frequency domain as a radio resource domain in a wireless communication system according to an embodiment of the disclosure.

Referring to FIG. 1, the horizontal axis denotes a time domain, and the vertical axis denotes a frequency domain. The basic unit of resources in the time-frequency domain is a resource element (RE) 101, which may be defined as one orthogonal frequency division multiplexing (OFDM) symbol (or discrete Fourier transform spread OFDM (DFT-s-OFDM) symbol) 102 on the time axis and one subcarrier 103 on the frequency axis. In the frequency domain, $$N_{SC}^{RB}$$

(indicating the number of subcarriers per resource block (RB), for example, 12) consecutive Res may constitute one RB 104. Also in the time domain, $$N_{symb}^{subframe,\mu}$$

(indicating the number of symbols per subframe according to subcarrier spacing configuration values p) consecutive OFDM symbols may constitute one subframe 110.

Figure 2:
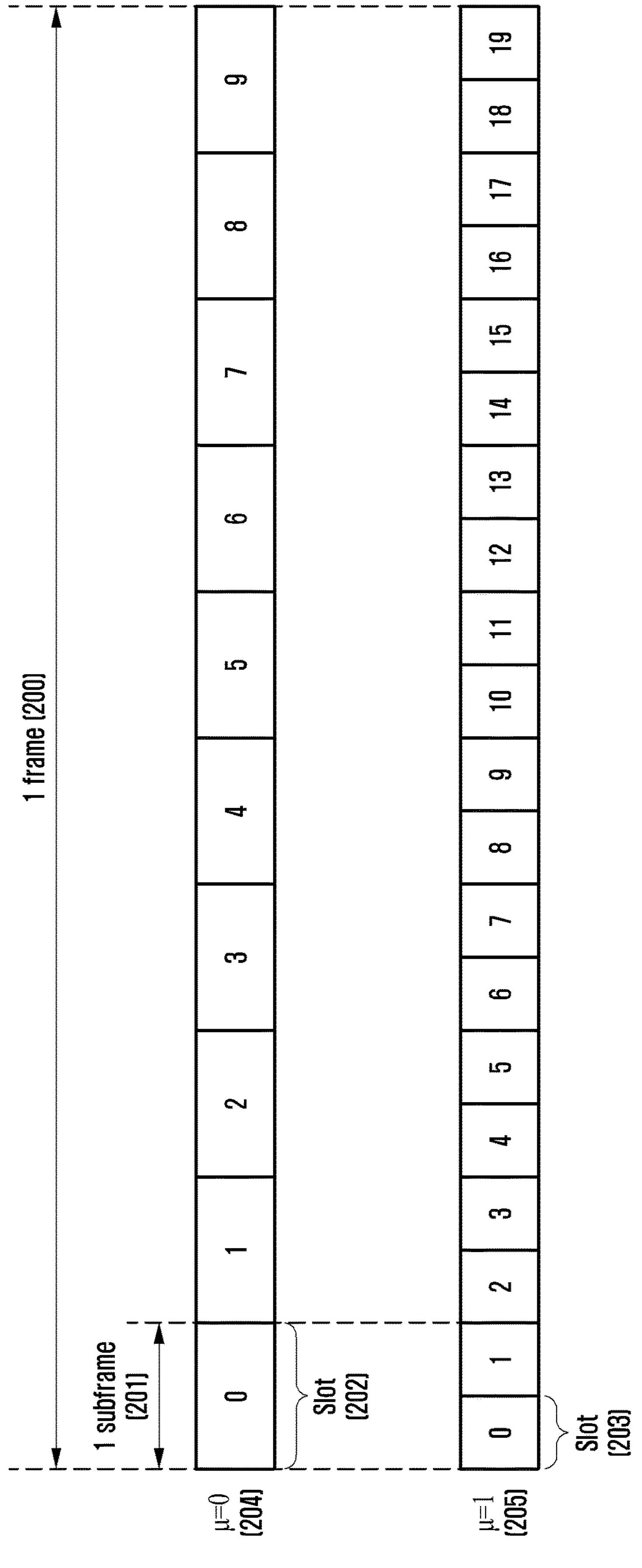
FIG. 2 illustrates a slot structure considered in a wireless communication system according to an embodiment of the disclosure.

FIG. 2 illustrates a slot structure considered in a wireless communication system according to an embodiment of the disclosure.

Referring to FIG. 2, an example of a slot structure including a frame 200, a subframe 201, and a slot 202 is illustrated. One frame 200 may be defined as 10 ms. One subframe 201 may be defined as 1 ms, and thus one frame 200 may include a total of 10 subframes 201. One slot 202 or 203 may be defined as 14 OFDM symbols (that is, the number of symbols per one slot $$N_{symb}^{slot} = 14).$$

One subframe 201 may include one or multiple slots 202 and 203, and the number of slots 202 and 203 per one subframe 201 may differ depending on a configuration values p 204 and 205 for the subcarrier spacing 204 or 205.

The slot structure is illustrated for a case in which the subcarrier spacing configuration value is μ=0 (204), and a case in which μ=1 (205). In the case of μ=0 (204), one subframe 201 may include one slot 202, and in the case of μ=1 (205), one subframe 201 may include two slots (for example, slots 203). For example, the number of slots per one subframe $$N_{slot}^{subframe,\mu}$$

may differ depending on the subcarrier spacing configuration value p, and the number of slots per one frame $$N_{slot}^{frame,\mu}$$

may differ accordingly. For example, $$N_{slot}^{subframe,\mu}$$

and $$N_{slot}^{frame,\mu}$$

may be defined according to each subcarrier spacing configuration p as in Table 1 below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |
| 6 | 14 | 640 | 64 |

In a 5G wireless communication system, a synchronization signal block (SS block, SSB) (which may be interchangeably used with SS/PBCH block) may be transmitted for initial access of a UE and the synchronization signal block may include a primary synchronization signal (PSS), a secondary synchronization signal (SSS), and a physical broadcast channel (PBCH).

In an initial access stage at which the UE accesses a system, the UE may first perform cell search to obtain downlink time and frequency domain synchronization and a cell identification (ID) from a synchronization signal. The synchronization signal may include a PSS and an SSS. The UE may receive a PBCH for transmitting a master information block (MIB) from a base station to obtain a basic parameter value and system information related to transmission/reception, such as a system bandwidth or relevant control information. Based on the information, the UE may decode a physical downlink control channel (PDCCH) and a physical downlink shared channel (PDSCH) to obtain a system information block (SIB). Thereafter, the UE may exchange identification-related information of the UE with the base station through a random access stage, and may initially access a network through registration and authentication stages. Additionally, the UE may receive an SIB transmitted from the base station to obtain cell-common control information related to transmission/reception. The cell-common control information related to transmission/reception may include random access-related control information, paging-related control information, common control information for various physical channels, and the like.

The synchronization signal corresponds to a signal serving as a reference of cell search, and may have a subcarrier spacing suitable for a channel environment, such as, phase noise, applied thereto for each frequency band. In a case of a data channel or a control channel, different subcarrier spacings may be applied to support various services as described above, depending on a service type.

Figure 3:
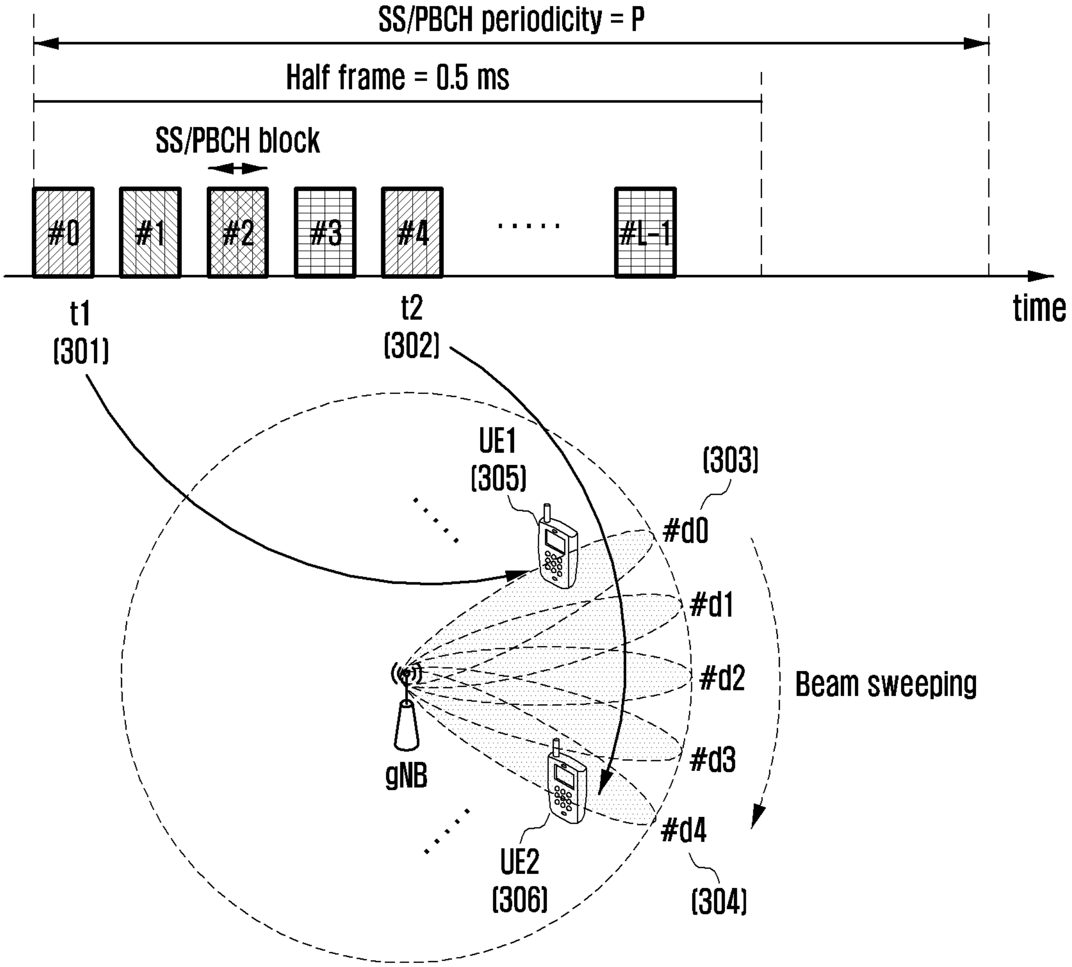
FIG. 3 is a view illustrating a time domain mapping structure of a synchronization signal and a beam sweeping operation in a wireless communication system according to an embodiment of the disclosure.

FIG. 3 is a view illustrating a time domain mapping structure of a synchronization signal and a beam sweeping operation in a wireless communication system according to an embodiment of the disclosure.

For description purpose, components may be defined as follows.

Primary synchronization signal (PSS): A PSS is a signal serving as a reference of DL time/frequency synchronization and provides partial information of a cell ID.

Secondary synchronization signal (SSS): An SSS is a signal serving as a reference of DL time/frequency synchronization and provides remaining information of the cell ID. Additionally, the SSS may serve as a reference signal for demodulation of a PBCH.

PBCH: A PBCH provides master information block (MIB) which is essential system information required for transmission/reception of a data channel and a control channel by a UE. The essential system information may include information, such as search space-related control information indicating wireless resource mapping information of a control channel, scheduling control information for a separate data channel transmitting system information, and a system frame number (SFN) which is a frame unit index serving as a timing reference.

Synchronization Signal (SS)/PBCH Block (SSB): An SS/PBCH block is configured by N OFDM symbols, and includes a combination of a PSS, an SSS, and a PBCH or the like. In a system to which a beam sweeping technology is applied, the SS/PBCH block is a minimum unit to which beam sweeping is applied. Here, N=4 in the 5G system. A base station may transmit a maximum of L SS/PBCH blocks to a UE, and L SS/PBCH blocks are mapped in a half frame (0.5 ms). L SS/PBCH blocks are periodically repeated in units of a predetermined period P. The base station may notify the UE of period P through signaling. If there is no separate signaling with respect to period P, the UE applies a pre-promised default value.

Referring to FIG. 3, it shows an embodiment in which beam sweeping is applied in a unit of an SS/PBCH block over time. In the embodiment in FIG. 3, UE 1 305 receives an SS/PBCH block by using a beam emitted in a direction of #d0 303 by beamforming applied to SS/PBCH block #0 at time point t1 301. UE 2 306 receives an SS/PBCH block by using a beam emitted in a direction of #d4 304 by beamforming applied to SS/PBCH block #4 at time point t2 302. The UE may obtain an optimum synchronization signal through a beam emitted in a direction in which the UE is located from the base station. For example, UE 1 305 may have difficulty obtaining time/frequency synchronization and essential system information from an SS/PBCH block through a beam emitted in a direction of #d4 away from a location of UE 1.

In addition to the initial access procedure, the UE may receive an SS/PBCH block to determine whether a radio link quality of a current cell is maintained at a predetermined level or higher. In addition, the UE may determine the radio link quality of a neighboring cell in a handover procedure for the UE to move from the current cell to the neighboring cell, and may receive an SS/PBCH block of the neighboring cell to obtain time/frequency synchronization with the neighboring cell.

Hereinafter, an initial cell access operation procedure of a 5G wireless communication system will be described with reference to the drawings.

The synchronization signal corresponds to a signal serving as a reference of cell search, and may be transmitted with a subcarrier spacing suitable for a channel environment (e.g., phase noise) applied thereto for each frequency band. A 5G base station may transmit multiple synchronization signal blocks to a UE according to the number of analog beams to be operated thereby. For example, a PSS and an SSS may be mapped and transmitted over 12 RBs, and a PBCH may be mapped and transmitted over 24 RBs. A structure in which a synchronization signal and a PBCH are transmitted in a 5G communication system will be described below.

Figure 4:
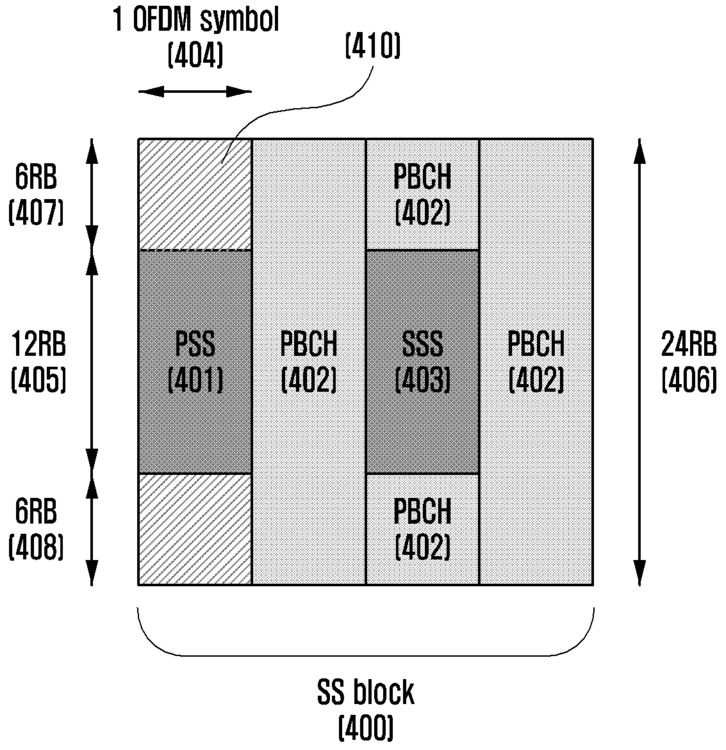
FIG. 4 is a view illustrating a synchronization signal block considered in a wireless communication system according to an embodiment of the disclosure.

FIG. 4 is a view illustrating a synchronization signal block considered in a wireless communication system according to an embodiment of the disclosure.

Referring to FIG. 4, an SS block 400 may include a PSS 401, an SSS 403, and a PBCH (broadcast channel) 402.

The synchronization signal block 400 may be mapped to four OFDM symbols 404 in the time domain. The PSS 401 and the SSS 403 may be transmitted in 12 RBs 405 in the frequency domain and in a 1st OFDM symbol and a 3rd OFDM symbol in the time domain, respectively. In a 5G system, a total of 1008 different cell IDs may be defined. Depending on a physical cell ID (PCI) of a cell, the PSS 401 may have three different values, and the SSS 403 may have 336 different values. A UE may obtain one of cell IDs of 1008 (=336X3) combinations through detection with respect to the PSS 401 and the SSS 403. The description above may be expressed by Equation 1 below.

$$N_{ID}^{cell} = 3N_{ID}^{(1)} + N_{ID}^{(2)} \quad \text{Equation 1}$$

Here, $$N_{ID}^{(1)}$$

may be estimated from the SSS 403 and may have a value from 0 to 335. In addition, $$N_{ID}^{(2)}$$

may be estimated from the PSS 401 and may have a value from 0 to 2. The UE may estimate a $$N_{ID}^{(cell)}$$

value corresponding to a cell ID, by using a combination of $$N_{ID}^{(1)} \text{ and } N_{ID}^{(2)}.$$

The PBCH 402 may be transmitted in a resource including six RBs 407 and 408 at both sides excluding 12 RBs 405 at the center, in which the SSS 403 is transmitted, from among 24 RBs 406 in the frequency domain and a 2nd OFDM symbol or a 4th OFDM symbol of the SS block in the time domain. The PBCH 402 may include a PBCH payload and a PBCH demodulation reference signal (DMRS), and the PBCH payload may allow various system information called MIB to be transmitted. For example, the MIB may include information as shown in Table 2 below.

TABLE 2

| | |
|---|---|
| MIB ::= | SEQUENCE { |
| systemFrameNumber | BIT STRING (SIZE (6)), |
| subCarrierSpacingCommon | ENUMERATED {scs15or60, scs30or120}, |
| ssb-SubcarrierOffset | INTEGER (0..15), |
| dmrs-TypeA-Position | ENUMERATED {pos2, pos3}, |
| pdcch-ConfigSIB1 | PDCCH-ConfigSIB1, |
| cellBarred | ENUMERATED {barred, notBarred}, |
| intraFreqReselection | ENUMERATED {allowed, notAllowed}, |
| spare | BIT STRONG (SIZE (1)) |
| } | |

Synchronization signal block information: An offset of an synchronization signal block in the frequency domain may be indicated by ssb-SubcarrierOffset having four bits in a MIB. An index of the synchronization signal block including the PBCH may be indirectly obtained through decoding a PBCH DMRS and the PBCH. In an embodiment of the disclosure, in a frequency band lower than 6 GHz, 3 bits obtained through decoding of the PBCH DMRS may indicate the synchronization signal block index, and in a frequency band of 6 GHz or higher, the total of six bits of 3 bits obtained through decoding of the PBCH DMRS and three bits included in the PBCH payload and obtained through PBCH decoding may indicate the index of the synchronization signal block including the PBCH.

Physical downlink control channel (PDCCH) configuration information: A subcarrier spacing of a common downlink control channel may be indicated through 1 bit (subCarrierSpacingCommon) in the MIB, and time-frequency resource configuration information of a control resource set (CORESET) and a search space may be indicated through 8 bits (pdcch-ConfigSIB1).

System frame number (SFN): Here, 6 bits (systemFrameNumber) in the MIB may be used to indicate a portion of a SFN. Least significant bits (LSBs) 4 bits of the SFN may be included in a PBCH payload to be indirectly obtained by a UE through PBCH decoding.

Timing information in a radio frame: A UE may indirectly identify whether the synchronization signal block is transmitted in 1st or 2nd half frame of the radio frame through 1 bit (half frame) included in the above-described synchronization signal block index and PBCH payload and obtained through PBCH decoding.

A transmission bandwidth (12 RBs) 405 of the PSS 401 and the SSS 403 and a transmission bandwidth (24 RBs) 406 of the PBCH 402 are different from each other, so that there may be six RBs 407 and 408 each at both sides when excluding 12 RBs at the center, in which the PSS 401 is transmitted, in the 1st OFDM symbol in which the PSS 401 is transmitted in the transmission bandwidth of the PBCH 402, and the area of two 6 bits may be used to transmit another signal or may be empty.

Synchronization signal blocks may be transmitted using the same analog beam. For example, the PSS 401, the SSS 403, and the PBCH 402 may all be transmitted through the same beam. There is a feature that the analog beam is not applicable differently in the frequency axis such that the same analog beam is applied in any frequency axis RB in a predetermined OFDM symbol to which a predetermined analog beam is applied. For example, four OFDM symbols in which the PSS 401, the SSS 403, and the PBCH 402 are transmitted may be transmitted through the same analog beam.

Figure 5:
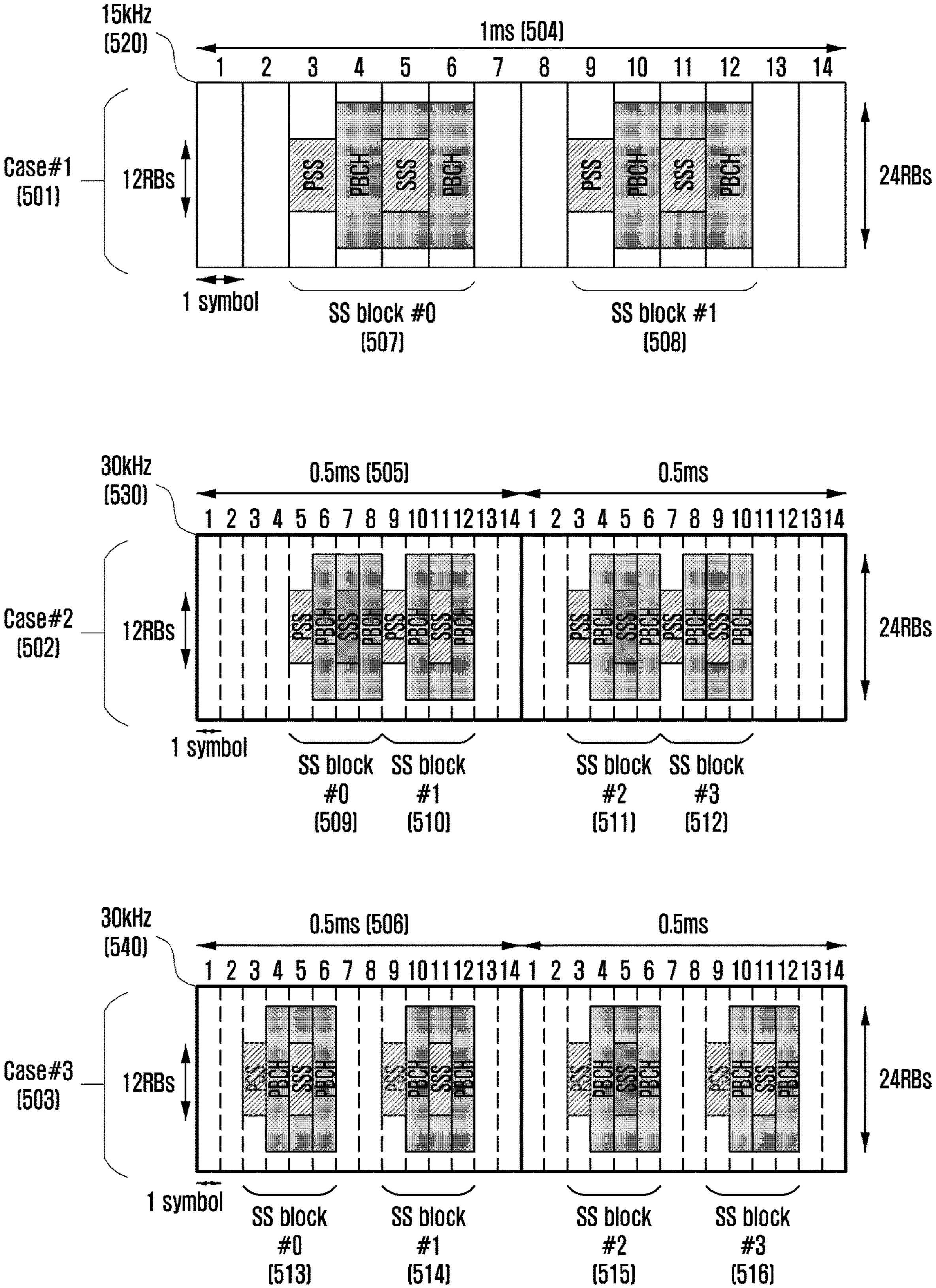
FIG. 5 is a view illustrating various transmission cases of a synchronization signal block in a frequency band below 6 GHz considered in a wireless communication system according to an embodiment of the disclosure.

FIG. 5 is a view illustrating various transmission cases of a synchronization signal block in a frequency band below 6 GHz considered in a communication system according to an embodiment of the disclosure.

Referring to FIG. 5, in the 5G communication system, a subcarrier spacing (SCS) of 15 kHz 520 and subcarrier spacings of 30 kHz 530 and 540 may be used for synchronization signal block transmission in the frequency band of 6 GHz or lower (or frequency range 1 FR1, e.g., 410 MHz-7125 MHz). In the subcarrier spacing of 15 kHz 520, one transmission case (e.g., case #1 501) of the synchronization signal block may exist, and in the subcarrier spacings of 30 kHz 530 and 540, two transmission cases (e.g., case #2 502 and case #3 503) of the synchronization signal block may exist.

In FIG. 5, in case #1 501 of the subcarrier spacing of 15 kHz 520, a maximum of two synchronization signal blocks may be transmitted within 1 ms 504 (or corresponding to a length of 1 slot in case that 1 slot includes 14 OFDM symbols). The example of FIG. 5 illustrates a synchronization signal block #0 507 and a synchronization signal block #1 508. For example, the synchronization signal block #0 507 may be mapped to four consecutive symbols starting from a 3rd OFDM symbol, and the synchronization signal block #1 508 may be mapped to four consecutive symbols starting from a 9th OFDM symbol.

Different analog beams may be applied to the synchronization signal block #0 507 and the synchronization signal block #1 508. In addition, the same beam may be applied to the 3rd to 6th OFDM symbols to which synchronization signal block #0 507 is mapped, and the same beam may be applied to the 9th to twelfth OFDM symbols to which synchronization signal block #1 508 is mapped. An analog beam to be used for the 7th, 8th, 13th, and 14th OFDM symbols to which no synchronization signal block is mapped may be freely determined under the determination of a base station.

In FIG. 5, in case #2 502 of the subcarrier spacing of 30 kHz 530, a maximum of two synchronization signal blocks may be transmitted within 0.5 ms 505 (or corresponding to a length of 1 slot in case that 1 slot includes 14 OFDM symbols) and accordingly, a maximum of 4 synchronization signal blocks may be transmitted within 1 ms (or corresponding to a length of 2 slots in case that 1 slot includes 14 OFDM symbols). The example of FIG. 5 shows a case in which a synchronization signal block #0 509, a synchronization signal block #1 510, a synchronization signal block #2 511, and a synchronization signal block #3 512 are transmitted within 1 ms (i.e., two slots). The synchronization signal block #0 509 and the synchronization signal block #1 510 may be mapped from a 5th OFDM symbol and the 9th OFDM symbol of a 1st slot, respectively, and the synchronization signal block #2 511 and synchronization signal block #3 512 may be mapped from a 3rd OFDM symbol and a 7th OFDM symbol of a 2nd slot, respectively.

Different analog beams may be applied to the synchronization signal block #0 509, the synchronization signal block #1 510, the synchronization signal block #2 511, and the synchronization signal block #3 512. The same analog beam may be applied to the 5th to the 8th OFDM symbols of the 1st slot through which synchronization signal block #0 509 is transmitted, the 9th to the 12th OFDM symbols of the 1st slot through which the synchronization signal block #1 510 is transmitted, the 3rd to the 6th symbols of the 2nd slot through which the synchronization signal block #2 511 is transmitted, and the 7th to the 10th symbols of the 2nd slot through which synchronization signal block #3 512 is transmitted. An analog beam to be used for OFDM symbols to which no synchronization signal block is mapped may be freely determined under the determination of a base station.

In FIG. 5, in case #3 503 of the subcarrier spacing of 30 kHz 540, a maximum of two synchronization signal blocks may be transmitted within 0.5 ms 506 (or corresponding to a length of 1 slot in case that 1 slot includes 14 OFDM symbols) and accordingly, a maximum of 4 synchronization signal blocks may be transmitted within 1 ms (or corresponding to a length of 2 slots in case that 1 slot includes 14 OFDM symbols). The example of FIG. 4 shows a case in which a synchronization signal block #0 513, a synchronization signal block #1 514, a synchronization signal block #2 515, and a synchronization signal block #3 516 are transmitted within 1 ms (i.e., two slots). The synchronization signal block #0 513 and the synchronization signal block #1 514 may be mapped from the 3rd OFDM symbol and the 9th OFDM symbol of the 1st slot, respectively, and the synchronization signal block #2 515 and synchronization signal block #3 516 may be mapped from the 3rd OFDM symbol and the 9th OFDM symbol of the 2nd slot, respectively.

Different analog beams may be used for the synchronization signal block #0 513, the synchronization signal block #1 514, the synchronization signal block #2 515, and the synchronization signal block #3 516. As described in the above examples, the same analog beam may be used in all four OFDM symbols through which the respective synchronization signal blocks are transmitted, and a beam to be used for the OFDM symbols to which no synchronization signal block is mapped may be freely determined under the determination of the base station.

Figure 6:
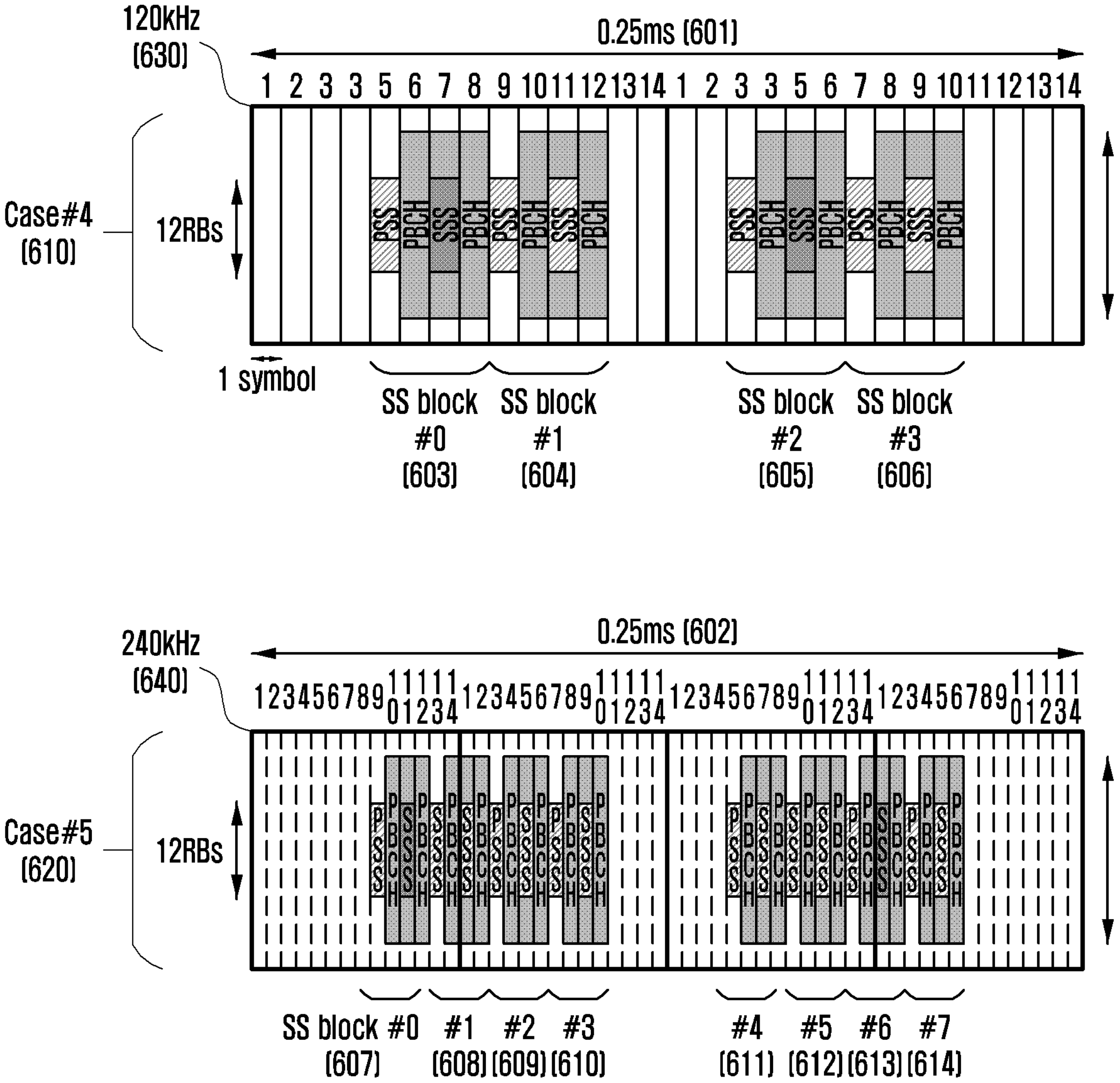
FIG. 6 is a view illustrating transmission cases of a synchronization signal block in a frequency band of 6 GHz or higher considered in a wireless communication system according to an embodiment of the disclosure.

FIG. 6 is a view illustrating transmission cases of a synchronization signal block in a frequency band of 6 GHz or higher considered in a wireless communication system according to an embodiment of the disclosure.

In the frequency band of 6 GHz or higher (or FR2, e.g., 24250 MHz-52600 MHz) in the 5G communication system, a subcarrier spacing of 120 kHz 630 as in the example of case #4 610 and a subcarrier spacing of 240 kHz 640 as in the example of case #5 620 may be used for synchronization signal block transmission.

In case #4 610 of the subcarrier spacing of 120 kHz 630, a maximum of 4 synchronization signal blocks may be transmitted within 0.25 ms 601 (or corresponding to a length of 2 slot in case that 1 slot includes 14 OFDM symbols). The example of FIG. 6 shows a case in which a synchronization signal block #0 603, a synchronization signal block #1 604, a synchronization signal block #2 605, and a synchronization signal block #3 606 are transmitted within 0.25 ms (i.e., two slots). The synchronization signal block #0 603 and the synchronization signal block #1 604 may be mapped to 4 consecutive symbols from a 5th OFDM symbol and a 9th OFDM symbol of a 1st slot, respectively, and the synchronization signal block #2 605 and synchronization signal block #3 606 may be mapped to 4 consecutive symbols from a 3rd OFDM symbol and a 7th OFDM symbol of a 2nd slot, respectively.

As shown in the embodiment described above, different analog beams may be used for the synchronization signal block #0 603, the synchronization signal block #1 604, the synchronization signal block #2 605, and the synchronization signal block #3 606. The same analog beam may be used in all four OFDM symbols through which the respective synchronization signal blocks are transmitted, and a beam to be used for the OFDM symbols to which no synchronization signal block is mapped may be freely determined under the determination of the base station.

In case #5 620 of the subcarrier spacing of 240 kHz 640, a maximum of 8 synchronization signal blocks may be transmitted within 0.25 ms 602 (or corresponding to a length of 4 slot in case that 1 slot includes 14 OFDM symbols). The example of FIG. 6 shows a case in which a synchronization signal block #0 607, a synchronization signal block #1 608, a synchronization signal block #2 609, a synchronization signal block #3 610, a synchronization signal block #4 611, a synchronization signal block #5 612, a synchronization signal block #6 613, and a synchronization signal block #7 614 are transmitted within 0.25 ms (i.e., 4 slots).

The synchronization signal block #0 607 and the synchronization signal block #1 608 may be mapped to 4 consecutive symbols from a 9th OFDM symbol and a 13th OFDM in a 1st slot, respectively, the synchronization signal block #2 609 and the synchronization signal block #3 610 may be mapped to 4 consecutive symbols from a 3rd OFDM symbol and a 7th OFDM in a 2nd slot, respectively, the synchronization signal block #4 611, the synchronization signal block #5 612, and the synchronization signal block #6 613 may be mapped to 4 consecutive symbols from a 5th OFDM symbol, a 9th OFDM, and a 13th in a 3rd slot, respectively, and the synchronization signal block #7 614 may be mapped to 4 consecutive symbols from a 3rd OFDM symbol in a 4th slot.

As shown in the embodiment described above, different analog beams may be used for the synchronization signal block #0 607, the synchronization signal block #1 608, the synchronization signal block #2 609, the synchronization signal block #3 610, the synchronization signal block #4 611, the synchronization signal block #5 612, the synchronization signal block #6 613, and the synchronization signal block #7 614. The same analog beam may be used in all four OFDM symbols through which the respective synchronization signal blocks are transmitted, and a beam to be used for the OFDM symbols to which no synchronization signal block is mapped may be freely determined under the determination of the base station.

Figure 7:
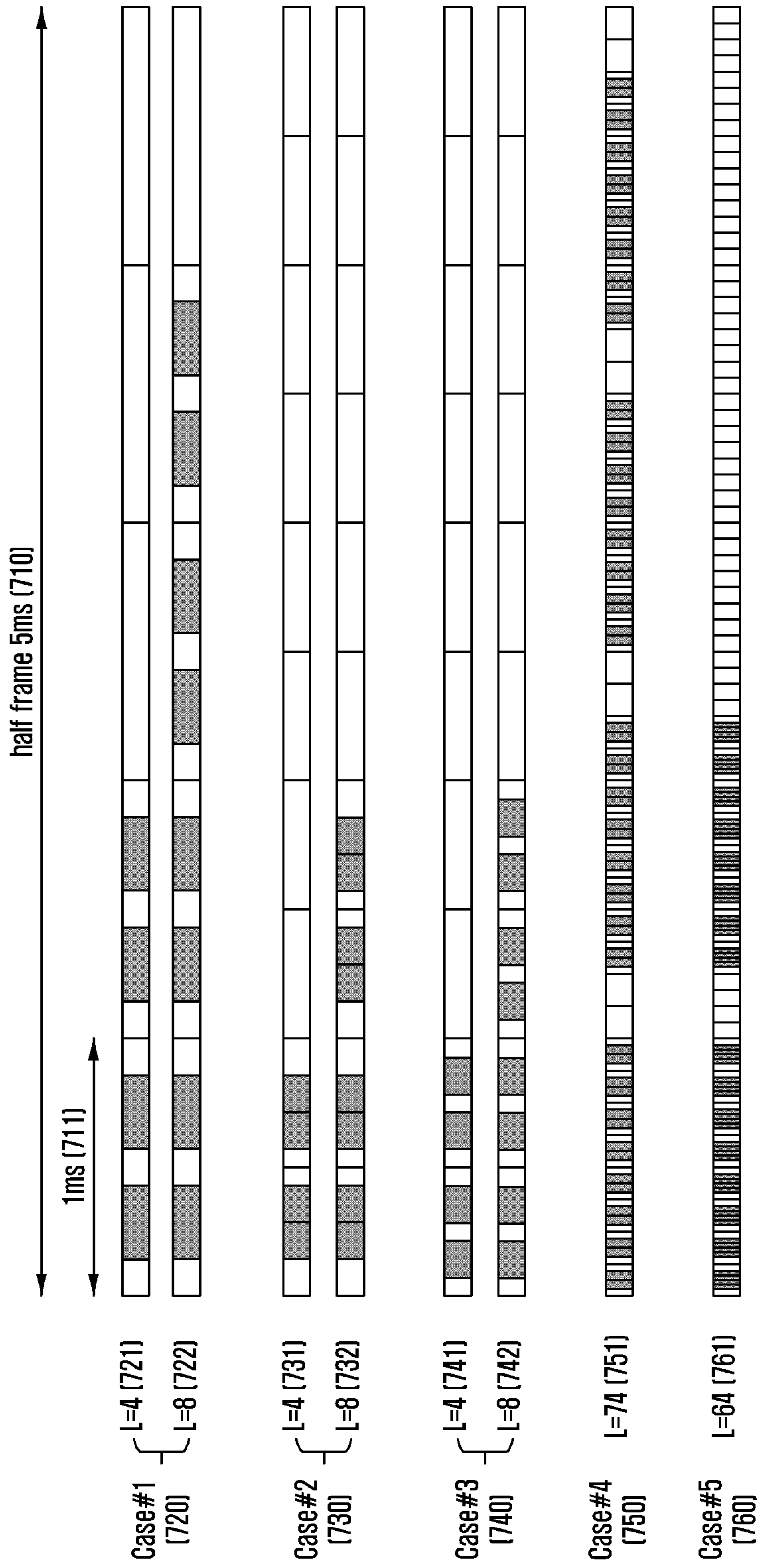
FIG. 7 is a view illustrating transmission cases of a synchronization signal block according to a subcarrier spacing within 5 ms time in a wireless communication system according to an embodiment of the disclosure.

FIG. 7 is a view illustrating transmission cases of a synchronization signal block according to a subcarrier spacing within 5 ms time in a wireless communication system according to an embodiment of the disclosure.

Referring to FIG. 7, in the 5G communication system, a synchronization signal block may be periodically transmitted, for example, at time interval of 5 ms 710 (corresponding to 5 subframes or half frame).

A maximum of 4 synchronization signal blocks may be transmitted within 5 ms 710 in a frequency band of 3 GHz or lower. A maximum of 8 synchronization signal blocks may be transmitted in a frequency band higher than 3 GHz and less than or equal to 6 GHz. A maximum of 64 synchronization signal blocks may be transmitted in a frequency band higher than 6 GHz. As described above, subcarrier spacings of 15 kHz and 30 kHz may be used in frequencies of 6 GHz or higher.

Referring to the embodiment of the FIG. 7, in case #1 501 of the subcarrier spacing of 15 kHz configured by 1 slot in FIG. 5, synchronization signal blocks may be mapped to a 1st slot and a 2nd slot in the frequency band of 3 GHz or lower and thus a maximum of 4 synchronization signal blocks 721 may be transmitted and synchronization signal blocks may be mapped to a 1st, 2nd, 3rd, and 4th slot and thus a maximum of 8 synchronization signal blocks 721 may be transmitted in the frequency band higher than 3 GHz and lower than or equal to 6 GHz. In case #2 502 or case #3 503 of the subcarrier spacing of 30 kHz configured by two slots in FIG. 5, synchronization signal blocks may be mapped to from the 1st slot in the frequency band of 3 GHz or lower and thus a maximum of 4 synchronization signal blocks 731 and 741 may be transmitted and synchronization signal blocks may be mapped to from the 1st and 3rd, and thus a maximum of 8 synchronization signal blocks 732 and 742 may be transmitted in the frequency band higher than 3 GHz and lower than or equal to 6 GHz.

Subcarrier spacings of 120 kHz and the 240 kHz may be used at frequencies higher than 6 GHz. In the embodiment of FIG. 6, in case #4 610 of the subcarrier spacing of 120 kHz configured by two slots of FIG. 6, synchronization signal blocks may be mapped to from the 1st, 3rd, 5th, 7th, 11th, 13th, 15th, 17th, 21st, 22nd, 25th, 27th, 31st, 33rd, 35th, and 37th slots in a frequency band higher than 6 GHz, and thus, a maximum of 64 synchronization signal blocks 751 may be transmitted. In the embodiment of FIG. 7, in case #5 620 of the subcarrier spacing of 240 kHz configured by 4 slots of FIG. 6, synchronization signal blocks may be mapped to from the 1st, 5th, 9th, 13th, 21st, 25th, 29th, and 33rd slots in a frequency band higher than 6 GHz, and thus, a maximum of 64 synchronization signal blocks 761 may be transmitted.

A UE may decode a PDCCH and a PDSCH, based on system information included in a received MIB and acquire an SIB. The SIB may include at least one of uplink cell bandwidth-related information, a random access parameter, a paging parameter, or an uplink power control-related parameter.

In general, a UE may generate a radio link with a network through a random access procedure, based on system information and synchronization with the network obtained in the cell search process of the cell. A contention-based or contention-free scheme may be used for random access. In case that the UE performs cell selection and reselection in an initial access stage of the cell, for example, contention-based random access scheme may be used for the purpose of state transition from the RRC_IDLE (RRC idle) state to the RRC_CONNECTED (RRC connection) state. Contention-free random access may be used in the case of arrival of downlink data, in the case of handover, or in the case of location measurement to re-establish uplink synchronization. Table 3 below exemplifies conditions (events) under which the random access procedure is triggered in the 5G system.

TABLE 3

| |
|---|
| - Initial access from RRC_IDLE; |
| - RRC Connection Re-estabilshment procedure; |
| - DL or UL data arrival during RRC_CONNECTED when UL synchronisation status is "non-synchronised"; |

TABLE 3-continued

| |
|---|
| - UL data arrival during RRC_CONNECTED when there are no PUCCH resources for SR available; |
| - SR failure; |
| - Request by RRC upon synchronous reconfiguration (e.g., handover); |
| - RRc Connection Resume procedure from RRC_INACTICE; |
| - To establish time alignment for a secondary TAG; |
| - Request for Other SI; |
| - Beam failure recovery; |
| - Consistent UL LBT failure on SpCell. |

Hereinafter, a measurement time configuration method for synchronization signal block (88 block or SSB)-based radio resource management (RRM) in the 5G wireless communication system will be described.

A UE may be configured with MeasObjectNR of MeasObjectToAddModList as a configuration for SSB-based intra/inter-frequency signal measurements (intra/inter-frequency measurements) and channel state information reference signal (CSI-RS)-based intra/inter-frequency measurements through higher layer signaling. For example, MeasObjectNR may be configured as in Table 4 below.

ssbFrequency: ssbFrequency may configure a frequency of a synchronization signal related to MeasObjectNR.

ssbSubcarrierSpacing: ssbSubcarrierSpacing may configure a subcarrier spacing of an SSB. In FR1, only 15 kHz or 30 kHz is applicable, and in FR2, only 120 kHz or 240 kHz is applicable.

smtc1: smtc1 indicates an SS/PBCH block measurement timing configuration, and may configure a primary measurement timing configuration and configure a timing offset and a duration for an SSB.

smtc2: smtc2 may configure a secondary measurement timing configuration for an SSB related to MeasObjectNR having a PCI listed in pci-List.

An smtc may also be configured through different higher layer signaling. For example, an smtc may also be configured for a UE through an SIB2 for intra-frequency, inter-frequency, or inter-radio access technology (RAT) cell reselection, or reconfigurationWithSync for NR PSCell change and NR PCell change, or an smtc may be configured for a UE through SCellConfig for NR SCell addition.

A UE may configure a first SS/PBCH block measurement timing configuration (SMTC) according to periodictiyAnd-

TABLE 4

```
  MeasObjectNR ::=                          SEQUENCE{
      ssbFrequency                        ARFCN-ValueNR
OPTIONAL, -- Cond SSBorAssociatedSSB
      ssbSubcarrierSpacing                        SubcarrierSpacing
OPTIONAL, -- Cond SSBorAssociatedSSB
      smtc1                                 SSB-MTC
OPTIONAL, -- Cond SSBorAssociatedSSB
      smtc2                                 SSB-MTC2
OPTIONAL, -- Cond IntraFreqConnected
      relFreqCSI-RS                           ARFCN-ValueNR
OPTIONAL, -- Cond CSI-RS
      referenceSignalConfig                     ReferenceSignalConfig,
      absThreshSS-BlocksConsolidation                     ThresholdNR
OPTIONAL, -- Need R
      absThreshCSI-RS-Consolidation                    ThresholdNR
OPTIONAL, -- Need R
      nrofSS-BlocksToAvergae                      INTEGER (2..maxNrofSS-
BlocksToAverage)                      OPTIONAL, -- Need R
      nrofCSI-RS-ResourcesToAverage                      INTEGER (2..maxNrofCSI-RS-
ResourcesToAverage)                   OPTIONAL, -- Need R
      quantityConfigIndex                       INTEGER (1..maxNrofQuantityConfig),
      offsetMO                               Q-OffsetRangeList,
      cellsToRemoveList                         PCI-List
OPTIONAL, -- Need N
      cellsToAddModList                           CellsToAddModList
OPTIONAL, -- Need N
      blackCellsToRemoveList                        PCI-RangeIndexList
OPTIONAL, -- Need N
      blackCellsToAddModList                          SEQUENCE (SIZE (1..maxNrofPCI-
Ranges)) OF PCI-RangeElement              OPTIONAL, -- Need N
      whiteCellsToRemoveList                        PCI-RangeIndexList
OPTIONAL, -- Need N
      whiteCellsToAddModList                          SEQUENCE (SIZE (1..maxNrofPCI-
Ranges)) OF PCI-RangeElement              OPTIONAL, -- Need N
      ...,
      [[
      freqBandIndicatorNR                        FreqBandIndicatorNR
OPTIONAL, -- Need R
measCycleSCell                           ENUMERATED {sf160, sf256, sf320,
sf512, sf640, sf1024, sf1280}            OPTIONAL, -- Need R
      ]],
      [[
      smtc3list-r16                          SSB-MTC3List-r16
OPTIONAL, -- Need R
      rmtc-Config-r16                      SetupRelease {RMTC-Config-r16}
OPTIONAL, -- Need M
      t312-r16                             SetupRelease { T312-r16 }
OPTIONAL, -- Need M
      ]]
  }
```

Offset (which provides periodicity and an offset) through smtc1 configured through higher layer signaling for SSB measurement. In an embodiment of the disclosure, a first subframe of each SMTC occasion may start at a subframe of an SpCell and a system frame number (SFN) satisfying a condition shown in Table 5 below.

TABLE 5

| |
|---|
| SFN mod T = (FLOOR (Offset/10));<br>if the Periodicity is larger than sf5:<br>subframe = Offset mod 10;<br>else:<br>subframe = Offset or (Offset +5);<br>with T = CEIL(Periodicity/10). |

If smtc2 is configured, a UE may configure, for cells indicated by pci-List values of smtc2 in the same MeasObjectNR, an additional SMTC according to an offset and a duration of smtc1 and a periodicity of the configured smtc2. In addition, a UE may be configured with an smtc through smtc2-LP (with long period) for the same frequency (e.g., a frequency for intra frequency cell reselection) or a different frequency (e.g., a frequency for inter frequency cell reselection) and smtc3list for integrated access and backhaul-mobile termination (IAB-MT), and measure an SSB. In an embodiment of the disclosure, a UE may not consider an SSB transmitted in subframes other than SMTC occasions for SSB-based RRM measurement in a configured ssbFrequency.

A base station may use various multi-transmit/receive point (TRP) operating methods depending on a serving cell configuration and a physical cell idnentifier (PCI) configuration. In case that two TRPs located physically away from each other have different PCIs, there may be two methods for operating the two TRPs.

[Operating Method 1]

Two TRPs having different PCIs may be operated by two serving cell configurations.

A base station may configure, through [Operating method 1], channels and signals transmitted from different TRPs to be included in different serving cell configurations. For example, each TRP may have an independent serving cell configuration, and FrequencyInfoDL, which indicates a frequency band value indicated by DownlinkConfigCommon in each serving cell configuration, may indicate at least some overlapping bands. The multiple TRPs operate based on multiple pieces of ServCellIndex (e.g., ServCellIndex #1 and ServCellIndex #2), and thus each TRP may use a separate PCI. For example, the base station may assign one PCI per ServCellIndex.

In this case, if multiple SSBs are transmitted from TRP 1 and TRP 2, the SSBs may have different PCIs (e.g., PCI #1 and PCI #2), and a base station may appropriately select a ServCellIndex value indicated by a cell parameter in QCL-Info, map a PCI suitable for each TRP thereto, and may designate an SSB transmitted from one of TRP 1 or TRP 2 as a source reference RS of QCL configuration information. However, the aforementioned configuration indicates a case of applying one serving cell configuration available for carrier aggregation (CA) of a UE to multiple TRPs, causing a problem that the freedom of CA configuration may be delimited or the burden of signaling may be increased.

[Operating Method 2]

Two TRPs having different PCIs may be operated using one serving cell configuration.

A base station may configure, through [Operating method 2], channels and signals transmitted from different TRPs through one serving cell configuration. A UE operates based on one ServCellIndex value (e.g., ServCellIndex #1), and thus may be unable to recognize a PCI (e.g., PCI #2) assigned to a second TRP. [Operating method 2] may have the freedom of CA configuration compared to [Operating method 1] described above, but when multiple SSBs are transmitted from TRP 1 and TRP 2, the SSBs may have different PCIs (e.g., PCI #1 and PCI #2), and the base station may be unable to map a PCI (e.g., PCI #2) of the second TRP through ServCellIndex indicated by a cell parameter in QCL-Info. The base station may be able to only designate an SSB transmitted from TRP 1 as a source reference RS of QCL configuration information, and may be unable to designate an SSB transmitted from TRP 2.

[Operating method 1] may perform multi-TRP operation with respect two TRPs having different PCIs through an additional serving cell configuration without additional specification support, and [Operating method 2] may operate based on an additional UE capability report and configuration information of a base station described below.

In relation to UE capability reporting for [Operating method 2]

- A UE may transmit, to a base station, a UE capability report indicating that a configuration for an additional PCI other than the PCI of a serving cell configured through higher layer signaling received from the base station is possible. Two independent numbers X1 and X2 may be included in the corresponding UE capability report, or each of X1 and X2 may be included in independent UE capability reports.
- X1 may indicate a maximum number of additional PCIs configurable to a UE, a PCI of the case may be different from a PCI of a serving cell, and the time domain position and the periodicity of an SSB corresponding to an additional PCI may be identical to those of an SSB of a serving cell in this case.
- X2 may indicate a maximum number of additional PCIs configurable to a UE, a PCI of the case may be different from a PCI of a serving cell, and the time domain position and the periodicity of an SSB corresponding to an additional PCI may be different from those of an SSB corresponding to a PCI reported as X1.
- According to the definitions, PCIs corresponding to values reported as X1 and X2 may not be simultaneously configured.
- Values reported as X1 and X2 through the UE capability report may each have an integer from 0 to 7.
- Values reported as X1 and X2 may have different values in FR1 and FR2.

In relation to higher layer signaling configuration for [Operating method 2]

- SSB-MTCAdditionalPCI-r17 corresponding to higher layer signaling may be configured to a UE from a base station, based on a UE capability report described above, the corresponding higher layer signaling may include multiple additional PCIs having values at least different from those of a serving cell, SSB transmission power corresponding to each additional PCI, and ssb-PositionInBurst corresponding to each additional PCI, and a maximum number of additional configurable PCI may be 7.
- A UE may assume that an SSB corresponding to an additional PCI having a value different from a serving cell has the same center frequency, subcarrier spacing, and subframe number offset as an SSB of the serving cell.

A UE may assume that a reference RS (e.g., SSB or CSI-RS) corresponding to the PCI of a serving cell is always connected to an activated transmission configuration indicator (TCI) state, and in case of an additional PCI having a value different from a serving cell, only one PCI among one or multiple additional PCIs is connected to an activated TCI state.

In case that a UE is configured with two different coresetPoolIndexs, a reference RS corresponding to a PCI of a serving cell is connected to one or multiple activated TCI states, and a reference RS corresponding to an additionally configured PCI having a value different from the serving cell is connected to one or multiple activated TCI states, the UE may expect that the activated TCI state(s) connected to the PCI of the serving cell may be connected to one of the two different coresetPoolIndexs and the activated TCI state(s) connected to the additionally configured PCI having a value different from the serving cell is connected to the remaining one coresetPoolIndex.

The UE capability reporting and the higher layer signaling of the base station for [Operating method 2] described above may configure an additional PCI having a value different from the PCI of the serving cell. In case that there is no aforementioned configuration, an SSB corresponding to an additional PCI having a value different from the PCI of the serving cell, which is unable to be designated as a source reference RS, may be used to be designated as a source reference RS of QCL configuration information. In addition, unlike an SSB configurable to be used for RRM, mobility, or handover, an SSB, such as configuration information for an SSB configurable in smtc1 and smtc2 corresponding to the higher layer signaling, an SSB corresponding to an additional PCI may be used to serve as a QCL source RS for supporting an operation for multiple TRPs having different PCIs.

Hereinafter, a DMRS corresponding to one of reference signals in the 5G system will be described below.

A DMRS may be configured by several DMRS ports, and each port may maintain orthogonality by using code division multiplexing (CDM) or frequency division multiplexing (FDM), so as not to generate mutual interference. However, terms for DMRSs may be replaced with different terms according to a user's intent and a purpose of using reference signals. The term "DMRS" is merely presented as a particular example to easily explain the technical features and help understanding of the disclosure and is not intended to limit the scope of the disclosure. For example, it will be apparent to those skilled in the art to which the disclosure belongs that it is possible to realize the disclosure for predetermined reference signals based on the technical spirit of the disclosure.

Figure 8:
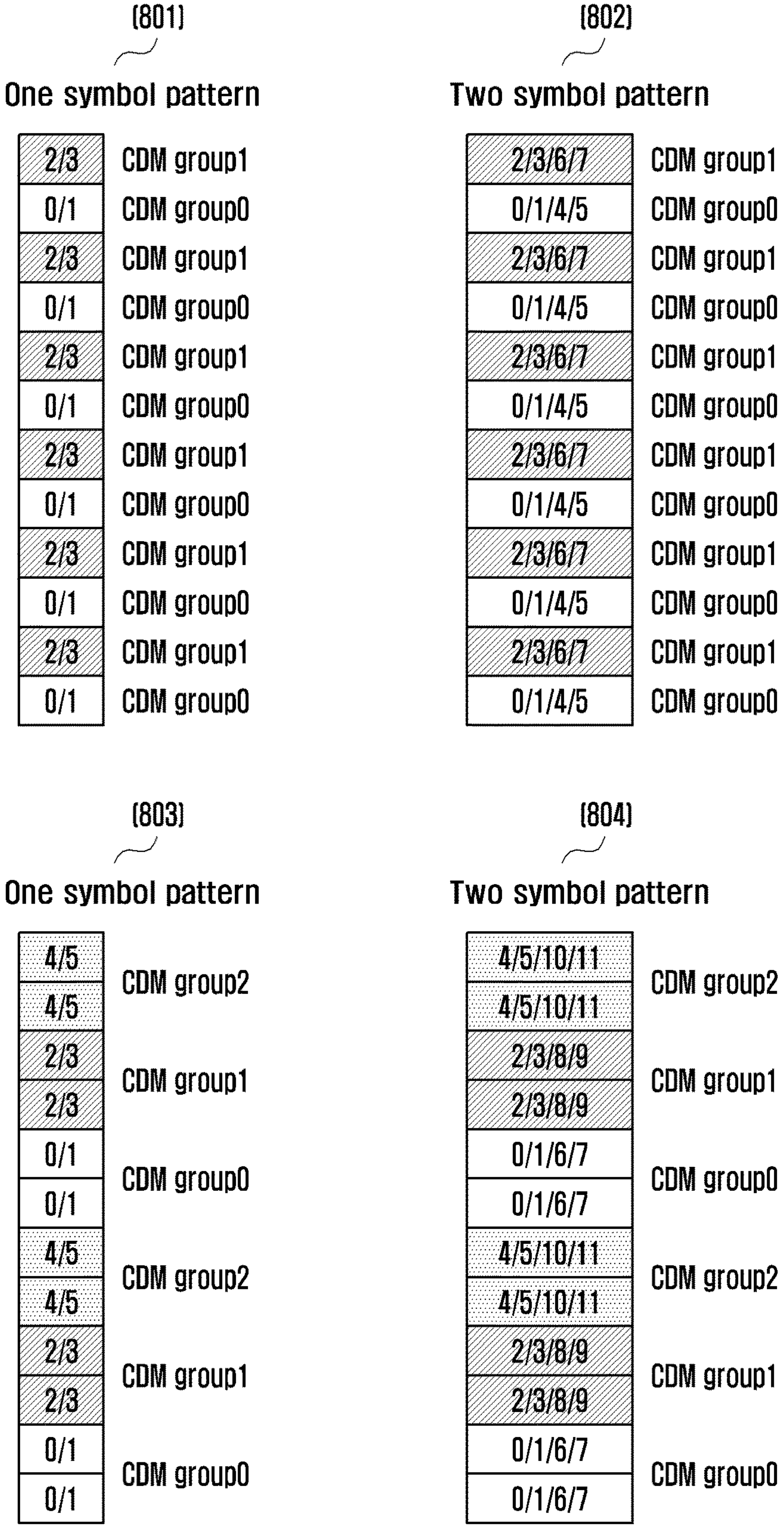
FIG. 8 is a view illustrating a demodulation reference signal (DMRS) pattern (type 1 and type 2) used for communication between a base station and a UE in a wireless communication system according to an embodiment of the disclosure.

FIG. 8 is a view illustrating a DMRS pattern (type 1 and type 2) used for communication between a base station and a UE in a wireless communication system according to an embodiment of the disclosure. Two DMRS patterns may be supported in the 5G system. FIG. 8 shows two DMRS patterns.

Referring to FIG. 8, reference numerals 801 and 802 may correspond to DMR ⌊ type 1, reference numeral 801 indicates a 1-symbol pattern, and reference numeral 802 indicates a 2-symbol pattern. DMRS type 1 of reference numerals 801 and 802 corresponds to a DMRS pattern having a comb-2 structure and may be configured by two CDM groups, and FDM may be performed on different CDM groups.

In the 1-symbol pattern 801, CDM may be applied to the same CDM group in the frequency domain so that two DMRS ports may be distinguished, and a total of 4 orthogonal DMRS ports may be configured. The 1-symbol pattern 801 may include a DMRS port ID mapped to each CDM group (a DMRS port ID with respect to downlink may be represented by a number+1000 as shown). In the 2-symbol pattern 802, CDM may be applied to the same CDM group in the time/frequency domain so that 4 DMRS ports may be distinguished, and a total of 8 orthogonal DMRS ports may be configured. The 2-symbol pattern 802 may include a DMRS port ID mapped to each CDM group (a DMRS port ID with respect to downlink may be represented by a number+1000 as shown).

DMRS type 2 indicated as reference numerals 803 and 804 corresponds to a DMRS pattern having a structure in which frequency domain orthogonal cover codes (FD-OCCs) are applied to neighboring subcarriers in the frequency domain, and may include three CDM groups, and FDM may be performed on different CDM groups.

In the 1-symbol pattern 803, CDM may be applied to the same CDM group in the frequency domain so that two DMRS ports may be distinguished, and a total of 6 orthogonal DMRS ports may be configured. The 1-symbol pattern 803 may include a DMRS port ID mapped to each CDM group (a DMRS port ID with respect to downlink may be represented by a number+1000 as shown). In the 2-symbol pattern 704, CDM may be applied to the same CDM group in the time/frequency domain so that 4 DMRS ports may be distinguished, and a total of 12 orthogonal DMRS ports may be configured. The 2-symbol pattern 804 may include a DMRS port ID mapped to each CDM group (a DMRS port ID with respect to downlink may be represented by a number+1000 as shown).

As described above, in the NR system, two different DMRS patterns (e.g., the DMRS patterns 801 and 802 or the DMRS patterns 803 and 804) may be configured, and it may be also configured whether each DMRS pattern is the 1-symbol pattern (one symbol pattern) 801 or 803, or the adjacent 2-symbol pattern (two symbol pattern) 802 or 804. In addition, in the NR system, a DMRS port number is scheduled, and the number of CDM groups scheduled together for PDSCH rate matching may be configured and signaled, as well. In addition, in a case of cyclic prefix based orthogonal frequency division multiplexing (CP-OFDM), the two DMRS patterns described above may be supported in DL and UL, and in a case of discrete Fourier transform spread OFDM (DFT-S-OFDM), only DMRS type 1 among the DMRS patterns described above may be supported in UL.

Furthermore, an additional DMRS may be supported to be configurable. A front-loaded DMRS may indicate a first DMRS transmitted or received in the foremost symbol in the time domain among DMRSs, and an additional DMRS may indicate a DMRS transmitted or received in a symbol after the front-loaded DMRS in the time domain. In the NR system, the number of additional DMRSs may be configured as one among 0 to 3. In addition, in case that an additional DMRS is configured, the additional DMRS may be assumed to have the same pattern as a front-loaded DMRS. In an embodiment of the disclosure, when information related to whether the above-described DMRS pattern type is type 1 or type 2, information related to whether the DMRS pattern is a 1-symbol pattern or an adjacent 2-symbol pattern, and information on the DMRS ports and the number of CDM groups are indicated with respect to a front-loaded DMRS, in a case where an additional DMRS is configured, it may be assumed that the same DMRS information as the front-loaded DMRS is configured for the additional DMRS.

In an embodiment of the disclosure, a downlink DMRS configuration as described above may be configured through radio resource control (RRC) signaling as shown in Table 6 below.

TABLE 6

```
  DMRS-DownlinkConfig ::=            SEQUENCE {
  dmrs-Type                   ENUMERATED {type2}        OPTIONAL, -- Need S
    dmrs-AdditionalPosition          ENUMERATED {pos0, pos1, pos3}
OPTIONAL, -- Need S
    maxLength                  ENUMERATED {len2}        OPTIONAL, -- Need S
  scramblingID0                INTEGER (0..65535)       OPTIONAL, -- Need S
  scramblingID0                INTEGER (1..65535)       OPTIONAL, -- Need S
  phaseTrackingRS                SetupRelease {PTRS-DownlinkConfig} OPTIONAL,
-- Need M
      ...
  }
```

Here, dmrs-Type may configure a DMRS type, dmrs-AdditionalPosition may configure additional DMRS OFDM symbols, maxLength may configure a 1-symbol DRMS pattern or a 2-symbol DMRS pattern, scramblingeID0 and scramblingID1 may configure scrambling IDs, and phase-TrackingRS may configure a phase tracking reference signal (PTRS).

Furthermore, an uplink DMRS configuration as described above may be configured through RRC signaling as shown in Table 7 below.

TABLE 7

```
  DMRS-UplinkConfig ::=              SEQUENCE {
    dmrs-Type                 ENUMERATED {type2}              OPTIONAL, -- Need S
    dmrs-AdditionalPosition          ENUMERATED {pos0, pos1, pos3}
OPTIONAL, -- Need R
    phaseTrackingRS              SetupRelease { PTRS-UplinkConfig }
OPTIONAL, -- Need M
    maxLength                 ENUMERATED {len2}               OPTIONAL, --
Need S
    transformPrecodingDisabled   SEQUENCE {
      scramblingID0            INTEGER (0..65535)              OPTIONAL, --
Need S
      scramblingID0            INTEGER (1..65535)              OPTIONAL, --
Need S
      ...
    }                                                       OPTIONAL, -- Need R
    transformPrecodingEnabled   SEQUENCE {
      nPUSCH-Identity            INTEGER (0..1007)              OPTIONAL, --
Need S
      sequenceGroupHopping          ENUMERATED (disabled}
OPTIONAL, -- Need S
      sequenceHopping            ENUMERATED {enabled}             OPTIONAL,
-- Need S
      ...
    }                                                       OPTIONAL, -- Need R
    ...
  }
```

Here, dmrs-Type may configure a DMRS type, dmrs-AdditionalPosition may configure additional DMRS OFDM symbols, phaseTrackingRS may configure a PTRS, and maxLength may configure a 1-symbol DRMS pattern or a 2-symbol DMRS pattern. In addition, scramblingID0 and scramblingID1 may configure scrambling ID0s, nPUSCH-Identity may configure a cell ID for DFT-s-OFDM, sequenceGroupHopping may disable sequence group hopping, and sequenceHopping may enable sequence hopping.

Figure 9:
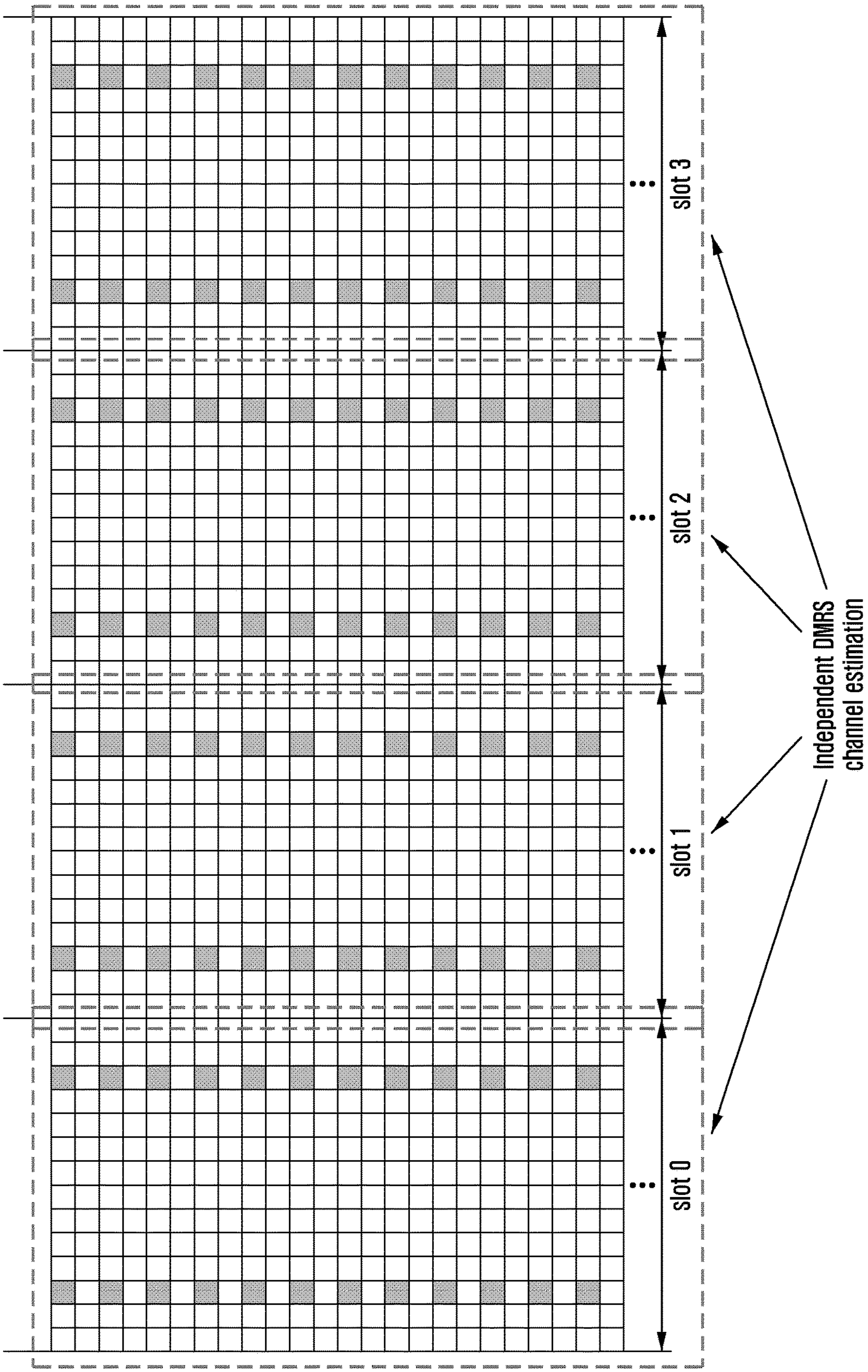
FIG. 9 is a view illustrating channel estimation using a DMRS received in one physical uplink shared channel (PUSCH) in a time band of a wireless communication system according to an embodiment of the disclosure.

FIG. 9 is a view illustrating channel estimation using a DMRS received in one PUSCH in a time band of a wireless communication system according to an embodiment of the disclosure.

Referring to FIG. 9, in a case of performing channel estimation using a DMRS for data decoding, the channel estimation may be performed in a precoding resource block group (PRG), which is a unit of bundling thereof, by using bundling of physical resource blocks (PRBs) linked to a system band in the frequency domain. In addition, in the time domain, channel estimation may be performed under the assumption that precoding is the same for only DMRSs received in one PUSCH.

Hereinafter, a time domain resource allocation (TDRA) method for a data channel in a 5G system will be described. A base station may configure a time domain resource allocation information table for a physical downlink shared channel (PDSCH) and a physical uplink shared channel (PUSCH) for a UE through upper layer signaling (for example, RRC signaling).

The time domain resource allocation information may include at least one of PDCCH-to-PDSCH slot timing (corresponding to a slot-unit time interval between a timepoint at which a PDCCH is received and a timepoint at which a PDSCH scheduled by the received PDCCH is transmitted, labeled KO), PDCCH-to-PUSCH slot timing (corresponding to a slot-unit time interval between a timepoint at which a PDCCH is received and a timepoint at which a PUSCH scheduled by the received PDCCH is transmitted, labeled K2), information regarding the location and length of the start symbol by which a PDSCH or PUSCH is scheduled inside a slot, and the mapping type of a PDSCH or PUSCH.

In an embodiment of the disclosure, the time domain resource allocation information for the PDSCH, as given in Table 8 below, may be configured to the UE through RRC signaling.

TABLE 8

PDSCH-TimeDomainResourceAllocationList information element

```
PDSCH-TimeDomainResourceAllocationList :: = SEQUENCE
(SIZE(1..maxNrofDL-Allocations)) OF PDSCH-TimeDomainResourceAllocation
PDSCH-TimrDomainResourceAllocation ::= SEQUENCE {
  k0                    INTEGER(0..32)       OPTIONAL, -- Need S
    mappingType              ENUMERATED {typeA, typeB},
    startSymbolAndLength          INTEGER (0..127)
    repetitionNumber             ENUMERATED {n2, n3, n4, n5, n6, n7, n8, n16}
OPTIONAL, -- Cond Formats1-0and1-1
}
```

In Table 8, ko may denote PDCCH-to-PDSCH timing (i.e., a slot offset between DCI and a PDSCH scheduled thereby) in slot unit, mappingType may denote the mapping type of the PDSCH, startSymbolAndLength may denote a start symbol of the PDSCH and the length thereof, and repetitionNumber may denote the number of transmission occasions of the PDSCH according to slot-based repetition schemes.

In an embodiment of the disclosure, the time domain resource allocation information for the PUSCH, as given in Table 9 below, may be configured to the UE through RRC signaling.

TABLE 9

PUSCH-TimeDomainResourceAllocation information element

```
PUSCH-TimeDomainResourceAllocationList ::= SEQUENCE
(SIZE(1..maxNrofUL-Allocations)) OF PUSCH-TimeDomainResourceAllocation
PUSCH-TimeDomainResourceAllocation ::= SEQUENCE {
  k2                    INTEGER(0..32)              OPTIONAL, -- Need S
    mappingType              ENUMERATED {typeA, typeB},
  startSymbolAndLength           INTEGER (0..127)
}
PUSCH-Allocation-r16 ::=         SEQUENCE {
  mappingType-r16          ENUMERATED {typeA, typeB}          OPTIONAL, --
Cond NotFormat01-02-Or-TypeA
  startSymbolAndLength-r16 INTEGER (0..127)                 OPTIONAL, -- Cond
NotFormat01-02-Or-TypeA
  startSymbol-r16          INTEGER (0..13)               OPTIONAL, -- Cond RepTypeB
  length-r16            INTEGER (0..14)               OPTIONAL, -- Cond RepTypeB
  numberOfRepetitions-r16 ENUMERATED {n1, n2, n3, n4, n7, n8, n12, n16}
OPTIONAL, -- Cond Format01-02
  ...
}
```

In Table 9, k2 may denote PDCCH-to-PUSCH timing (i.e., a slot offset between DCI and a PUSCH scheduled thereby) in slot unit, mappingType may denote the mapping type of the PUSCH, startSymbolAndLength or StartSymbol and length may denote a start symbol of the PUSCH and the length thereof, and numberOfRepetitions may denote the number of repetitions applied to transmission of the PUSCH.

The base station may notify the UF of at least one of the entries of the time domain resource allocation information table described above through L1 signaling (e.g., downlink control information (DCI)) (for example, may be indicated by "time domain resource allocation" field inside DCI). The UE may acquire time domain resource allocation information for the PDSCH or PUSCH, based on the DCI received from the base station.

Hereinafter, uplink data channel (physical uplink shared channel (PUSCH)) transmission will be described. PUSCH transmission may be dynamically scheduled by a UL grant inside DCI (for example, referred to as dynamic grant (DG)-PUSCH), or may be scheduled by means of configured grant Type 1 or Type 2. (for example, referred to as configured grant (CG)-PUSCH). Dynamic scheduling for PUSCH transmission may be indicated by DCI format 0_0 or 0_1.

Configured grant Type 1 PUSCH transmission may be configured semi-statically by receiving configuredGrant-Config including rrc-ConfiguredUplinkGrant in Table 10 through upper signaling, without receiving a UL grant inside DCI. Configured grant Type 2 PUSCH transmission may be scheduled semi-persistently by a UL grant inside DCI after receiving configuredGrantConfig not including rrc-ConfiguredUplinkGrant in Table 10 through upper signaling.

In an embodiment of the disclosure, if PUSCH transmission is scheduled by a configured grant, parameters applied to the PUSCH transmission may be configured through configuredGrantConfig (upper signaling) in Table 10, except for dataScramblingIdentityPUSCH, txConfig, codebook-Subset, maxRank, and scaling of UCI-OnPUSCH, which are provided by pusch-Config (upper signaling) in Table 11. For example, if provided with transformPrecoder inside configuredGrantConfig (upper signaling) in Table 10, the UE may apply tp-pi2BPSK inside pusch-Config in Table 11 to PUSCH transmission operated by a configured grant.

TABLE 10

ConfiguredGrantConfig

```
ConfiguredGrantConfig ::=                          SEQUENCE {
  frequencyHopping                         ENUMERATED {intraSlot, interSlot}                    OPTIONAL,
-- Need S,
  cg-DMRS-Configuration                          DMRS-UplinkConfig,
  mcs-Table                            ENUMERATED {qam256, qam64LowSE}                          OPTIONAL,
-- Need S
  mcs-TableTransformPrecoder ENUMERATED {qam256, qam64LowSE}
OPTIONAL, -- Need S
  uci-OnPUSCH                          SetupRelease { CG-UCI-OnPUSCH }                    OPTIONAL,
-- Need M
  resourceAllocation                   ENUMERATED { resourceAllocationType0,
resourceAllocationType1, dynamicSwitch },
  rbg-Size                             ENUMERATED {config2}                         OPTIONAL,
-- Need S
  powerControlLoopToUse                          ENUMERATED {n0, n1},
  p0-PUSCH-Alpha                           P0-PUSCH-AlphaSetId,
  transformPrecoder                        ENUMERATED {enabled, disabled}                   OPTIONAL,
-- Need S
  nrofHARQ-Processes                         INTEGER(1..17),
  repK                                 ENUMERATED {n1, n2, n4, n8},
  repK-RV                              ENUMERATED {s1-0221, s2-0303, s3-0000}               OPTIONAL,
-- Need R
  periodicity                          ENUMERATED {
  sym2, sym7, sym1x14, sym2x14, sym4x14, sym5x14, sym8x14, smy10x14,
sym17x14, sym20x14,
  sym32x14, sym40x14, sym64x14, sym80x14, sym128x14, sym170x14,
sym256x14, sym320x14, sym512x14,
  sym640x14, sym1024x14, sym1280x14, sym2560x14, sym5120x14,
  sym6, sym1x12, sym2x12, sym4x12, sym5x12, sym8x12, sym10x12, sym17x12,
sym20x12, sym32x12,
  sym40x12, sym64x12, sym80x12, sym128x12, sym170x12, sym256x12,
sym320x12, sym512x12, sym640x12,
  sym1280x12, sym2560x12
  },
  configuredGrantTimer                         INTEGER (1..64)                        OPTIONAL,
-- Need R
  rrc-ConfiguredUplinkGrant                      SEQUENCE {
    timeDomainOffset                               INTEGER(0..5119),
    timeDomainAllocation                             INTEGER (0..16),
    frequencyDomainAllocation                            BIT STRING (SIZE(18)),
    antennaPort                                  INTEGER (0..31),
    dmrs-SeqInitialization                           INTEGER (0..1)              OPTIONAL,
-- Need R
    precodingAndNumberOfLayers INTEGER (0..63),
    srs-ResourceIndicator                            INTEGER (0..16)             OPTIONAL,
-- Need R
    mcsAndYBS                                    INTEGER (0..31),
    frequencyHoppingOffset                         INTEGER (1.. maxNrofPhysicalResourceBlocks-
1) OPTIONAL, -- Need R
    pathlossReferenceIndex                           INTEGER (0..maxNrofPUSCH-
    PathlossReferenceRSs-1),
    ...
  }                                                    OPTIONAL, -- Need R
  ...
}
```

Next, a PUSCH transmission method will be described. The DMRS antenna port for PUSCH transmission is identical to an antenna port for SRS transmission. PUSCH transmission may follow a codebook-based transmission method and a non-codebook-based transmission method according to whether the value of txConfig inside pusch-Config in Table 7, which is upper signaling, is “codebook” or “nonCodebook”. As described above, PUSCH transmission may be dynamically scheduled through DCI format 0_0 or 0_1, and may be semi-statically configured by a configured grant.

Upon receiving indication of scheduling regarding PUSCH transmission through DCI format 0_0, the UE may perform beam configuration for PUSCH transmission by using pucch-spatialRelationInfoID corresponding to a UE-specific PUCCH resource having the minimum ID inside an activated uplink bandwidth part (BWP) in a serving cell. In an embodiment of the disclosure, the PUSCH transmission may be performed based on a single antenna port. The UE does not expect scheduling regarding PUSCH transmission through DCI format 0_0 inside a BWP having no configured PUCCH resource including pucch-spatialRelationInfo. If the UE has no configured txConfig inside pusch-Config in Table 11, the UE does not expect scheduling through DCI format 0_1.

TABLE 11

```
PUSCH-Config

PUSCH-Config ::=                         SEQUENCE {
  dataScramblingIdentityPUSCH              INTEGER (0..1022)            OPTIONAL,
-- Need S
  txConfig                         ENUMERATED {codebook, nonCodebook}           OPTIONAL,
-- Need S
  dmrs-UplinkForPUSCH-MappingTypeA   SetupRelease { DMRS-UplinkConfig }
OPTIONAL, -- Need M
  dmrs-UplinkForPUSCH-MappingTypeB   SetupRelease { DMRS-UplinkConfig }
OPTIONAL, -- Need M
  pusch-PowerControl                       PUSCH-PowerControl           OPTIONAL,
-- Need M
  frequencyHopping                         ENUMERATED {intraSlot, interSlot}
OPTIONAL, -- Need S
  frequencyHoppingOffsetLists              SEQUENCE (SIZE (1..4)) OF INTEGER (1..
maxNrofPhysicalResourceBlocks-1)           OPTIONAL, -- Need M
  resourceAllocation                   ENUMERATED { resourceAllocationType0,
resourceAllocationType1, dynamicSwitch},
  pusch-TimeDomainAllocationList             SetupRelease { PUSCH-
TimeDomainResourceAllocationList }           OPTIONAL, -- Need M
  pusch-AggregationFactor                  ENUMERATED { n2, n4, n8 }
OPTIONAL, -- Need S
  mcs-Table                          ENUMERATED {qam256, qam64LowSE}          OPTIONAL,
-- Need S
  mcs-TableTransformPrecoder                 ENUMERATED {qam256, qam64LowSE}
OPTIONAL, -- Need S
  transformPrecoder                    ENUMERATED {enabled, disabled}            OPTIONAL,
-- Need S
  codebookSubset ENUMERATED {fullyAndPartialAndNonCoherent,
partialAndNonCoherent,nonCoherent}
OPTIONAL, -- Cond codebookBased
  maxRank                         INTEGER (1..4)                       OPTIONAL, -- Cond
codebookBased
  rbg-Size                        ENUMERATED { config2}                  OPTIONAL, --
Need S
  uci-OnPUSCH                          SetupRelease { UCI-OnPUSCH}              OPTIONAL, --
Need M
  tp-pi2BPSK                        ENUMERATED {enabled}                  OPTIONAL, --
Need S
  ...
}
```

Next, codebook-based PUSCH transmission will be described. The codebook-based PUSCH transmission may be dynamically scheduled through DCI format 0_0 or 0_1, and may be operated semi-statically by a configured grant. If a codebook-based PUSCH is dynamically scheduled through DCI format 0_1 or configured semi-statically by a configured grant, the UE may determine a precoder for PUSCH transmission, based on an SRS resource indicator (SRI), a transmission precoding matrix indicator (TPMI), and a transmission rank (the number of PUSCH transmission layers).

In an embodiment of the disclosure, the SRI may be given through the SRS resource indicator (a field inside DCI) or configured through srs-ResourceIndicator (upper signaling). During codebook-based PUSCH transmission, at least one SRS resource may be configured for the UE and, for example, a maximum of two SRS resources may be configured for the UE. If the UE is provided with an SRI through DCI, the SRS resource indicated by the SRI may refer to the SRS resource corresponding to the SRI among SRS resources transmitted prior to the PDCCH including the SRI. In addition, the TPMI and the transmission rank may be given through "precoding information and number of layers" (a field inside DCI) or configured through precodingAndNumberOfLayers (upper signaling). The TPMI may be used to indicate a precoder applied to PUSCH transmission.

The precoder to be used for PUSCH transmission may be selected from an uplink codebook having the same number of antenna ports as the value of nrofSRS-Ports inside SRS-Config (upper signaling). In connection with codebook-based PUSCH transmission, the UE may determine a codebook subset, based on codebookSubset inside pusch-Config (upper signaling) and TPMI. In an embodiment of the disclosure, the codebookSubset inside pusch-Config (upper signaling) may be configured to be one of "fullyAndPartialAndNonCoherent", "partialAndNonCoherent", or "noncoherent", based on UE capability reported by the UE to the base station.

If the UE reported "partialAndNonCoherent" as UE capability, the UE may not expect that the value of codebookSubset (upper signaling) will be configured as "fullyAndPartialAndNonCoherent". In addition, if the UE reported "noncoherent" as UE capability, the UE may not expect that the value of codebookSubset (upper signaling) will be configured as "fullyAndPartialAndNonCoherent" or "partialAndNonCoherent". If nrofSRS-Ports inside SRS-ResourceSet (upper signaling) indicates two SRS antenna ports, the UE may not expect that the value of codebookSubset (upper signaling) will be configured as "partialAndNonCoherent".

One SRS resource set may be configured for the UE, wherein the value of usage inside SRS-ResourceSet (upper signaling) is "codebook", and one SRS resource may be indicated through an SRI inside the SRS resource set. If multiple SRS resources are configured inside the SRS resource set wherein the value of usage inside SRS-ResourceSet (upper signaling) is "codebook", the UE may expect that the value of nrofSRS-Ports inside SRS-Resource (upper signaling) is identical for all SRS resources.

The UE may transmit, to the base station, one or multiple SRS resources included in the SRS resource set wherein the value of usage is configured as "codebook" according to upper signaling, and the base station may select one from the SRS resources transmitted by the UE and indicate the UE to transmit a PUSCH by using transmission beam information of the corresponding SRS resource. In an embodiment of the disclosure, in connection with the codebook-based PUSCH transmission, the SRI may be used as information for selecting the index of one SRS resource, and is included in DCI. Additionally, the base station may transmit DCI in which information indicating the rank and TPMI to be used by the UE for PUSCH transmission is included. Using the SRS resource indicated by the SRI, the UE may apply, in performing PUSCH transmission, the precoder indicated by the rank and TPMI indicated based on the transmission beam of the corresponding SRS resource.

Next, non-codebook-based PUSCH transmission will be described. The non-codebook-based PUSCH transmission may be dynamically scheduled through DCI format 0_0 or 0_1, or may be operated semi-statically by a configured grant. If at least one SRS resource is configured inside an SRS resource set wherein the value of usage inside SRS-ResourceSet (upper signaling) is "nonCodebook", non-codebook-based PUSCH transmission may be scheduled for the UE through DCI format 0_1.

With regard to the SRS resource set wherein the value of usage inside SRS-ResourceSet (upper signaling) is "nonCodebook", one non-zero-power (NZP) CSI-RS resource associated with the SRS resource set may be configured for the UE. The UE may calculate a precoder for SRS transmission by measuring the NZP CSI-RS resource configured in association with the SRS resource set. If the difference between the last received symbol of an aperiodic NZP CSI-RS resource associated with the SRS resource set and the first symbol of aperiodic SRS transmission in the UE is less than a specific number of symbols (e.g., 42 symbols), the UE may not expect that information regarding the precoder for SRS transmission will be updated.

If the configured value of resourceType inside SRS-ResourceSet (upper signaling) is "aperiodic", the NZP CSI-RS associated with the SRS-ResourceSet may be indicated by an SRS request which is a field inside DCI format 0_1 or 1_1. In an embodiment of the disclosure, if the NZP CSI-RS resource associated with the SRS-ResourceSet is an aperiodic NZP CSI-RS resource and the value of field SRS request inside DCI format 0_1 or 1_1 is not "00", this case may indicate the existence of the NZP CSI-RS associated with the SRS-ResourceSet. If the value of SRS request indicates the existence of a NZP CSI-RS, the NZP CSI-RS may be located in the slot used to transmit the PDCCH including the SRS request field. TCI states configured for the scheduled subcarrier may not be configured as QCL-TypeD.

If there is a periodic or semi-persistent SRS resource set configured, the NZP CSI-RS associated with the SRS resource set may be indicated through associatedCSI-RS inside SRS-ResourceSet (upper signaling). With regard to non-codebook-based transmission, the UE may not expect that spatialRelationInfo which is upper signaling regarding the SRS resource and associatedCSI-RS inside SRS-ResourceSet (upper signaling) will be configured together.

If multiple SRS resources are configured for the UE, the UE may determine a precoder to be applied to PUSCH transmission and the transmission rank, based on an SRI indicated by the base station. In an embodiment of the disclosure, the SRI may be indicated through field SRS resource indicator inside DCI or configured through srs-ResourceIndicator (upper signaling). Similarly to the above-described codebook-based PUSCH transmission, if the UE is provided with the SRI through DCI, the SRS resource indicated by the corresponding SRI may refer to the SRS resource corresponding to the SRI, among SRS resources transmitted prior to the PDCCH including the corresponding SRI. The UE may use one or multiple SRS resources for SRS transmission, and the maximum number of SRS resources that can be transmitted simultaneously in the same symbol inside one SRS resource set and the maximum number of SRS resources are determined by UE capability reported to the base station by the UE. SRS resources simultaneously transmitted by the UE may occupy the same RB. The UE may configure one SRS port for each SRS resource. There may be only one configured SRS resource set wherein the value of usage inside SRS-ResourceSet (upper signaling) is "nonCodebook", and a maximum of four SRS resources can be configured for non-codebook-based PUSCH transmission.

The base station may transmit one NZP-CSI-RS associated with the SRS resource set to the UE, and the UE may calculate the precoder to be used when transmitting one or multiple SRS resources inside the corresponding SRS resource set, based on the result of measurement when the corresponding NZP-CSI-RS is received. The UE may apply the calculated precoder when transmitting, to the base station, one or multiple SRS resources inside the SRS resource set wherein the configured usage is "nonCodebook", and the base station may select one or multiple SRS resources from the received one or multiple SRS resources. In connection with the non-codebook-based PUSCH transmission, the SRI may indicate an index that may express one SRS resource or a combination of multiple SRS resources, and the SRI may be included in DCI. The number of SRS resources indicated by the SRI transmitted by the base station may be the number of transmission layers of the PUSCH, and the UE may transmit the PUSCH by applying the precoder applied to SRS resource transmission to each layer.

Hereinafter, a method of repetitive transmission of an uplink data channel (PUSCH) in a 5G system and single TB transmission using multiple slots will be described. A 5G system may support two types of repetitive transmission methods (e.g., PUSCH repetitive transmission type A and PUSCH repetitive transmission type B) for uplink data channels, and TB processing over multi-slot PUSCH (TBoMS) by which a TB is transmitted through multiple PUSCHs over multiple slots. Furthermore, one of repetitive PUSCH transmission type A and repetitive PUSCH transmission type B may be configured for a UE through higher-layer signaling. In addition, the UE may be configured with numberOfSlotsTBoMS' through the configured resource allocation table and transmit TBoMS therethrough.

PUSCH repetitive transmission type A

As described above, in one slot, a length and a start symbol of an uplink data channel are determined according to the time domain resource allocation method, and the base station may transmit, to the UE, the number of repetitive transmissions through higher layer signaling (e.g., RRC signaling) or L1 signaling (e.g., DCI). The number N of slots configured by numberOfSlotsTBoMS for TBS determination may be 1.

The UE may repeatedly transmit, in consecutive slots, an uplink data channel having the same starting symbol and the same length as the uplink data channel configured as described above, based on the number of repeated transmissions received from the base station. In an embodiment of the disclosure, in case that at least one symbol among symbols in a slot configured as downlink by the base station to the UE or a slot configured to the UE for repetitive transmission of an uplink data channel is configured as downlink, the UE may omit uplink data channel transmission in the corresponding slot. For example, the UE may not transmit an uplink data channel within the number of repeated transmissions of the uplink data channel. On the other hand, a UE supporting Rel-17 uplink data repetitive transmission may determine a slot enabling uplink data repetitive transmission as an available slot, and the number of transmissions may be counted when an uplink data channel is repeatedly transmitted in the slot determined as the available slot. When repetitive transmission of an uplink data channel is omitted in the slot determined as the available slot, repetitive transmission of the uplink data channel may be postponed, and then the uplink data channel may be repeatedly transmitted in a slot enabling transmission. By using Table 12 below, a redundancy version may be applied according to a redundancy version pattern configured every n-$^{th}$ PUSCH transmission occasion.

PUSCH repetitive transmission type B

As described above, in one slot, the length and a start symbol of an uplink data channel are determined according to the time domain resource allocation method described above, and the base station may transmit, to the UE, numberofrepetitions corresponding to the number of repeated transmissions through higher signaling (e.g., RRC signaling) or L1 signaling (e.g., DCI). In an embodiment of the disclosure, the number N of slots configured by numberOfSlotsTBoMS for TBS determination may be 1.

First, nominal repetition of the uplink data channel may be determined based on the length and the start symbol of the uplink data channel configured as described above as follows. The nominal repetition may indicate a resource of a symbol configured for PUSCH repetitive transmission by the base station, and the UE may determine a resource usable as uplink in the configured nominal repetition. In this case, a slot in which the n-th nominal repetition starts is given by $$K_s + \left\lfloor \frac{S + n \cdot L}{N_{symb}^{slot}} \right\rfloor,$$

and the symbol in which the nominal repetition starts in the starting slot may be given by $$\mathrm{mod}\left(S + n \cdot L,\ N_{symb}^{slot}\right).$$

A slot in which the n-th nominal repetition ends may be given by $$K_s + \left\lfloor \frac{S + (n+1) \cdot L - 1}{N_{symb}^{slot}} \right\rfloor,$$

and the symbol in which the nominal repetition ends in slor the last slot may be given by $$\mathrm{mod}\left(S + (n+1) \cdot L - 1,\ N_{symb}^{slot}\right).$$

Here, n=0, . . . , numberofrepetitions-1, S may indicate the start symbol of the configured uplink data channel, and L may indicate the symbol length of the configured uplink data channel. $K_s$ indicates a slot in which PUSCH transmission starts, and $$N_{symb}^{slot}$$

may indicate the number of symbols per slot.

The UE may determine an invalid symbol for PUSCH repetitive transmission type B. A symbol configured via downlink by tdd-UL-DL-ConfigurationCommon or tdd-UL-DL-ConfigurationDedicated may be determined as the invalid symbol for PUSCH repetitive transmission type B. Additionally, the invalid symbol may be configured based on a higher-layer parameter (e.g., InvalidSymbolPattern). In an embodiment of the disclosure, the higher-layer parameter (e.g., nvalidSymbolPattern) may provide a symbol-level bitmap over one slot or two slots, and the invalid symbol may be configured therein. In an embodiment of the disclosure, 1 in a bitmap may indicate an invalid symbol. Additionally, the periodicity and the pattern of the bitmap may be configured through the higher-layer parameter (e.g., periodicityAndPattern). If the higher-layer parameter (e.g., InvalidSymbolPattern) is configured and an InvalidSymbolPatternIndicator-ForDCIFormat0_1 or an InvalidSymbolPatternlndicator-ForDCI-Format0_2 parameter indicates 1, the UE may apply an invalid symbol pattern, and if same indicates 0, the UE may not apply the invalid symbol pattern. Alternatively, if the higher-layer parameter (e.g., InvalidSymbolPattern) is configured and an InvalidSymbolPatternlndicator-ForDCIFormat0_1 or an InvalidSymbolPatternlndicator-ForDCIFormat0_2 parameter is not configured, the UE may apply the invalid symbol pattern.

After an invalid symbol is determined in each nominal repetition, the UE may consider, as valid symbols, symbols except for the determined invalid symbol. When one or more valid symbols are included in each nominal repetition, the nominal repetition may include one or more actual repetitions. Here, each actual repetition may indicate symbols actually used for PUSCH repetitive transmission among symbols configured as the nominal repetition configured as above, and may include consecutive sets of valid symbols that are available for PUSCH repetitive type B in one slot. Except for a case in which the symbol length L of the uplink data channel configured by the base station has a value of 1 (L=1), in case that an actual repetition having one symbol is configured as valid, the UE may omit actual repetition transmission. By using Table 8 below, a redundancy version may be applied according to a redundancy version pattern configured every n-th actual repetition.

TB processing over multiple slots (TBoMS)

As described above, in one slot, a length and a start symbol of an uplink data channel are determined according to the time domain resource allocation method, and the base station may transmit, to the UE, the number of repetitive transmissions through higher layer signaling (e.g., RRC signaling) or L1 signaling (e.g., DCI). In an embodiment of the disclosure, a TBS may be determined using an N value equal to or greater than 1, which is the number of slots configured by numberOfSlotsTBoMS.

The UE may transmit, in consecutive slots, an uplink data channel having the same starting symbol and the same length as the uplink data channel configured as described above, based on the number of slots for TBS determination and the number of repeated transmissions received from the base station. In an embodiment of the disclosure, in case that at least one symbol among symbols in a slot configured as downlink by the base station to the UE or a slot configured to the UE for repetitive transmission of an uplink data channel is configured as downlink, the UE may omit uplink data channel transmission in the corresponding slot. For example, same may not be transmitted although included in the number of repetitive transmission of the uplink data channel.

On the other hand, a UE supporting Rel-17 uplink data repetitive transmission may determine a slot enabling uplink data repetitive transmission as an available slot, and the number of transmissions may be counted when an uplink data channel is repeatedly transmitted in the slot determined as the available slot. When repetitive transmission of an uplink data channel is omitted in the slot determined as the available slot, repetitive transmission of the uplink data channel may be postponed, and then the uplink data channel may be repeatedly transmitted in a slot enabling transmission. By using Table 12 below in an embodiment of the disclosure, a redundancy version may be applied according to a redundancy version pattern configured every n-th PUSCH transmission occasion.

TABLE 12

| $rv_{id}$ indicated | $rv_{id}$ to be applied to $n^{th}$ transmission occasion (repetition Type A) or TB processing over multiple slots) or $n^{th}$ actual repetition (repition Type B) | | | |
|---|---|---|---|---|
| by the DCI scheduling the PUSCH | ((n − (n mod N))/N) mod 4 = 0 | ((n − (n mod N))/N) mod 4 = 0 | ((n − (n mod N))/N) mod 4 = 0 | ((n − (n mod N))/N) mod 4 = 0 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

Hereinafter, a method for determining an uplink available slot for single or multi-PUSCH transmission in the 5G system will be described.

In an embodiment of the disclosure, when a UE is configured with AvailableSlotCounting to be enabled, the UE may determine an available slot, based on tdd-UL-DL-ConfigurationCommon, tdd-UL-DL-ConfigurationDedicated, ssb-PositionsInBurst, and a time domain resource allocation (TDRA) information field value for type A PUSCH repetitive transmission and TBoMS PUSCH transmission. For example, in case that at least one symbol configured by TDRA for a PUSCH in a slot for PUSCH transmission overlaps with at least one symbol for a purpose other than uplink transmission, the slot may be determined as an unavailable slot.

Hereinafter, a method for reducing an SSB density through dynamic signaling for energy saving of a base station in a 5G system will be described.

Figure 10:
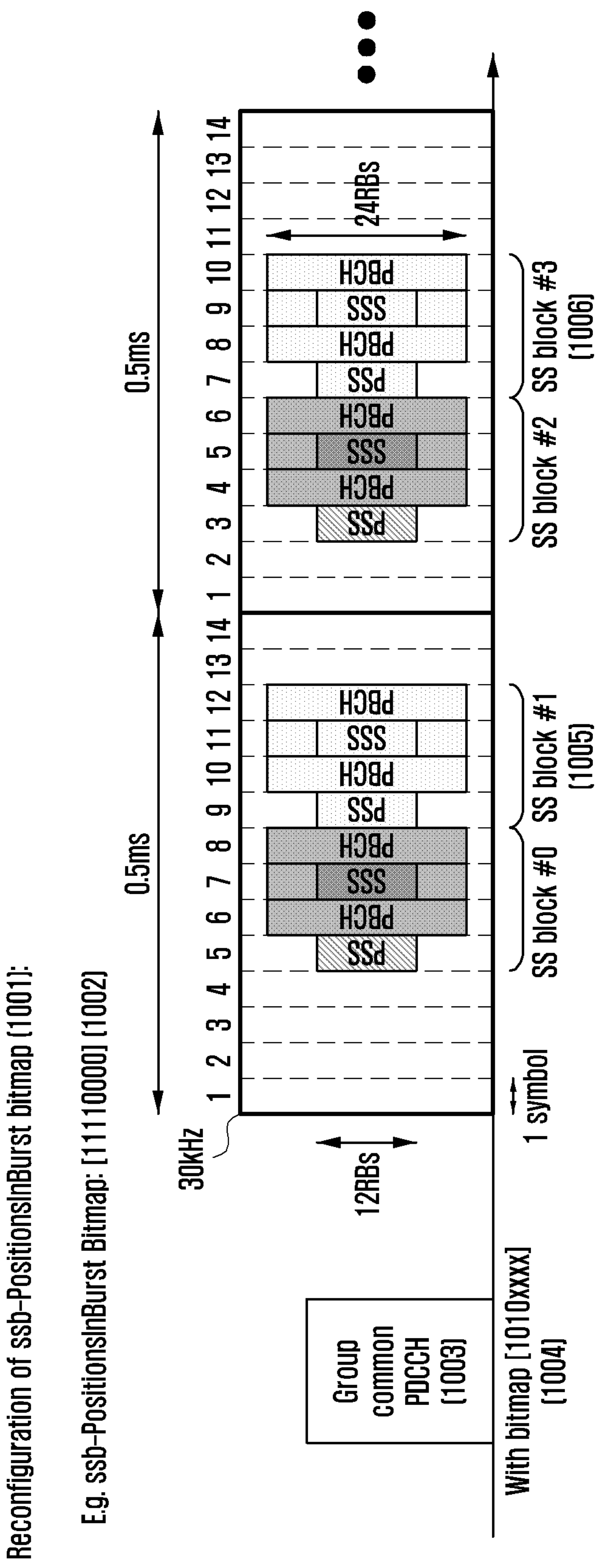
FIG. 10 is a view illustrating a method for reconfiguring synchronization signal block (SSB) transmission through dynamic signaling in a wireless communication system according to an embodiment of the disclosure.

FIG. 10 is a view illustrating a method for reconfiguring SSB transmission through dynamic signaling in a wireless communication system according to an embodiment of the disclosure.

Referring to FIG. 10, a base station may configure, to a UE, ssb-PositionsInBurst="11110000" 1002 through higher layer signaling (SIB1 or Serving CellConfigCommon), and a maximum of two SSBs at a subcarrier spacing of 30 kHz may be transmitted within a time of 0.5 ms (or corresponding to 1 slot length in case that one slot includes 14 OFDM symbols), and thus, the UE may receive four synchronization signal blocks (SSB) in a time of 1 ms (or corresponding to 2 slot length in case that one slot includes 14 OFDM symbols). Here, in order to reduce the density of SSB transmission for energy saving, the base station may reconfigure SSB transmission configuration information by broadcasting bitmap "1010xxxx" 1004 through group/cell common DCI 1003 having a network energy saving-radio network temporary identifier (nwes-RNTI) (or es-RNTI). In this case, the UE may cancel transmission of SS block #1 1005 and SSblock #3 1006, based on a bitmap 1004 configured through group/cell common DCI. FIG. 10 shows a method 1001 for reconfiguring SSB transmission through group/cell common DCI based on a bitmap.

In addition, the base station may reconfigure ssb-periodicity configured through higher layer signaling, via group/cell common DCI. The base station may additionally configure timer information for indicating a time point of applying group/cell common DCI, and transmit an SSB through SSB transmission information reconfigured via the group/cell common DCI during a configured timer. After the timer expires, the base station operates, based on SSB transmission information configured through existing higher layer signaling. A configuration may be changed from a normal mode to an energy saving mode by using a timer, and accordingly, reconfiguration of SSB configuration information may be performed. As another method, the base station may configure, to the UE, a time point and a duration of application of SSB configuration information reconfigured using group/cell common DCI through offset and duration information. The UE may not monitor an SSB for a configured duration from a moment at which offset is applied immediately after group/cell common DCI is received.

Hereinafter, a BWP or BW adaptation method through dynamic signaling for energy saving of a base station in a 5G system will be described.

Figure 11:
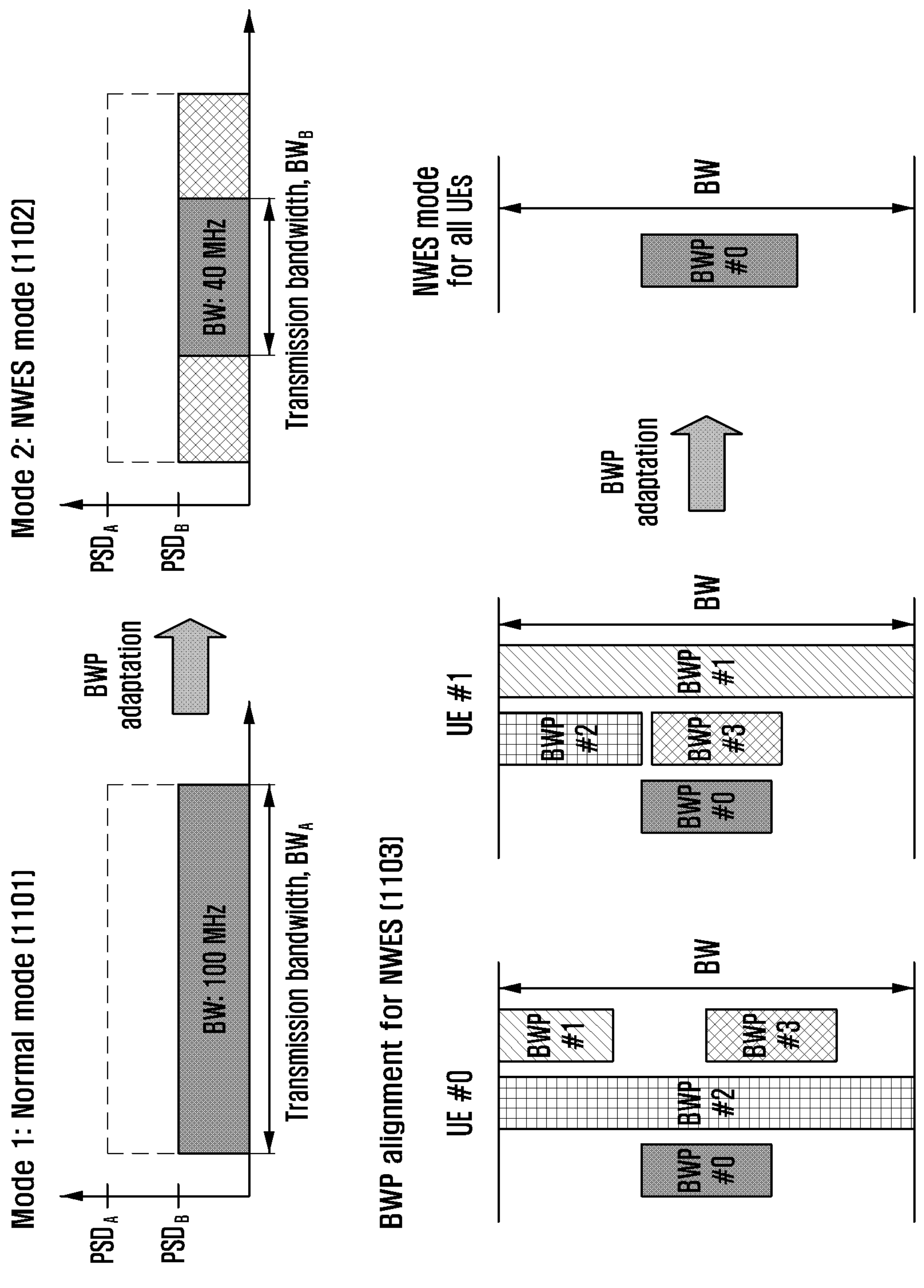
FIG. 11 is a view illustrating a method for reconfiguring a BWP and a BW through dynamic signaling in a wireless communication system according to an embodiment of the disclosure.

FIG. 11 is a view illustrating a method for reconfiguring a BWP and a BW through dynamic signaling in a wireless communication system according to an embodiment of the disclosure.

Referring to FIG. 11, the UE may operate as a BWP or BW activated through higher layer signaling and L1 signaling from the base station (1101). For example, the UE may operate through a full BW of 100 MHz with fixed power $PSD_B$. Here, the base station may adjust the BW and BWP so that the UE activates a narrower BW of 40 MHz with the same $PSD_B$ for energy saving (1102). The operation of the base station of adjusting the BW or the BWP for energy saving may be configured to identically match a BWP and BW configuration UE specifically configured through group common DCI and cell specific DCI (1103). For example, UE #0 and UE #1 may have different BWP configurations and locations. Here, for energy saving by reducing a BW used by the base station, the BW and BWP of all UEs may be set equally to one. The BWP or BW of the operation for energy saving may be configured as one or more, and may be used to configure a BWP for each UE group.

Hereinafter, embodiments of the disclosure will be described in conjunction with the accompanying drawings. In the following description, a base station is an entity that allocates resources to terminals, and may be at least one of a gNode B, a gNB, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing a communication function. In the following description of embodiments of the disclosure, a 5G system will be described by way of example, but the embodiments of the disclosure may also be applied to other communication systems having similar technical backgrounds or channel types. Examples of such communication systems may include LTE or LTE-A mobile communication systems and mobile communication technologies developed beyond 5G. Therefore, based on determinations by those skilled in the art, the embodiments of the disclosure may also be applied to other communication systems through some modifications without significantly departing from the scope of the disclosure. For example, the contents of the disclosure may be applied to frequency division duplex (FDD), time division duplex (TDD), and cross division duplex (XDD) systems, Furthermore, in describing the disclosure, a detailed description of known functions or configurations incorporated herein will be omitted when it is determined that the description may make the subject matter of the disclosure unnecessarily unclear. The terms which will be described below are terms defined based on the functions in the disclosure, and may be different according to users, intentions of the users, or customs. Therefore, the definitions of the terms should be made based on the contents throughout the specification.

In the following description of the disclosure, upper layer signaling may refer to signaling corresponding to at least one among the following signaling, or a combination of one or more thereof.

- Master information block (MIB)
- System information block (SIB) or SIB X (X=1, 2, . . . )
- Radio resource control (RRC)
- Medium access control (MAC) control element (CE)

In addition, L1 may refer to signaling corresponding to at least one among signaling methods using the following physical layer channel or signaling, or a combination of one or more thereof.

- Physical downlink control channel (PDCCH)
- Downlink control information (DCI)
- UE-specific DCI
- Group common DCI
- Common DCI
- Scheduling DCI (for example, DCI used for the purpose of scheduling downlink or uplink data)
- Non-scheduling DCI (for example, DCI not used for the purpose of scheduling downlink or uplink data)
- Physical uplink control channel (PUCCH)
- Uplink control information (UCI)

Hereinafter, the above examples may be described through multiple embodiments of the disclosure, but they are not independent of each other, and one or more embodiments may be applied simultaneously or in combination.

Hereinafter, a DRX alignment method through dynamic signaling for energy saving of a base station in a 5G system will be described.

Figure 12:
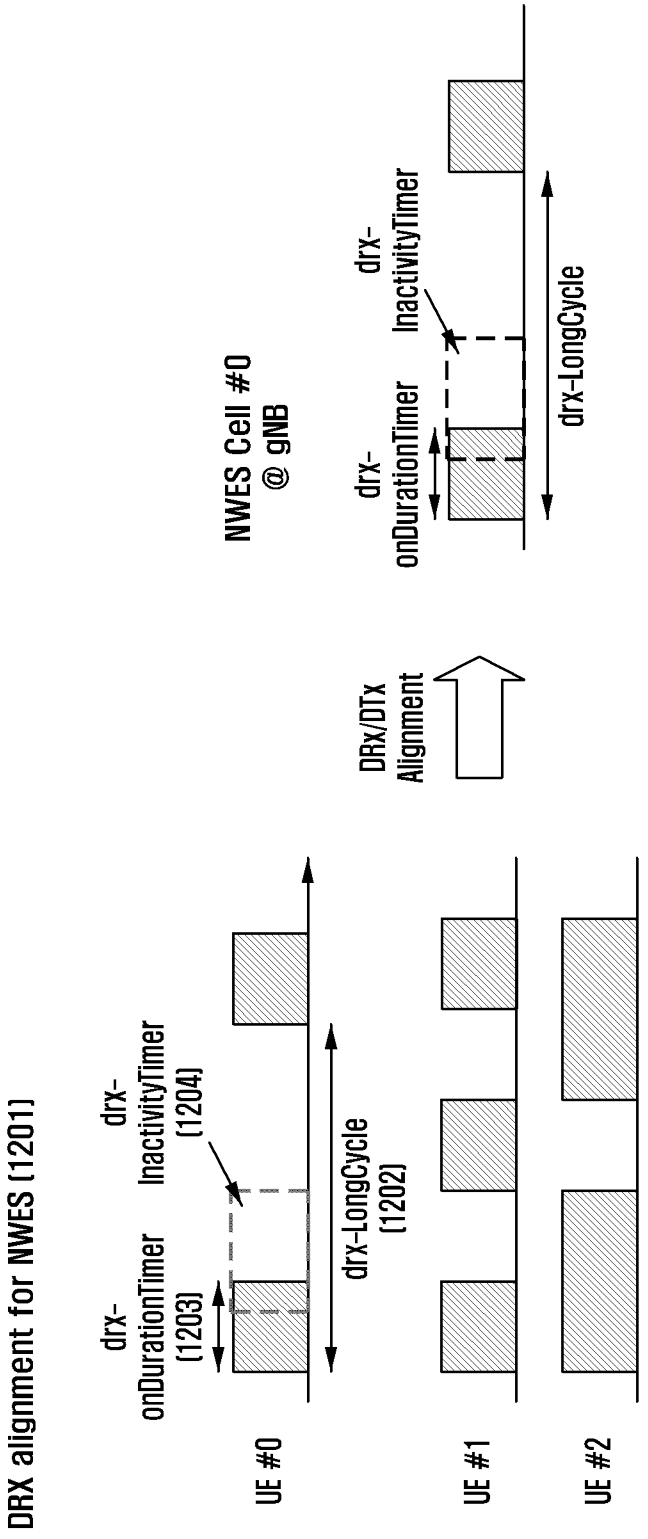
FIG. 12 is a view illustrating a method for reconfiguring discontinuous reception (DRX) through dynamic signaling in a wireless communication system according to an embodiment of the disclosure.

FIG. 12 is a view illustrating a method for reconfiguring DRX through dynamic signaling in a wireless communication system according to an embodiment of the disclosure.

Referring to FIG. 12, a base station may configure DRX UE specifically through higher layer signaling. For example, each UE may be configured with different drx-LongCycle 1202 or drx-ShortCycle, drx-onDurationTimer 1203 and drx-InactivityTime 1204. Thereafter, the base station may configure a UE specific DRX configuration in a UE group specific or cell specific manner for energy saving through L1 signaling 1201. As such, an effect identical to the effect of power saving achieved by the UE through DRX may be obtained by the base station for energy saving.

Hereinafter, a discontinuous transmission (DTx) operation for reducing energy consumption in a 5G system will be described.

Figure 13:
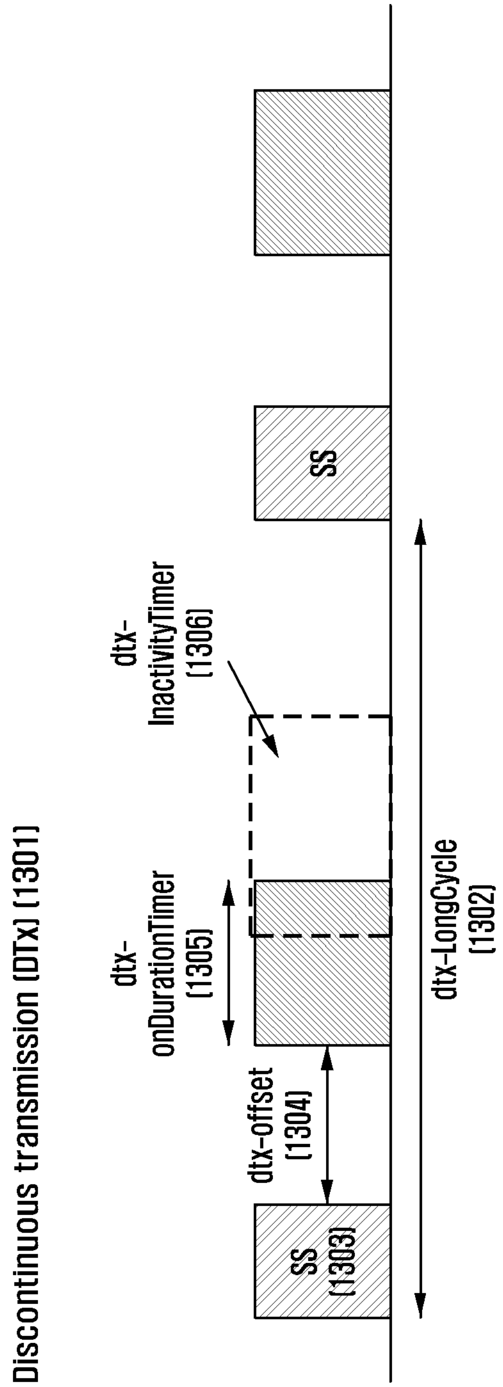
FIG. 13 is a view illustrating a discontinuous transmission (DTx) method for energy saving of a base station according to an embodiment of the disclosure.

FIG. 13 is a view illustrating a DTx method for energy saving of a base station according to an embodiment of the disclosure.

Referring to FIG. 13, a base station may configure discontinuous transmission (DTx) 1301 for energy saving through higher layer signaling (new system information block (SIB) for DTx or RRC signaling) and L1 signaling (DCI). Here, the base station may configure, for a DTx operation, dtx-onDurationTimer 1305 for transmitting a PDCCH scheduling a DL SCH or a reference signal for RRM measurement, beam management, pathloss measurement, and the like, dtx-InactivityTimer 1306 for receiving a PDSCH after receiving the PDCCH scheduling a DL SCH, a synchronization signal (SS) 1303 for synchronization before dtx-onDurationTimer, dtx-offset 1304 for configuring an offset between configuration information SS and following dtx-onDuration timer, and dtx-(Long)Cycle 1302 for DTx to periodically operate based on the configuration information. Here, multiple dtx-cycles, such as long cycle and short cycle, may be configured. During the DTx operation, the base station may consider an off (or inactive) state of a reception terminal and thus may not transmit DL CCH, SCH, and DL RS. For example, during the DTx operation, the base station may transmit downlink (PDCCH, PDSCH, RS, or the like) only during SS, dtx-onDurationTimer, and dtx-InactivityTimer. Here, the number of SS bursts or SS-gapbetweenBursts may be additionally configured as additional information of the configured SS.

Hereinafter, a method for activating a base station through gNB wake-up signal (WUS) during an inactivation mode of the base station for reducing energy consumption in a 5G system will be described.

Figure 14:
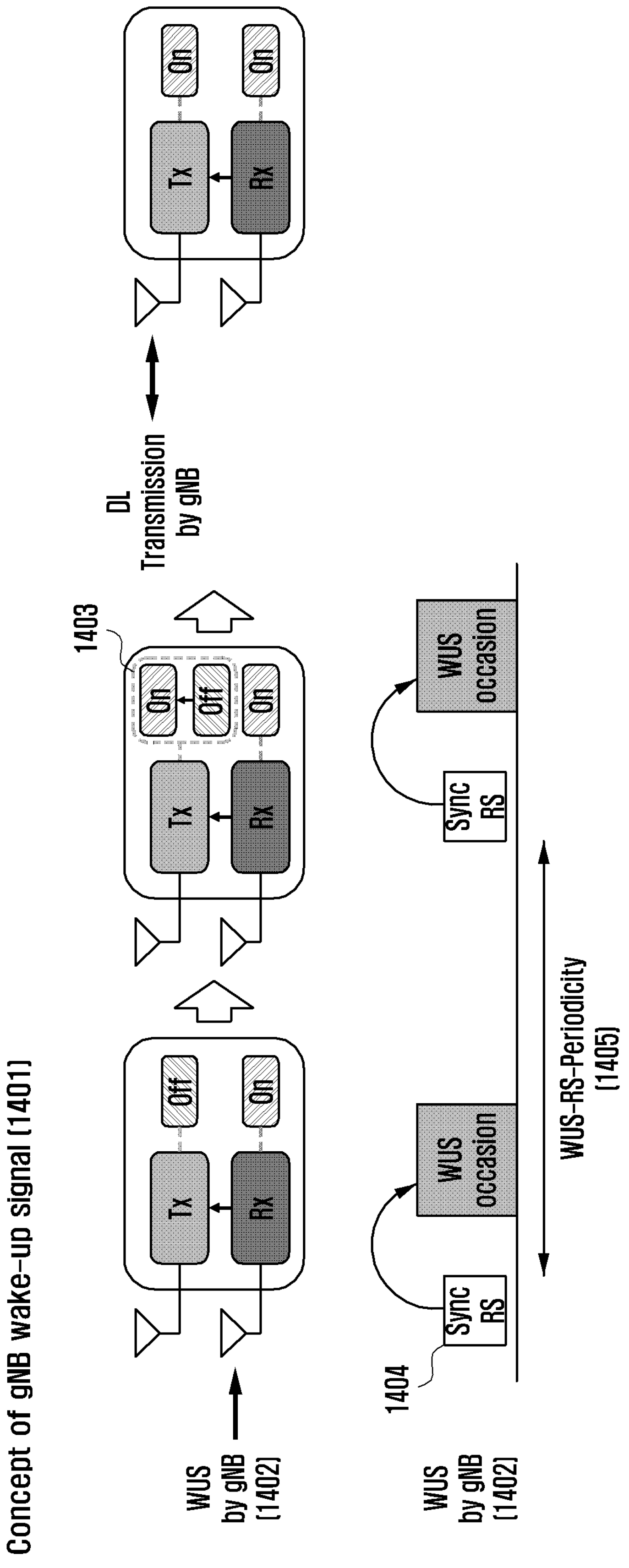
FIG. 14 is a view illustrating an operation of a base station according to a gNB wake-up signal according to an embodiment of the disclosure.

FIG. 14 is a view 1401 illustrating an operation of a base station according to a gNB wake-up signal according to an embodiment of the disclosure.

Referring to FIG. 14, a base station may maintain a transmission terminal in an off (or inactive) state during an inactivation state (or a sleep mode) of the base station for energy saving. Thereafter, the base station may receive a gNB wake-up signal 1402 for activating the sleep mode of the base station from a UE. Thereafter, in case of receiving a WUS through an Rx terminal from the UE, the base station may change a Tx terminal to be in an On (or active) state (1403). Thereafter, the base station may perform downlink transmission to the UE. Here, the base station may perform synchronization after Tx is turned on and perform control and data transmission. Various uplink signals, such as physical random access channel (PRACH), scheduling request (SR PUCCH), and PUCCH including Ack, may be considered as gNB WUSs. Through the above-described method, the base station may save energy and concurrently, the UE may improve latency.

Figure 15:
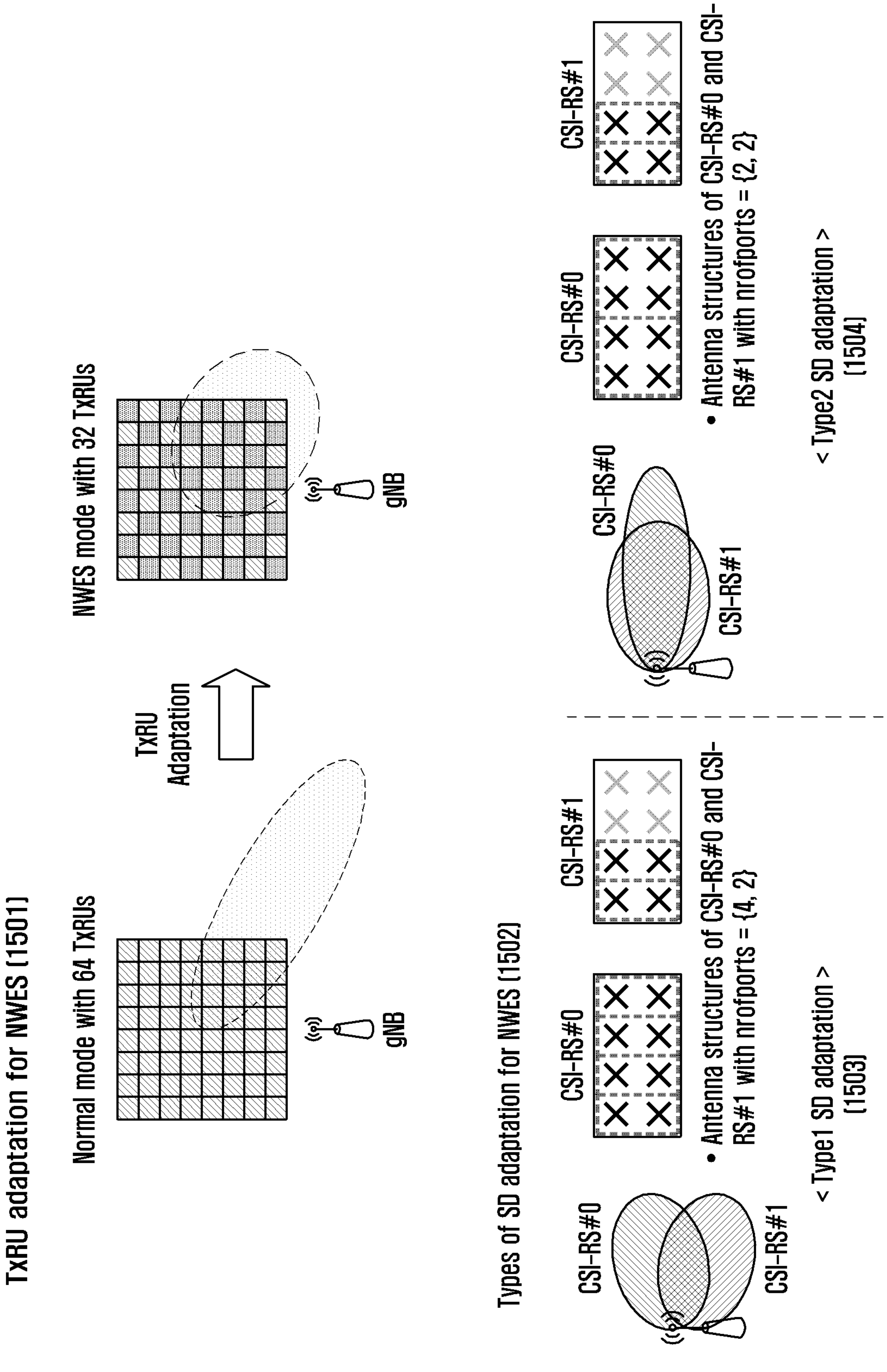
FIG. 15 is a view illustrating an antenna adaptation method of a base station for energy saving in a wireless communication system according to an embodiment of the disclosure.

In this case, the base station may configure a WUS occasion for receiving a gNB WUS and a Sync RS for synchronization before the UE transmits the gNB WUS. An SSB, a TRS, a Light SSB (PSS+SSS), consecutive SSBs, a new RS (continuous PSS+SSS), or the like may be considered to the Sync RS, and a PRACH, a PUCCH with SR, a sequence-based signal, or the like may be considered for the WUS. The SyncRS for the UE to activate the inactivation mode for energy saving of the base station and the WUS occasion for receiving a WUS may be repeatedly transmitted with a WUS-RS periodicity 1405. Although an embodiment in FIG. 15 is explained using 1-to-1 mapping of the Sync and the WUS occasion as an example, the disclosure is not limited thereto. For example, the Sync and the WUS occasion may be N-to-1 mapped, 1-to-N mapped, or N-to-M mapped.

Hereinafter, a method for dynamically turning on/off a spatial domain element (i.e., an antenna, a PA, or transceiver units or transmission radio units (TxRUs)) of a base station for energy saving of the base station in a 5G system will be described.

FIG. 15 is a view illustrating an antenna adaptation method of a base station for energy saving in a wireless communication system according to an embodiment of the disclosure.

Referring to FIG. 15, a base station may adjust a Tx antenna port per radio unit (RU) for energy saving (network energy saving, NWES) (1501). For example, a PA of the base station accounts for most of energy consumption of the base station and thus the base station may turn off a Tx antenna to save energy. In this case, the base station may reference/use reference signal received power (RSRP), a channel quality indicator (CQI), and a reference signal received quality (RSRQ) of a UE to determine whether turning off of the Tx antenna is possible. The base station may transmit Tx by adjusting the number of activated Tx antennas for each UE group or UE. Here, the base station may configure the UE with information including at least one of reference signal information (e.g., one of a CSI resource, a CSI resource set, or a CSI report) or beam information according to the turning on/off of the antenna through higher layer signaling (e.g., RRC signaling) or DCI signaling. In addition, the base station may configure different antenna information for each BWP and reconfigure antenna information according to BWP change. The base station may receive CSI feedback from the UE to determine whether an SD adaptation is possible. The base station may determine an SD adaptation (based on the CSI feedback). The base station may receive, from the UE, multiple feedback through antenna structure hypotheses of various antenna pattern for an SD adaptation.

More specifically, the base station may apply multiple types (e.g., two types) of SD adaptations for energy saving of the base station (1502). For example, the multiple types may include Type 1 SD adaptation 1503 and Type 2 SD adaptation 1504.

When Type 1 SD adaptation 1503 is applied, the base station may maintain the number of physical antenna elements per antenna port (i.e., logical port) and perform adaptation of the number of antenna ports. Here, RF characteristics (e.g., tx power and beam) per port may be the same. Therefore, the UE may perform measurement by combining CSI-RS of the same port during CSI measurement (e.g., L1-RSRP (layer 1-RSRP), L3-RSRP (layer 3-RSRP, and the like).

As another method, when Type 2 SD adaptation 1504 is applied, the base station may have the same number of antenna ports (i.e., logical ports) and turn on/off a physical antenna element for each port. Here, RF characteristics per port may be changed. The UE may distinguish CSI-RSs of the same port during CSI measurement to perform each measurement. The base station may save energy through one or more of multiple types of SD adaptation methods including the two types of SD adaptations.

Through the above-described methods according to an embodiment of the disclosure, energy of the base station may be saved. Furthermore, the methods according to the above-described embodiments may be configured/used as one, or may be configured/used simultaneously through a combination thereof.

Hereinafter, a cell concept having a new different function for reducing energy consumption of a base station in a 5G or 6G system will be described.

Figure 16:
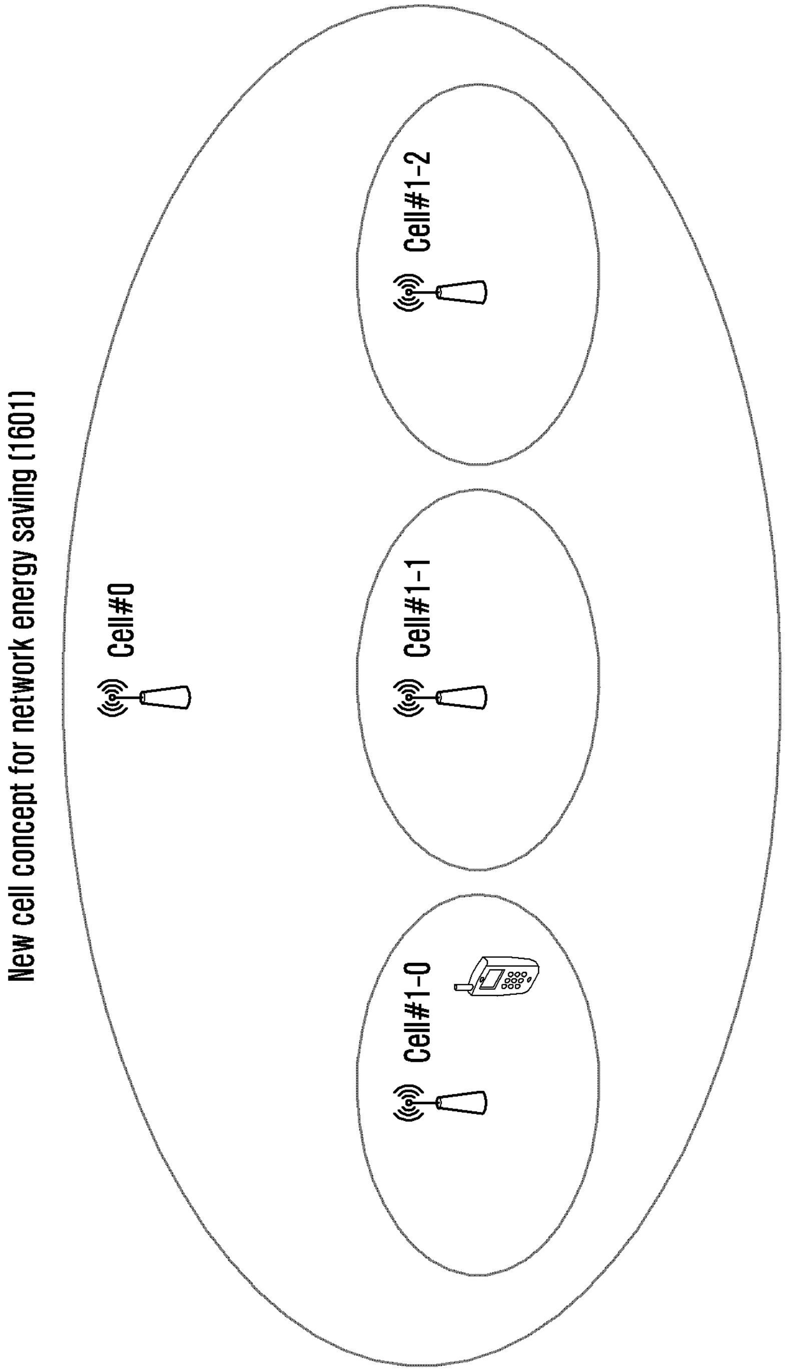
FIG. 16 is a view illustrating a cell concept having different functions for energy saving in a wireless communication system according to an embodiment of the disclosure.

FIG. 16 is a view illustrating a cell concept having different functions for energy saving in a wireless communication system according to an embodiment of the disclosure.

Referring to FIG. 16, a base station may define/configure Cell #0 and Cell #1-X (e.g., Cell #1-0, Cell #1-1, and Cell #1-2) having different functions.

Cell type 1 (e.g., Cell #1-X (at least one of Cell #1-X) and access/sync cell) may be for mobility and a synchronization and/or initial access operation of a UE, packet transmission for processing traffic may be not performed in Cell type 1 or may be performed in Cell type 1 for a limited packet. More specifically, through Cell #0, the base station may periodically transmit a new synchronization signal (SS) and/or an SSB for the UE in the Idle/Inactive RRC state and transmit Paging and/or system information. Configuration information for Cell #1-X capable of processing a packet may be transmitted through the Paging and/or system information.

Cell type 2 (e.g., Cell #1-X (at least one of Cell #1-X) and Data cell) may be for processing a packet of the UE and/or the base station. More specifically, the base station may process a packet of the user in an RRC connected state through Cell1-X. Accordingly, it may be selectively activated when there is a packet on-demand according to traffic. If the base station initially activates Cell1-X for processing a packet, the base station may transmit an SS (e.g., an SSB, a CSI-RS, a TRS, or a new SS) for synchronization of Cell1-X with a UE and the UE initially accessing or synchronized with Cell #0 may receive the SS of Cell1-X and perform handover to Cell1-X. Here, Cell1-X to be activated on-demand may be determined by abase station serving Cell #0, a base station serving Cell #1-X, and/or a UE attached to Cell #0.

A single base station may support one of Cell type 1 or Cell type 2, or support both Cell type 1 and Cell type 2. Alternatively, one or more Cell type 2 may be connected to one or more Cell type 1. Alternatively, coordination between Cell type 1 may be performed for activation of Cell type 2.

The above-described methods and the new cell concept may minimize energy consumption of a network system.

Embodiments of the disclosure may provide a cell selection method to a UE for appropriately processing a packet according to traffic in a cell deployment situation having the cells performing different functions. More specifically, a cell selection method and a signaling method by a base station or a UE may be provided.

Hereinafter, a cell selection method and a signaling procedure for energy saving of a base station in a 5G or 6G system will be described. The method below may allow a base station to activate a proper data cell to a UE so as to maximize energy saving effect and secure service function.

Figure 17:
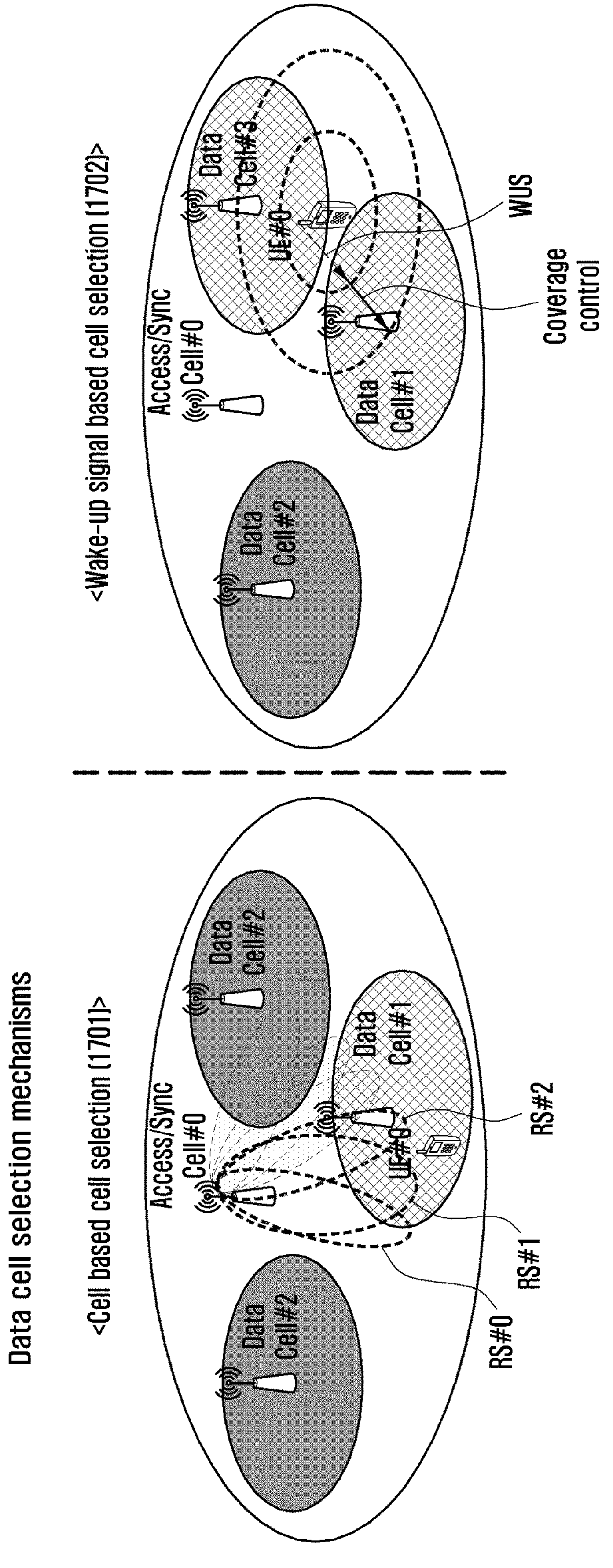
FIG. 17 is a view illustrating an on-demand cell selection method in a wireless communication system according to an embodiment of the disclosure.

FIG. 17 is a view illustrating an on-demand cell selection method in a wireless communication system according to an embodiment of the disclosure.

Referring to FIG. 17, according to an embodiment of the disclosure, Cell type 2 (e.g., Data cell) capable of transmitting a packet may be configured to process traffic within a coverage of Cell type 1 (e.g., an access/sync cell) performing a mobility and initial access function. This may be for energy saving. Cell type 2 for processing traffic may be configured within a coverage of Cell type 1 performing a mobility and initial access function. Here, after the UE accesses the access/sync cell, the appropriate Data cell to process traffic may be selected by one or a combination of methods described below.

[Method 1]—Cell-Based Cell Selection 1701

According to an embodiment of the disclosure, the base station may select appropriate data cell for each UE based on geometry information (e.g., at least one of location information, sector information and/or direction information using a beam) of the UE. For example, in case that the UE initially accesses Access/Sync cell #0, the UE may perform access or handover from a data cell among data cell #1 to #3 within Access/Sync cell #0 to process a packet. An access cell base station (a base station corresponding to an access cell, e.g., a base station operating an access cell) may select an appropriate data cell for a UE and activate the data cell. For example, beam information may be used by the base station to determine an appropriate cell for the UE. For example, the base station may select an appropriate cell by using beam information (beam direction information) for synchronization in an access/sync cell of the UE. By way of example, a beam for synchronization may correspond to an RS used for synchronization in an access/sync cell and may be, for example, a best SSB or CSI-RS. For example, in case that a beam for synchronization corresponds to RS #0, RS #1 or RS #2, the base station may select/determine Data cell #1 corresponding to a direction and/or direction information of a corresponding beam (e.g., RS #0, RS #1 or RS #2) among Data cell #1, #2, and #3.

Through the above-described method, access/sync cell base station-based on-demand cell selection may be performed.

[Method 2]—Wake-Up Signal-Based Cell Selection 1702

According to an embodiment of the disclosure, the UE may activate a data cell to transmit or receive a packet through an uplink wake-up signal (WUS) so as to process traffic. For example, the UE accessing Access/Sync cell #0 may activate a neighboring data cell (e.g., Data Cell #1 and/or Data Cell #3) to process traffic. Here, the UE may transmit a WUS to activate the data cell.

For example, the WUS may be based on a sequence or considered as one or more of a PUCCH, a PUSCH, a PRACH, a PSS, an SSS, an SRS, or other reference signals (RSs). A data cell base station (a base station corresponding to a data cell, e.g., a base station operating a data cell) may have a WUS receiver (WUR) for receiving a separate WUS. In addition, the UE may repeatedly transmit and/or retransmit a WUS. The UE may determine and transmit a carrier frequency and transmission power of the WUS based on information configured through an access/sync cell. Here, the data cell base station having received the WUS from the UE may be activated to transmit an SS to the UE and then perform data transmission/reception for a packet. The information related to the data cell configured to the UE through an access/sync cell may include at least one of information below.

- WUS occasion duration per carrier: WUS monitoring duration corresponding to carrier
- Periodicity of WUS occasion: 20 ms or 40 ms like as RACH occasion periodicity
- Start of WUS occasion per WUS design: system frame number (SFN)
- WUS response window: symbol level, slot level or time level value
- Carrier frequency and Carrier frequency list (for WUS)
- Carrier frequency and Carrier frequency list (for WUS response)
- Data cell ID or physical cell ID (PCI) of data cell
- Time adjustment group between Access/sync cell and Data cell
- Data cell position information
- Number of WUS repetition
- Number of WUS retransmission
- Additional WUS occasion duration for WUS repetition
- WUS response transmission power According to an embodiment of the disclosure, after the WUS is received, whether a data cell or access cell is activated may be determined based on measurement information, such as reference signal received power (RSRP) of the WUS, and/or after all data cells having received the WUS are activated, the UE may receive an SS transmitted from the activated data cells and select an appropriate data cell. For example, the UE may measure an SS from a data cell and select a data cell of which RSRP or a reference signal received quality (RSRQ) exceeds a specific threshold or which has best RSRP or RSRQ.

According to one of the above-described methods, an appropriate data cell is selected for a UE, and thus energy of a base station not activated may be saved and the UE may receive a service through the selected data cell.

An embodiment of the disclosure may provide a signaling procedure for WUS-based data cell selection.

Figure 18A:
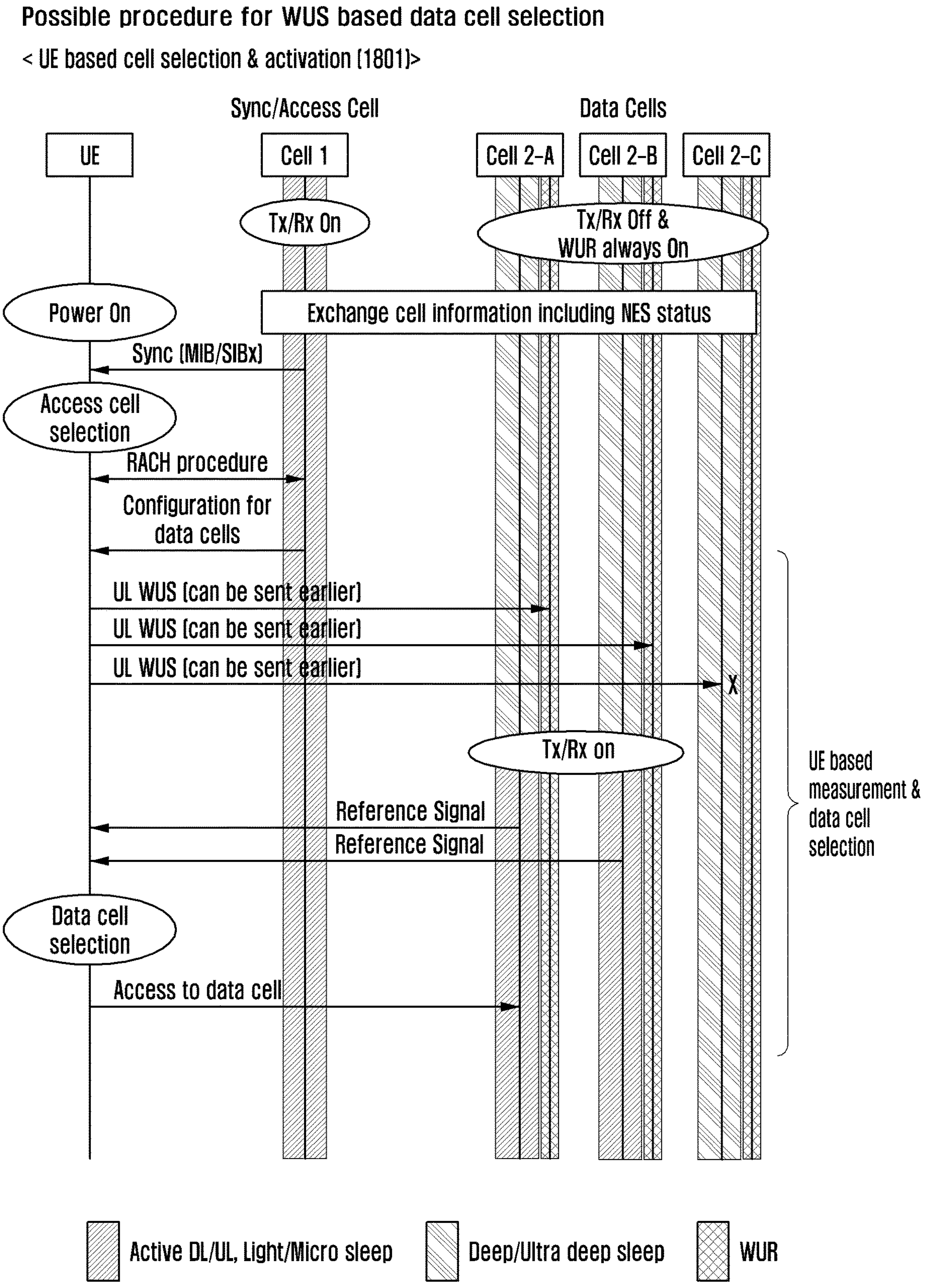
FIG. 18A is a signal flow illustrating a procedure for on-demand cell selection in a wireless communication system according to an embodiment of the disclosure.
Figure 18B:
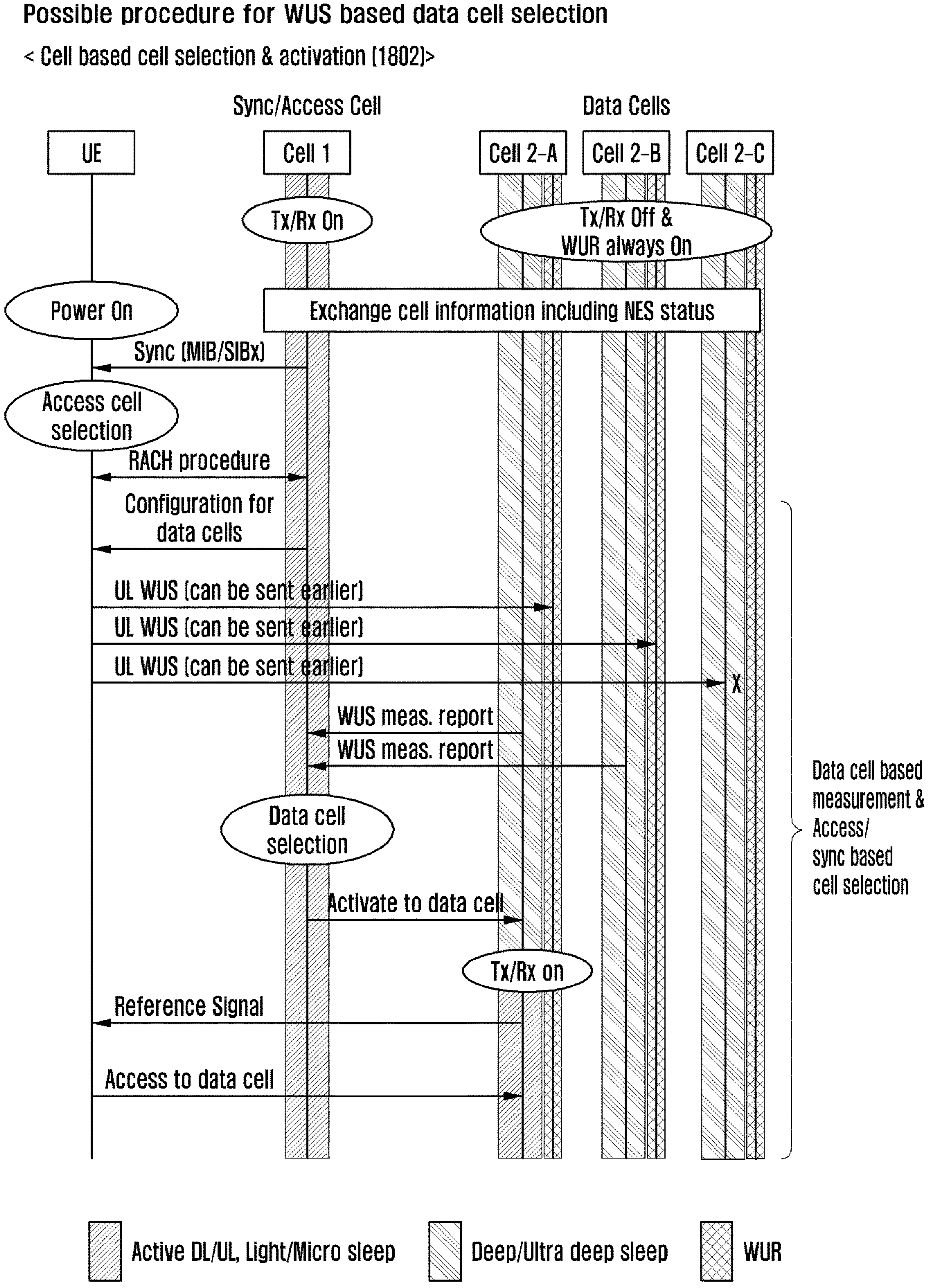
FIG. 18B is a signal flow illustrating a procedure for on-demand cell selection in a wireless communication system according to an embodiment of the disclosure.

FIG. 18A is a signal flow illustrating a procedure for on-demand cell selection in a wireless communication system according to an embodiment of the disclosure, and FIG. 18B is a signal flow illustrating a procedure for on-demand cell selection in a wireless communication system according to an embodiment of the disclosure.

Referring to FIG. 18A, according to an embodiment of the disclosure, a UE may perform data cell selection through WUS transmission (UE-based cell selection and activation, 1801). A sync/access cell may be always activated (Tx/Rx on, it may indicate power on of a transmission RF device including a modem and a reception RF device), and with respect to cell2-A, cell2-B, and cell2-C, which are data cells, an RF for transmission and reception is powered off and a WUR may be always turned on. Here, the powering off may be understood as deep/ultra deep sleep. The deep/ultra deep sleep may indicate powering off or most of components of a base station, and may indicate a state in which, for example, a Backhaul, memory, a cooler, and the like are all turned off. Furthermore, the sync/access cell and the data cell may exchange information for network energy saving. The information transmitted or received between the sync/access cell and the data cell for network energy saving may include at least one piece of information, such as a network energy saving scheme applied to each cell, information about a WUS that each cell may support, and at least one piece of information included in the data cell-related information described above.

The UE may perform a RACH procedure for an initial access to the access/sync cell. In addition, the UE may receive configuration information (e.g., one or more from among a WUS occasion, a carrier frequency, a WUS response window, a carrier frequency for WUS response, or the like) of a data cell associated with a corresponding cell from the access/sync cell. Thereafter, the UE may transmit a WUS to one or more data cells, based on the configured data cell configuration information. Here, base station having received the WUS transmitted from the UE may be activated and transmit a reference signal for synchronization (and/or access) to the UE. The UE may select a data cell based on measurement for the reference signal and perform handover (and/or access) to the data cell.

As another method, referring to FIG. 18B, an access cell base station may perform data cell selection based on the WUS transmitted by the UE (Cell-based cell selection and activation, 1802). A sync/access cell may be always activated (Tx/Rx on), and with respect to cell2-A, cell2-B, and cell2-C, which are data cells, an RF for transmission and reception is powered off and a WUS may be always turned on. Furthermore, the sync/access cell and the data cell may exchange information for network energy saving. The information for network energy saving may refer to the aforementioned description.

The UE may perform a RACH procedure for an initial access to the access/sync cell. Furthermore, the UE may receive configuration information of a data cell associated with a corresponding cell from the access/sync cell. Thereafter, the UE may transmit a WUS to one or more data cells, based on the configured data cell configuration information. Here, data cells and/or data cell base stations having received the WUS transmitted from the UE may report WUS measurement information to the access/sync cell. Whether to report WUS measurement may be determined by the data cell based on the WUS measurement. More specifically, in case that RSRP or a RSRQ of the WUS measured by the data cell is lower than a threshold, the data cell may omit the WUS measurement reporting. Thereafter, the sync/access cell may determine one data cell and activate the data cell. The activated data cell may transmit a reference signal for synchronization (and/or access) to the UE. The UE may receive the reference signal from the data cell and perform handover to (or access) the data cell. Alternatively, in case of the reception state of the reference signal is not good, the UE may transmit a WUS again. For example, RSRP or a RSRQ of the reference signal is equal to or less than/less than a predetermined threshold, the UE may transmit a WUS again, and the above-described Cell-based cell selection and activation 1802 procedure may be performed again.

Through one of the above-described methods, a UE or a base station may select an appropriate data cell based on a WUS of the UE. As such, a UE specific best data cell is selected for each UE, cell selection is possible considering a channel between the data cell and a UE. Therefore, a base station may obtain an energy saving effect from a data cell in an inactive state and a UE may obtain a service having a better performance. A first embodiment and a second embodiment described below may be implemented separately and/or at least in part in combination.

First Embodiment

The first embodiment of the disclosure may provide a method for controlling power of a WUS in a communication system. This may be for cell selection to save energy of a base station. As described above, in the cell selection or activation method using a WUS, the base station may directly determine whether to perform activation by using a WUS and/or receive an WUS to be activated and transmit an RS to the UE for sync and/or measurement. Here, the number of base stations performing cell selection and activation may be controlled through WUS power controlling.

According to an embodiment of the disclosure, transmission power of a WUS may be determined by one or combination of methods described below.

[Method 1]

According to method 1 of an embodiment of the disclosure, $P_{CMAX,f,c}$ may be provided for determining transmission power of a WUS for cell selection and/or activation. The UE may determine transmission power of a WUS for cell selection and/or activation, based on $P_{CMAX,f,c}$ indicating configured maximum transmission power. For example, the UE may determine that transmission power of a WUS $P_{WUS,b,f,c}$ is equal to $P_{CMAX,f,c}$.

$P_{CMAX,f,c}$ may be maximum output power (or maximum transmission power) configured to the UE of an access carrier f of a serving access/sync cell c. The UE may initially access the access/sync cell and then may be configured with same from an access/sync cell base station through higher layer signaling and/or L1 signaling.

$P_{CMAX,f,c}$ may be determined to have a value within a range of $P_{CMAX\_L,f,c}<P_{CMAX,f,c}<P_{CMAX\_H,f,c}$. $P_{CMAX\_L,f,c}$ may be obtained from $\min(P_{EMAX,WUS,c}, P_{PowerClass}-\Delta P_{PowerClass,WUS})$. $P_{CMAX\_L,f,c}$ may correspond to $\min(P_{EMAX,WUS,c})$. Here, $P_{EMAX,WUS,c}$ may correspond to maximum allowed transmission power of a UL carrier through which a WUS is transmitted to wake up a data cell. $P_{PowerClass}$ corresponds to maximum transmission power of a UE defined in a band for a data cell or a carrier frequency f of a data cell. $\Delta P_{PowerClass,WUS}$ corresponds to a power class of a UE or a WUS power class for each traffic having different requirements. For example, $\Delta P_{PowerClass,WUS}$ of a first WUS transmission for initial access to the data cell may be determined to be 3 dB, and $\Delta P_{PowerClass,WUS}$ of a WUS transmission for re-access to the data cell (e.g., a UE having accessed data cell once) other than the initial access may be determined to be 6 dB. In case of re-transmission/re-access, based on a situation having no neighboring data cell, a larger $\Delta P_{PowerClass,WUS}$ may be used to identify/detect a data cell further away by transmitting a WUS having a wider coverage (WUS coverage). The WUS coverage of the disclosure may indicate a coverage within which a WUS may be received with a signal quality equal to or greater than/exceeding a specific threshold, for example, RSRP or a RSRQ equal to or greater than/exceeding a specific threshold.

According to method 1 of an embodiment of the disclosure, the base station and the UE may determine $P_{CMAX}$ for each WUS transmission or carrier frequency f of an access/sync cell and/or cell c. Through this, the UE may transmit a WUS at a maximum possible power. Accordingly, data cell activation may be performed with higher reliability.

[Method 2]

According to method 2 of an embodiment of the disclosure, a method for determining transmission power of a WUS through ramping up for cell selection and activation may be provided.

A UE may determine WUS transmission power $P_{WUS,b,f,c}$ as shown in Equation 1 below.

$$P_{WUS,b,f,c}(i)=\min\{P_{WUS,target,f,c}\}\ [\text{dBm}] \quad \text{Equation 1}$$

$P_{WUS,target,f,c}$ in Equation 1 indicates WUS target transmission power configured through higher layer signaling (e.g., a system information block (SIB) or an RRC) and/or L1 signaling from an access/sync cell (with carrier frequency f and cell c) base station. $P_{WUS,target,f,c}$ may be determined according to a UE capability. Here, $P_{WUS,target,f,c}$ may be determined as shown in Equation 2 below.

Equation 2

$$\text{WUS\_RECEIVED\_TARGET\_POWER } (P_{WUS,target,f,c}) = MaxWUST \times Power - (WUSTransMax - \text{WUS\_POWER\_RAMPING\_COUNTER}) * \text{WUS\_POWER\_RAMPING\_STEP} + [\text{DELTA\_WUS}]$$

By using Equation 2 above, $P_{WUS,aget,f,c}$ considering ramping up of transmission power during WUS multi-transmission may be determined. Here, MaxWUSTxPower indicates maximum power for uplink transmission. MaxWUSTxPower may be determined based on a capability of a UE and/or configured from an access/sync cell. In this case, a value of MaxWUSTxPower may be determined differently according to a carrier frequency f and/or cell c.

WUSTransMax indicates a maximum number of repetitive transmissions or retransmission (of a WUS) before access and synchronization to a data cell.

WUS_POWER_RAMPING_COUNTER indicates the number of WUSs transmitted before access to the data cell is completed. WUS_POWER_RAMPING_COUNTER may be counted up to the configured maximum WUSTransMax and may be configured to be 0 again when exceeding the WUSTransMax or a WUS is newly triggered.

WUS_POWER_RAMPING_STEP indicates a value for power ramping up during WUS transmission.

DELTA_WUS indicates a WUS power offset value according to various WUS formats and traffic types. For example, in case that a data cell is activated to process traffic having high latency requirement, the DELTA_WUS may be configured to be 6 dB, and in case that a data cell is activated to process traffic having low latency requirement, DELTA_WUS may be configured to be 0 dB. Similarly, different DELTA_WUS may be configured depending on a WUS format.

According to method 2 of an embodiment of the disclosure, the UE may ramp up power of a WUS for each transmission to complete data cell activation. In this case, without activating too many data cells in an initial transmission, the UE may gradually activate a data cell within a small WUS coverage to a data cell within a large WUS coverage. As such, more energy of the base station may be saved.

[Method 3]

According to method 3 of an embodiment of the disclosure, a method for determining transmission power of a WUS through ramping up for cell selection and activation may be provided.

A UE may determine WUS transmission power $P_{WUS,b,f,c}$ as shown in Equation 3 below.

$$P_{WUS,b,f,c}(i) = \min\{P_{CMAX,f,c}, P_{WUS,target,f,c}\} \text{ [dBm]} \quad \text{Equation 3}$$

$P_{WUS,target,f,c}$ in Equation 3 indicates WUS target transmission power configured through higher layer signaling (e.g., a system information block (SIB) or an RRC) and/or L1 signaling from an access/sync cell (with carrier frequency f and cell c) base station. $P_{WUS,target,f,c}$ may be determined according to a UE capability.

$P_{CMAX,f,c}$ may be maximum output power configured to the UE of an access carrier f of a serving access/sync cell c and the UE may initially access the access/sync cell and then may be configured with $P_{CMAX,f,c}$ from an access/sync cell base station through higher layer signaling and/or L1 signaling.

$P_{WUS,target,f,c}$ may be determined as shown in Equation 4 below.

Equation 4

$$\text{WUS\_RECEIVED\_TARGET\_POWER } (P_{WUS,target,f,c}) = MaxWUST \times Power - (WUSTransMax - \text{WUS\_POWER\_RAMPING\_COUNTER}) * \text{WUS\_POWER\_RAMPING\_STEP} + [\text{DELTA\_WUS}]$$

By using Equation 4 above, $P_{WUS,target,f,c}$ considering ramping up of transmission power during WUS multi-transmission may be determined. Here, MaxWUSTxPower indicates maximum power for uplink transmission. MaxWUSTxPower may be determined based on a capability of a UE and/or configured from an access/sync cell. In this case, a value of MaxWUSTxPower may be determined differently according to a carrier frequency f and/or cell c.

WUSTransMax indicates a maximum number of repetitive transmissions or retransmission (of a WUS) before access and synchronization to a data cell.

WUS_POWER_RAMPING_COUNTER indicates the number of WUSs transmitted before access to the data cell is completed. WUS_POWER_RAMPING_COUNTER may be counted up to the configured maximum WUSTransMax and is configured to be 0 again when exceeding the WUSTransMax or a WUS is newly triggered.

WUS_POWER_RAMPING_STEP indicates a value for power ramping up during WUS transmission.

DELTA_WUS indicates a WUS power offset value according to various WUS formats and traffic types. For example, in case that a data cell is activated to process traffic having high latency requirement, the DELTA_WUS may be configured to be 6 dB, and in case that a data cell is activated to process traffic having low latency requirement, DELTA_WUS may be configured to be 0 dB. Similarly, different DELTA_WUS may be configured depending on a WUS format.

According to method 3 of an embodiment of the disclosure, the UE may ramp up power of a WUS for each transmission to complete data cell activation, and the maximum transmission power may be limited to $P_{CMAX,f,c}$. In this case, without activating too many data cells in an initial transmission, the UE may gradually activate a data cell within a small WUS coverage to a data cell within a large WUS coverage. As such, more energy of the base station may be saved.

[Method 4]

According to method 4 of an embodiment of the disclosure, transmission power of a WUS for cell selection and/or activation may be determined using a preconfigured value.

A UE may determine transmission power of a WUS by using preconfigured values configured from an access/sync cell base station through higher layer signaling and/or L1 signaling. Here, in case that the UE is configured with $\Delta P_x=\{6, 3, 0\}$ for the preconfigured value, the UE may determine Maximum uplink power $P_{max,UL}$- 6 dB (i.e., $\Delta P_1$) configured based on a UE capability as first WUS transmission power. Thereafter, the UE may determine Maximum uplink power $P_{max,UL}$- 3 dB (i.e., $\Delta P_2$) configured based on a UE capability as second WUS transmission power. As another method, the UE may be configured with {17, 20, 22} [dBm] as a WUS preconfigured power value and perform every transmission at preconfigured WUS power.

According to the first embodiment of the disclosure, the UE may determine transmission power of a WUS for data cell activation. The above-described methods are merely examples and the method for determining WUS transmission power for data cell activation of the disclosure is not limited thereto. For example, the disclosure may be also applied to transmission of a WUS for access/sync cell activation for UE-based mobility or a WUS for waking up an on-demand channel and signal. Furthermore, a PSS, an SSS, a PRACH, an SRS (or other RSs), a PUSCH, or the like and/or a new sequence-based signal may be used for formats of a WUS.

Second Embodiment

The second embodiment of the disclosure may provide a method for configuring a WUS for cell selection in a communication system. This may be for energy saving of a base station. According to the disclosure, the base station may active an appropriate data cell to a UE so as to maximize an energy saving effect and secure a service performance.

Configuration information for WUS transmission power control may be configured to the UE by one or a combination of the following configuration methods according to an embodiment.

[Method 1]

According to Method 1 according to an embodiment of the disclosure, a method by which a base station configures configuration information of a WUS for data cell activation to a UE initially accessing an access/sync cell may be provided.

An access/sync cell base station may configure WUS configuration information to a UE through RRC signaling or L1 signaling (e.g., DCI, a PDCCH, or a PDSCH).

For example, WUS-ConfigGeneric may be transmitted to the UE as shown in Table 13 below.

TABLE 13

```
WUS-ConfigGeneric::=          SEQUENCE {
WUS-CarrierFreq                  ARFCN-Value[NR or 6G],
DataCellId,                   PhysCellId,
WUSReceivedTargetPower INTEGER (-202..-60),
WUSTransMax                      ENUMERATED {n3, n4, n5, n6, n7, n8,
n10, 220,n50, n100, n200},
powerRampingStep                 ENUMERATED {dB0, dB2, dB,4, dB6},
WUS-ResponseWindow,
...
}
```

Through the WUS-ConfigGeneric configuration, the UE may identify a carrier frequency, cell ID information of a data cell for a WUS, and the WUSReceivedTargetPower, WUSTransMax, and powerRampingStep setting information of the WUS transmitted in the data cell corresponding to the carrier frequency and cell ID.

[Method 2]

According to Method 2 according to an embodiment of the disclosure, a method by which a base station configures configuration information for a gNB WUS to one or more UEs including a UE in an RRC connected or RRC Idle/Inactive state, which do not access an access/sync cell and/or one or more UEs newly accessing an access/sync cell. This may be for energy saving. Method 2 according to an embodiment may be applied to a UE in an RRC connected or RRC Idle/Inactive state, which does not access an access/sync cell and/or a UE attempting to access an access/sync cell.

According to an embodiment of the disclosure, for energy saving of the base station, the base station may configure configuration information for determining WUS transmission power to a UE including a UE in an RRC connected or RRC Idle/Inactive state, which does not access an access/sync cell and/or a UE newly accessing an access/sync cell through a new system information block.

For example, the UE may receive an RS (e.g., an SSB or tracking reference signal (TRS)) for synchronization from an access/sync cell and then identify/obtain/receive an SIB corresponding to the RS. The SIB corresponding to the RS may be an SIB identified/obtained/received based on the RS. For example, the SIB may correspond to an SIB identified/obtained/received based on information included in a master Information Block (MIB) included in an SSB and/or an SIB identified/obtained/received after obtaining an MIB. Here, in case that a value indicating a WUS is configured as enable or activate in the identified/obtained/received system information block (e.g., SIB1 or a new SIBX configured through SIB1), the UE may determine that the access/sync cell base station perform an operation for energy saving. Furthermore, the UE may determine a function of an energy saving operation of the base station through the system information block. For example, the base station may configure, to the UE, configuration information for determining WUS transmission power through SIBXX as shown as Table 14 below.

TABLE 14

```
SIBXX-IEs ::= SEQUENCE {
Access-WUS-GenericConfig ::= SEQUENCE {
AccessCellId,                          PhysCellId,
WUS-CarrierFreq                            ARFCN-Value[NR or 6G],
Data-GenericConfig                           Aesculin,
WUSReceivedTargetPower   INTEGER (-202..-60),
WUSTransMax                            ENUMERATED {n3, n4, n5, n6, n7, n8,
n10, n20, n50, n100, n200},
powerRampingStep                             ENUMERATED {dB0, dB2, dB4, dB6},
WUS-ResponseWindow,
...
}
```

TABLE 14-continued

```
Data-GenericConfig ::= SEQUENCE {
...
Data-WUS-GenericConfig Data-WUS-GenericConfig,
...
}
Data-WUSP-GenericConfig ::= SEQUENCE {
DataCellId,                     PhysCellId,
WUS-CarrierFreq                     ARFCN-Value[NR or 6G],
WUSReceivedTargetPower                  INTEGER (−202..−60),
WUSTransMax                     ENUMERATED {n3, n4, n5, n6, n7, n8,
n10, n20, n50, n100, n200},
powerRampingStep                    ENUMERATED {dB0, dB2, dB4, dB6},
WUS-ResponseWindow,
...
}
}
```

The system information may be broadcast/transmitted from the base station and configured to the UE. The UE attempting initial access may receive SIBXX based on the RS transmitted as a synchronization signal and determine whether a WUS operation is performed. For example, SIBXX may be transmitted or received through a PDSCH and information for the PDSCH may be obtained based on the RS. For example, it may be determined whether the base station activation function via WUS may be applied in the access/sync cell, in the data cell, or in the activation of both access/sync cell and data cell. Thereafter, the UE may determine transmission power of a WUS for cell activation based on the configuration information.

By using at least one of the two methods, one or more UEs may be configured with configuration information for a WUS from the access/sync cell base station. In addition, the configured WUS configuration values may be determined based on a reference signal for synchronization associated with WUS transmission. For example, the WUS may be quasi-co-located (qcl) with the reference signal used for synchronization.

Hereinafter, according to an embodiment of the disclosure, a cell selection procedure for energy saving of a base station in a communication system may be provided. Hereinafter, a flowchart and a block diagram of a UE and a base station for cell selection and WUS transmission to save energy of the base station in a communication system will be described.

Figure 19:
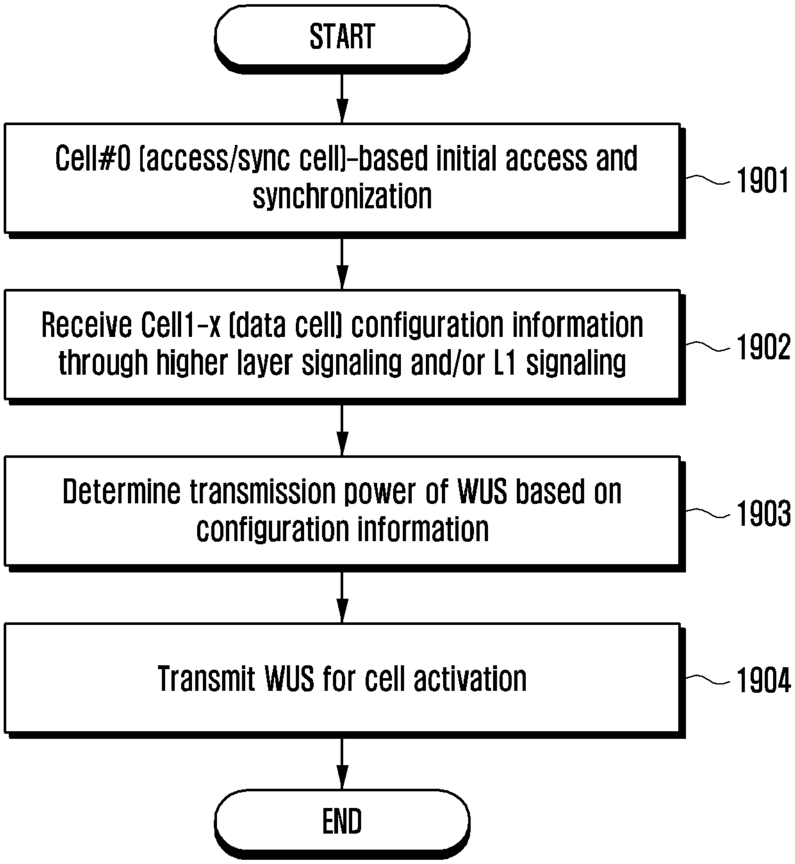
FIG. 19 is a flowchart illustrating an operation of a UE applying a cell selection/activation method in a wireless communication system according to an embodiment of the disclosure.

FIG. 19 is a flowchart illustrating an operation of a UE applying a cell selection/activation method in a wireless communication system according to an embodiment of the disclosure.

Referring to FIG. 19, the UE may perform cell activation through a WUS.

In operation 1901 according to an embodiment of the disclosure, the UE may perform initial access and/or synchronization based on Cell type 1 (e.g., Cell #0 or an access/sync cell).

In operation 1902 according to an embodiment of the disclosure, the UE may receive configuration information for Cell type 2 (e.g., Cell #1-X or data cell) from Cell type 1 through higher layer signaling and/or L1 signaling. For example, the configuration information may include configuration information of s WUS.

In operation 1903 according to an embodiment of the disclosure, the UE may select/determine transmission power of the WUS for WUS transmission, based on the configuration information.

In operation 1904 according to an embodiment of the disclosure, the UE may transmit the configured WUS to the selected Cell type 2 base station. Furthermore, the UE may monitor WUS feedback during WUS response window.

Figure 20:
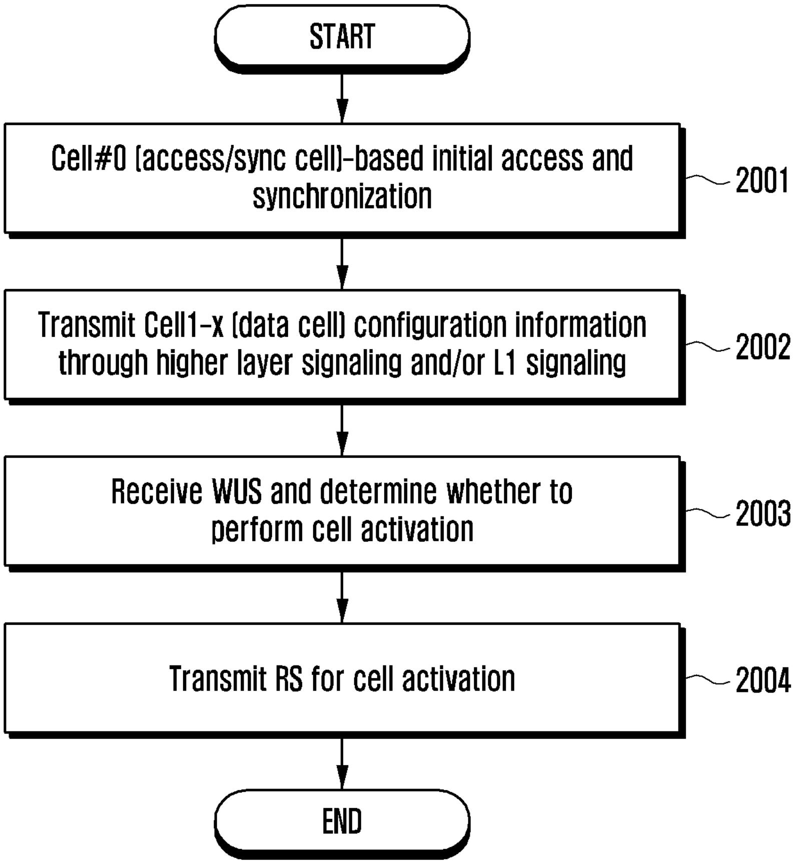
FIG. 20 is a flowchart illustrating an operation of a base station applying a cell selection/activation method in a wireless communication system according to an embodiment of the disclosure.

FIG. 20 is a flowchart illustrating an operation of a base station applying a cell selection/activation method in a wireless communication system according to an embodiment of the disclosure.

Referring to FIG. 20, the base station may perform cell activation through a WUS.

In operation 2001 according to an embodiment of the disclosure, the base station may transmit an RS for initial access and synchronization and/or perform initial access based on Cell type 1 (e.g., Cell #0 or an access/sync cell).

In operation 2002 according to an embodiment of the disclosure, the base station may configure configuration information for Cell type 2 (e.g., Cell #1-X or data cell) to the UE based on Cell type 1 through higher layer signaling and/or L1 signaling. The configuration information may include configuration information for determining WUS transmission power.

In operation 2003 according to an embodiment of the disclosure, the base station may receive the WUS transmitted from the UE and determine whether to activate through WUS measurement. For example, whether to activate Cell type 2 may be determined.

In operation 2004 according to an embodiment of the disclosure, the base station having received the WUS may transmit an RS (e.g., an RS for cell activation of Cell type 2) for access after activation during a configured WUS response window.

Although FIG. 20 illustrates an example in which one base station operates as Cell type 1 and Cell type 2, an embodiment is not limited thereby, and each of Cell type 1 and Cell type 2 may operate in separate base stations. In this case, the operation of the base station based on Cell type 1 may be understood as an operation of Cell type 1 base station, and the operation of the base station based on Cell type 2 may be understood as an operation of Cell type 2 base station.

Figure 21:
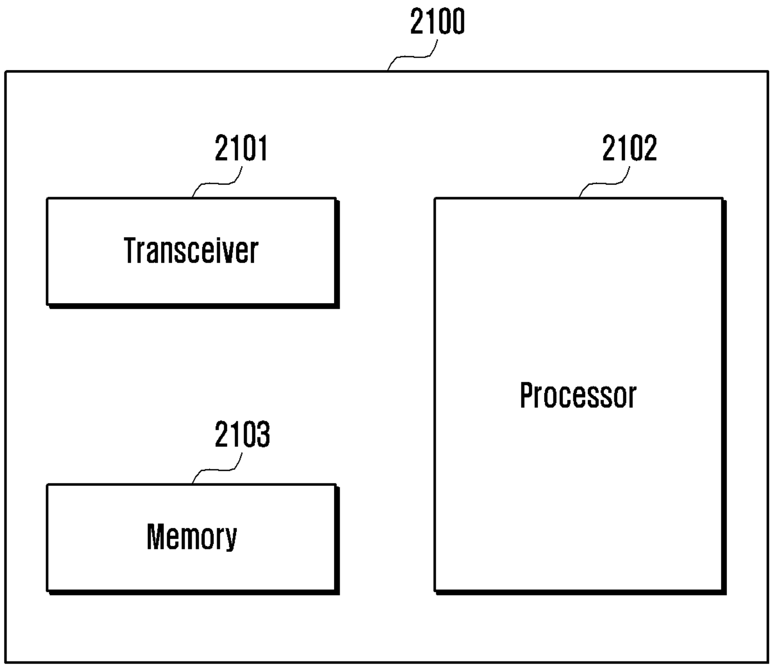
FIG. 21 is a block diagram of a UE according to an embodiment of the disclosure.

FIG. 21 is a block diagram of a UE according to an embodiment of the disclosure.

Referring to FIG. 21, a UE 2100 may include a transceiver 2101, a controller (e.g., a processor) 2102, and a storage unit (e.g., memory) 2103. According to at least one of methods corresponding to the above embodiments or a combination thereof, the transceiver 2101, the controller 2102, and the storage unit 2103 of the UE 2100 may operate. However, the components of the UE 2100 are not limited to the examples described above. According to another embodiment of the disclosure, the UE 2100 may include more or fewer components than the above-described components. Furthermore, for a specific case, the transceiver 2101, the controller 2102, and the storage unit 2103 may be implemented in a form of a single chip.

The transceiver 2101 may include a transmitter and a receiver according to an embodiment. The transceiver 2101 may transmit/receive signals to/from a base station. The signals may include control information and data. The transceiver 2101 may include an RF transmitter configured to up-convert and amplify a frequency of a transmitted signal, an RF receiver configured to amplify a received signal with low noise and down-convert a frequency thereof. The transceiver 2101 may receive a signal through a wireless channel, output the signal to the controller 2102, and transmit a signal output from the controller 2102 through a wireless channel.

The controller 2102 may control a series of procedures performed by the UE 2100 according to the above-described embodiments of the disclosure. For example, the controller 2102 may control or perform an operation of the UE to perform at least one or a combination of the methods according to embodiments of the disclosure. The controller 2102 may include at least one processor. For example, the controller 2102 may include a communication processor (CP) for performing control for communication and an application processor (ΔP) for controlling a higher layer (e.g., an application).

The storage unit 2103 may store control information (e.g., information related to channel estimation generated using DMRSs transmitted through a PUSCH included in a signal obtained by the UE 2100) or data, and may have a region for storing data required for control of the controller 2102, and data generated when the controller 2102 performs controlling.

Figure 22:
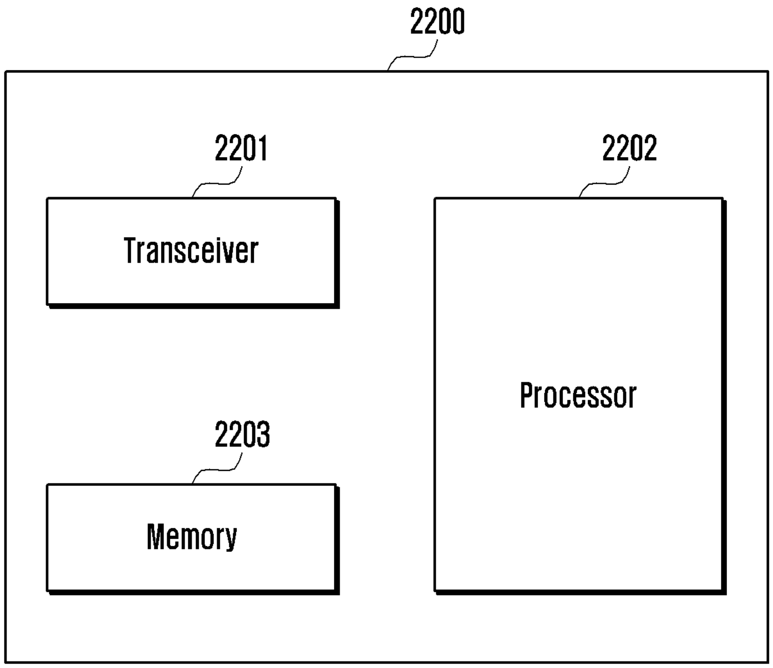
FIG. 22 is a block diagram of a base station according to an embodiment of the disclosure.

FIG. 22 is a block diagram of a base station according to an embodiment of the disclosure.

Referring to FIG. 22, a base station 2200 may include a transceiver 2201, a controller (e.g., a processor) 2202, and a storage unit (e.g., memory) 2203. According to at least one of methods corresponding to the above embodiments or a combination thereof, the transceiver 2201, the controller 2202, and the storage unit 2203 of the base station 2200 may operate. However, the components of the base station 2200 are not limited to the examples described above. According to another embodiment of the disclosure, the base station 2200 may include more or fewer components than the above-described components. Furthermore, for a specific case, the transceiver 2201, the controller 2202, and the storage unit 2203 may be implemented in a form of a single chip.

The transceiver 2201 may include a transmitter and a receiver according to an embodiment. The transceiver 2201 may transmit/receive signals to/from a UE. The signals may include control information and data. The transceiver 2201 may include an RF transmitter configured to up-convert and amplify a frequency of a transmitted signal, an RF receiver configured to amplify a received signal with low noise and down-convert a frequency thereof. The transceiver 2201 may receive a signal through a wireless channel, output the signal to the controller 2202, and transmit a signal output from the controller 2202 through a wireless channel.

The controller 2202 may control a series of procedures to allow the base station 2200 to operate according to the above-described embodiments of the disclosure. For example, the controller 2202 may control or perform an operation of the base station to perform at least one or a combination of the methods according to embodiments of the disclosure. The controller 2202 may include at least one processor. For example, the controller 2202 may include a communication processor (CP) for performing control for communication and an application processor (ΔP) for controlling a higher layer (e.g., an application).

The storage unit 2203 may store control information (e.g., information related to channel estimation generated using DMRSs transmitted through a PUSCH determined by the base station 2200) or data, or control information or data received from a UE, and may have a region for storing data required for control of the controller 2202, and data generated when the controller 2202 performs controlling.

Methods disclosed in the claims and/or methods according to the embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

These programs (software modules or software) may be stored in non-volatile memories including random access memory and flash memory, read only memory (ROM), electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form memory in which the program is stored. Furthermore, a plurality of such memories may be included in the electronic device.

Moreover, the programs may be stored in an attachable storage device which may access the electronic device through communication networks, such as the Internet, Intranet, local area network (LAN), wide LAN (WLAN), and storage area network (SAN) or a combination thereof. Such a storage device may access the electronic device via an external port. Furthermore, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

The embodiments of the disclosure described and shown in the specification and the drawings are merely specific examples that have been presented to easily explain the technical contents of embodiments of the disclosure and help understanding of embodiments of the disclosure, and are not intended to limit the scope of embodiments of the disclosure. For example, it will be apparent to those skilled in the art that other variants based on the technical idea of the disclosure may be implemented. Furthermore, the above respective embodiments may be employed in combination, as necessary.

In the drawings in which methods of the disclosure are described, the order of the description does not always correspond to the order in which steps of each method are performed, and the order relationship between the steps may be changed or the steps may be performed in parallel.

In the drawings in which methods of the disclosure are described, the order of the description does not always correspond to the order in which steps of each method are performed, and the order relationship between the steps may be changed or the steps may be performed in parallel.

Furthermore, in methods of the disclosure, some or all of the contents of each embodiment may be combined without departing from the essential spirit and scope of the disclosure.

The embodiments of the disclosure described and shown in the specification and the drawings are merely specific examples that have been presented to easily explain the technical contents of embodiments of the disclosure and help understanding of embodiments of the disclosure, and are not intended to limit the scope of embodiments of the disclosure. For example, it will be apparent to those skilled in the art that other variants based on the technical idea of the disclosure may be implemented. Furthermore, the above respective embodiments may be employed in combination, as necessary. For example, all embodiments of the disclosure may be partially combined to operate a base station and a terminal.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device, cause the electronic device to perform a method of the disclosure.

Any such software may be stored in the form of volatile or non-volatile storage, such as, for example, a storage device like read only memory (ROM), whether erasable or rewritable or not, or in the form of memory, such as, for example, random access memory (RAM), memory chips, device or integrated circuits or on an optically or magnetically readable medium, such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment (UE) in a communication system, the method comprising:

receiving, from an access cell, uplink wake up signal (UL WUS) configuration information including information on a first plurality of data cells associated with the access cell;

performing UL WUS transmission for a second plurality of data cells included in the first plurality of data cells based on the UL WUS configuration information;

identifying a data cell for data communication included in the first second plurality of data cells based on a reference signal received from the data cell after performing the UL WUS transmission; and performing the data communication on the data cell, wherein performing the UL WUS transmission comprises:

identifying a target transmission power for a UL WUS for a certain data cell included in the second plurality of data cells based on:

(i) a configured maximum UL WUS transmission power corresponding to the certain data cell;

(ii) a configured maximum number of the UL WUS transmission:

(iii) a UL WUS power ramping counter corresponding to a number of the UL WUS transmission before identifying the data cell, wherein the UL WUS power ramping counter is equal to or less than the configured maximum number of the UL WUS transmission;

(iv) a UL WUS power ramping step corresponding to the UL WUS power ramping counter; and (v) an offset value corresponding to the UL WUS, wherein the configured maximum UL WUS transmission power, the configured maximum number of the UL WUS transmission and the offset value corresponding to the UL WUS are configured from the access cell;

identifying a transmission power for the UL WUS based on the target transmission power and a maximum transmission power for the UE; and transmitting the UL WUS to the certain data cell based on the transmission power.

2. The method of claim 1, wherein the data cell for the data communication is identified based on measurement of at least one reference signal including the reference signal received from at least one data cell included in the second plurality of data cells after performing the UL WUS transmission.

3. The method of claim 1, wherein the UL WUS transmission corresponds to physical random access channel (PRACH) transmission.

4. A user equipment (UE) comprising:

at least one transceiver; and at least one processor coupled with the at least one transceiver and configured to:

receive, from an access cell, uplink wake up signal (UL WUS) configuration information including information on a first plurality of data cells associated with the access cell, perform UL WUS transmission for a second plurality of data cells included in the first plurality of data cells based on the UL WUS configuration information, identify a data cell for data communication included in the second plurality of data cells based on a reference signal received from the data cell after performing the UL WUS transmission, and perform the data communication on the data cell, wherein, for performing the UL WUS transmission, the at least one processor is further configured to:

identify a target transmission power for a UL WUS for a certain data cell included in the second plurality of data cells based on:

(i) a configured maximum UL WUS transmission power corresponding to the certain data cell:

(ii) a configured maximum number of the UL WUS transmission:

(iii) a UL WUS power ramping counter corresponding to a number of the UL WUS transmission before identifying the data cell, wherein the UL WUS power ramping counter is equal to or less than the configured maximum number of the UL WUS transmission;

(iv) a UL WUS power ramping step corresponding to the UL WUS power ramping counter; and (v) a offset value corresponding to the UL WUS, wherein the configured maximum UL WUS transmission power, the configured maximum number of the UL WUS transmission and the offset value corresponding to the UL WUS are configured from the access cell;

identify a transmission power for the UL WUS based on the target transmission power and a maximum transmission power for the UE; and transmit the UL WUS to the certain data cell based on the transmission power.

5. The UE of claim 4, wherein the data cell for the data communication is identified based on measurement of at least one reference signal including the reference signal received from at least one data cell included in the second plurality of data cells after performing the UL WUS transmission.

6. The UE of claim 4, wherein the UL WUS transmission corresponds to physical random access channel (PRACH) transmission.

7. A method performed by a base station in a communication system, the method comprising:

transmitting, to a user equipment (UE), on an access cell, uplink wake up signal (UL WUS) configuration information including information on a first plurality of data cells associated with the access cell;

performing UL WUS reception from the UE, on a second plurality of data cells included in the first plurality of data cells based on the UL WUS configuration information, wherein a data cell for data communication included in the second plurality of data cells is activated based on a reference signal transmitted on the data cell after receiving the UL WUS; and performing the data communication with the UE on the data cell, wherein a target transmission power for a UL WUS for a certain data cell included in the second plurality of data cells is based on:

(i) a configured maximum UL WUS transmission power corresponding to the certain data cell;

(ii) a configured maximum number of the UL WUS transmission;

(iii) a UL WUS power ramping counter corresponding to a number of the UL WUS transmission before activating the data cell, wherein the UL WUS power ramping counter is equal to or less than the configured maximum number of the UL WUS transmission;

(iv) a UL WUS power ramping step corresponding to the UL WUS power ramping counter; and (v) an offset value corresponding to the UL WUS, wherein the configured maximum UL WUS transmission power, the configured maximum number of the UL WUS transmission and the offset value corresponding to the UL WUS are configured by the access cell, wherein a transmission power for the UL WUS is based on the target transmission power and a maximum transmission power for the UE, and wherein the UL WUS corresponding to the certain data cell is associated with the transmission power.

8. The method of claim 7, wherein the data cell for the data communication is identified based on measurement of a plurality of UL WUSs in the UL WUS reception on the second plurality of data cells.

9. The method of claim 7, wherein the UL WUS reception corresponds to physical random access channel (PRACH) reception.

10. A base station (BS) comprising:

at least one transceiver; and at least one processor coupled with the at least one transceiver and configured to:

transmit, to a user equipment (UE), on an access cell, uplink wake up signal (UL WUS) configuration information including information on a first plurality of data cells associated with the access cell, perform UL WUS reception from the UE, on a second plurality of data cells included in the first plurality of data cells based on the UL WUS configuration information, wherein a data cell for data communication included in the second plurality of data cells is activated based on a reference signal transmitted on the data cell after receiving the UL WUS, and perform the data communication with the UE on the data cell, wherein a target transmission power for a UL WUS for a certain data cell included in the second plurality of data cells is based on:

(i) a configured maximum UL WUS transmission power corresponding to the certain data cell;

(ii) a configured maximum number of the UL WUS transmission;

(iii) a UL WUS power ramping counter corresponding to a number of the UL WUS transmission before activating the data cell, wherein the UL WUS power ramping counter is equal to or less than the configured maximum number of the UL WUS transmission;

(iv) a UL WUS power ramping step corresponding to the UL WUS power ramping counter; and (v) an offset value corresponding to the UL WUS, wherein the configured maximum UL WUS transmission power, the configured maximum number of the UL WUS transmission and the offset value corresponding to the UL WUS are configured by the access cell, wherein a transmission power for the UL WUS is based on the target transmission power and a maximum transmission power for the UE, and wherein the UL WUS corresponding to the certain data cell is associated with the transmission power.

11. The BS of claim 10, wherein the data cell for the data communication is identified based on measurement of a plurality of UL WUSs in the UL WUS reception on the second plurality of data cells.

12. The BS of claim 10, wherein the UL WUS reception corresponds to physical random access channel (PRACH) reception.

13. The method of claim 1, wherein the target transmission power satisfies an equation:

WUS_RECEIVED_TARGET_POWER=MaxWUSTxPower-(WUSTransMax-WUS_POWER_RAMPING_COUNTER)*WUS_POWER_RAMPING_STEP+[DELTA_WUS], wherein WUS_RECEIVED_TARGET_POWER is the target transmission power, wherein MaxWUSTxPower is the configured maximum UL WUS transmission power, wherein WUSTransMax is the configured maximum number of the UL WUS transmission, wherein WUS_POWER_RAMPING_COUNTER is the UL WUS power ramping counter corresponding to the number of the UL WUS transmission, wherein WUS_POWER_RAMPING_STEP is the UL WUS power ramping step corresponding to the UL WUS power ramping counter, and wherein DELTA_WUS is the offset value corresponding to the UL WUS.

14. The UE of claim 4, wherein the target transmission power satisfies an equation:

WUS_RECEIVED_TARGET_POWER=MaxWUSTxPower-(WUSTransMax-WUS_POWER_RAMPING_COUNTER)*WUS_POWER_RAMPING_STEP+[DELTA_WUS], wherein WUS_RECEIVED_TARGET_POWER is the target transmission power, wherein MaxWUSTxPower is the configured maximum UL WUS transmission power, wherein WUSTransMax is the configured maximum number of the UL WUS transmission, wherein WUS_POWER_RAMPING_COUNTER is the UL WUS power ramping counter corresponding to the number of the UL WUS transmission, wherein WUS_POWER_RAMPING_STEP is the UL WUS power ramping step corresponding to the UL WUS power ramping counter, and wherein DELTA_WUS is the offset value corresponding to the UL WUS.

15. The method of claim 7, wherein the target transmission power satisfies an equation:

WUS_RECEIVED_TARGET_POWER=MaxWUSTxPower-(WUSTransMax-WUS_POWER_RAMPING_COUNTER)*WUS_POWER_RAMPING_STEP+[DELTA_WUS], wherein WUS_RECEIVED_TARGET_POWER is the target transmission power, wherein MaxWUSTxPower is the configured maximum UL WUS transmission power, wherein WUSTransMax is the configured maximum number of the UL WUS transmission, wherein WUS_POWER_RAMPING_COUNTER is the UL WUS power ramping counter corresponding to the number of the UL WUS transmission, wherein WUS_POWER_RAMPING_STEP is the UL WUS power ramping step corresponding to the UL WUS power ramping counter, and wherein DELTA_WUS is the offset value corresponding to the UL WUS.

16. The BS of claim 10, wherein the target transmission power satisfies an equation:

WUS_RECEIVED_TARGET_POWER=MaxWUSTxPower-(WUSTransMax-WUS_POWER_RAMPING_COUNTER)*WUS_POWER_RAMPING_STEP+[DELTA_WUS], wherein WUS_RECEIVED_TARGET_POWER is the target transmission power, wherein MaxWUSTxPower is the configured maximum UL WUS transmission power, wherein WUSTransMax is the configured maximum number of the UL WUS transmission, wherein WUS_POWER_RAMPING_COUNTER is the UL WUS power ramping counter corresponding to the number of the UL WUS transmission, wherein WUS_POWER_RAMPING_STEP is the UL WUS power ramping step corresponding to the UL WUS power ramping counter, and wherein DELTA_WUS is the offset value corresponding to the UL WUS.

* * * * *